US010637986B2

(12) United States Patent
De Vries et al.

(10) Patent No.: US 10,637,986 B2
(45) Date of Patent: Apr. 28, 2020

(54) DISPLAYING AND UPDATING A SET OF APPLICATION VIEWS

(71) Applicant: Apple Inc., Cupertino, CA (US)

(72) Inventors: Nathan De Vries, San Francisco, CA (US); Lee S. Broughton, Santa Cruz, CA (US); Kevin Will Chen, Sunnyvale, CA (US); Christopher Patrick Foss, San Francisco, CA (US); Stephen O. Lemay, Palo Alto, CA (US); Christopher Wilson, San Francisco, CA (US); Eric Lance Wilson, San Jose, CA (US); Giancarlo Yerkes, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/608,866

(22) Filed: May 30, 2017

(65) Prior Publication Data

US 2017/0359461 A1 Dec. 14, 2017

Related U.S. Application Data

(60) Provisional application No. 62/348,849, filed on Jun. 10, 2016.

(51) Int. Cl.
*G06F 3/0488* (2013.01)
*H04M 1/725* (2006.01)
(Continued)

(52) U.S. Cl.
CPC ........ *H04M 1/72583* (2013.01); *G06F 3/048* (2013.01); *G06F 3/0482* (2013.01);
(Continued)

(58) Field of Classification Search
CPC ......... H04M 1/72522; H04M 1/72583; H04M 2250/22; H04M 1/72586; G06F 3/0482; G06F 3/0488
See application file for complete search history.

(56) References Cited

U.S. PATENT DOCUMENTS

| 4,761,642 A | 8/1988 | Huntzinger et al. |
| 4,885,704 A | 12/1989 | Takagi et al. |

(Continued)

FOREIGN PATENT DOCUMENTS

| CA | 2876587 A1 | 2/2014 |
| CN | 1525723 A | 9/2004 |

(Continued)

OTHER PUBLICATIONS

Advisory Action received for U.S. Appl. No. 10/179,775, dated Oct. 13, 2015, 4 pages.

(Continued)

*Primary Examiner* — Stephen S Hong
*Assistant Examiner* — Ahamed I Nazar
(74) *Attorney, Agent, or Firm* — Dentons US LLP

(57) ABSTRACT

The present disclosure generally relates to viewing and updating application views. A device receives a user input, the input, when received initiating display of a plurality of application views of a set of application views. The device, in response to receiving the user input, displays the plurality of application views of the set of application views, wherein the set of application views includes preselected application views and an adaptive view that corresponds to a most recently opened application that is not one of the preselected application views.

51 Claims, 60 Drawing Sheets

(51) Int. Cl.
*G06F 3/0482* (2013.01)
*G06F 3/048* (2013.01)

(52) U.S. Cl.
CPC .......... *G06F 3/0488* (2013.01); *H04M 1/725* (2013.01); *H04M 1/72522* (2013.01); *H04M 1/72586* (2013.01); *H04M 2250/22* (2013.01)

(56) References Cited

U.S. PATENT DOCUMENTS

| | | | |
|---|---|---|---|
| 4,896,291 A | 1/1990 | Gest et al. |
| 5,140,678 A | 8/1992 | Torres |
| 5,146,556 A | 9/1992 | Hullot et al. |
| 5,202,961 A | 4/1993 | Mills et al. |
| 5,227,771 A | 7/1993 | Kerr et al. |
| 5,229,852 A | 7/1993 | Maietta et al. |
| 5,237,653 A | 8/1993 | Noguchi et al. |
| 5,287,447 A | 2/1994 | Miller et al. |
| 5,333,256 A | 7/1994 | Green et al. |
| 5,347,295 A | 9/1994 | Agulnick et al. |
| 5,384,911 A | 1/1995 | Bloomfield |
| 5,412,776 A | 5/1995 | Bloomfield et al. |
| 5,416,895 A | 5/1995 | Anderson et al. |
| 5,428,730 A | 6/1995 | Baker et al. |
| 5,430,839 A | 7/1995 | Jagannathan et al. |
| 5,487,143 A | 1/1996 | Southgate |
| 5,499,334 A | 3/1996 | Staab |
| 5,500,936 A | 3/1996 | Allen et al. |
| 5,553,225 A | 9/1996 | Perry |
| 5,557,724 A | 9/1996 | Sampat et al. |
| 5,560,022 A | 9/1996 | Dunstan et al. |
| 5,561,811 A | 10/1996 | Bier |
| 5,581,670 A | 12/1996 | Bier et al. |
| 5,583,984 A | 12/1996 | Conrad et al. |
| 5,590,265 A | 12/1996 | Nakazawa |
| 5,657,049 A | 8/1997 | Ludolph et al. |
| 5,659,693 A | 8/1997 | Hansen et al. |
| 5,721,850 A | 2/1998 | Farry |
| 5,784,045 A | 7/1998 | Cline et al. |
| 5,793,365 A | 8/1998 | Tang et al. |
| 5,825,357 A | 10/1998 | Malamud et al. |
| 5,880,733 A | 3/1999 | Horvitz et al. |
| 6,072,488 A | 6/2000 | Mcfarland |
| 6,115,043 A | 9/2000 | Levine et al. |
| 6,166,736 A | 12/2000 | Hugh |
| 6,215,490 B1 | 4/2001 | Kaply |
| 6,229,542 B1 | 5/2001 | Miller |
| 6,230,170 B1 | 5/2001 | Zellweger et al. |
| 6,300,951 B1 | 10/2001 | Filetto et al. |
| 6,459,442 B1 | 10/2002 | Edwards et al. |
| 6,486,895 B1 | 11/2002 | Robertson et al. |
| 6,489,975 B1 | 12/2002 | Patil et al. |
| 6,493,002 B1 | 12/2002 | Christensen |
| 6,661,437 B1 | 12/2003 | Miller et al. |
| 6,768,497 B2 | 7/2004 | Baar et al. |
| 6,831,666 B1 | 12/2004 | Kreis |
| 7,007,241 B2 | 2/2006 | Boeuf |
| 7,036,088 B2 | 4/2006 | Tunney |
| 7,134,093 B2 | 11/2006 | Etgen et al. |
| 7,159,189 B2 | 1/2007 | Weingart et al. |
| 7,380,218 B2 | 5/2008 | Rundell |
| 7,444,645 B1 | 10/2008 | St-Michel et al. |
| 7,458,014 B1 | 11/2008 | Rubin et al. |
| 7,506,260 B2 | 3/2009 | Wada et al. |
| 7,581,186 B2 | 8/2009 | Dowdy et al. |
| 7,673,255 B2 | 3/2010 | Schechter et al. |
| 7,676,767 B2 | 3/2010 | Hofmeister et al. |
| 7,694,236 B2 | 4/2010 | Gusmorino et al. |
| 7,739,604 B1 | 6/2010 | Lyons et al. |
| 7,739,622 B2 | 6/2010 | DeLine et al. |
| 7,757,185 B2 | 7/2010 | Paquette et al. |
| 7,788,595 B2 | 8/2010 | Biwer et al. |
| 7,814,112 B2 | 10/2010 | Gupta et al. |
| 7,840,907 B2 | 11/2010 | Kikuchi et al. |
| 7,880,728 B2 | 2/2011 | De Los Reyes et al. |
| 7,921,373 B2 | 4/2011 | Yamashita et al. |
| 7,954,056 B2 | 5/2011 | Graham |
| 8,010,900 B2 | 8/2011 | Hart et al. |
| 8,020,028 B1 | 9/2011 | Lutter |
| 8,024,670 B1 | 9/2011 | Rahmatian et al. |
| 8,046,712 B2 | 10/2011 | Landman et al. |
| 8,077,157 B2 | 12/2011 | Sengupta et al. |
| 8,171,137 B2 | 5/2012 | Parks et al. |
| 8,181,119 B1 | 5/2012 | Ording |
| 8,196,061 B1 | 6/2012 | Bhojan |
| 8,214,768 B2 | 7/2012 | Boule et al. |
| 8,224,894 B1 | 7/2012 | Parks et al. |
| 8,250,071 B1 | 8/2012 | Killalea et al. |
| 8,259,153 B1 | 9/2012 | Campbell, III et al. |
| 8,260,879 B2 | 9/2012 | Chan |
| 8,269,739 B2 | 9/2012 | Hillis et al. |
| 8,290,777 B1 | 10/2012 | Nguyen et al. |
| 8,291,341 B2 | 10/2012 | Tseng et al. |
| 8,291,344 B2 | 10/2012 | Chaudhri |
| 8,294,105 B2 | 10/2012 | Alameh et al. |
| 8,438,504 B2 | 5/2013 | Cranfill et al. |
| 8,443,280 B2 | 5/2013 | Noyes |
| 8,478,363 B2 | 7/2013 | Levien et al. |
| 8,478,816 B2 | 7/2013 | Parks et al. |
| 8,499,236 B1 | 7/2013 | Keljo |
| 8,566,700 B2 | 10/2013 | Ueda |
| 8,613,070 B1 | 12/2013 | Borzycki et al. |
| 8,656,040 B1 | 2/2014 | Bajaj et al. |
| 8,718,556 B2 | 5/2014 | Lee et al. |
| 8,762,844 B2 | 6/2014 | Kim et al. |
| 8,782,513 B2 | 7/2014 | Migos et al. |
| 8,806,369 B2 | 8/2014 | Khoe et al. |
| 8,839,122 B2 | 9/2014 | Anzures et al. |
| 9,052,925 B2 | 6/2015 | Chaudhri |
| 9,058,186 B2 | 6/2015 | Chaudhri |
| 9,095,779 B2 | 8/2015 | Chan et al. |
| 9,417,779 B2 | 8/2016 | Flake et al. |
| 9,442,516 B2 | 9/2016 | Migos et al. |
| 9,483,175 B2 | 11/2016 | Wagner |
| 9,513,801 B2 | 12/2016 | Chaudhri |
| 9,552,015 B2 | 1/2017 | Migos et al. |
| 2002/0010707 A1 | 1/2002 | Chang et al. |
| 2002/0075334 A1 | 6/2002 | Yfantis |
| 2002/0083101 A1 | 6/2002 | Card et al. |
| 2002/0105537 A1 | 8/2002 | Orbanes et al. |
| 2002/0113802 A1 | 8/2002 | Card et al. |
| 2002/0118230 A1 | 8/2002 | Card et al. |
| 2002/0120651 A1 | 8/2002 | Pustejovsky et al. |
| 2003/0013493 A1 | 1/2003 | Irimajiri et al. |
| 2003/0030673 A1 | 2/2003 | Ho |
| 2003/0055977 A1 | 3/2003 | Miller |
| 2003/0076352 A1 | 4/2003 | Uhlig et al. |
| 2003/0098884 A1 | 5/2003 | Christensen |
| 2003/0117440 A1 | 6/2003 | Hellyar et al. |
| 2003/0119562 A1 | 6/2003 | Kokubo |
| 2003/0184598 A1 | 10/2003 | Graham |
| 2004/0017404 A1 | 1/2004 | Schileru-Key |
| 2004/0025112 A1 | 2/2004 | Chasen et al. |
| 2004/0080531 A1 | 4/2004 | Berstis |
| 2004/0125081 A1 | 7/2004 | Hayakawa |
| 2004/0141016 A1 | 7/2004 | Fukatsu et al. |
| 2004/0155908 A1 | 8/2004 | Wagner |
| 2004/0174398 A1 | 9/2004 | Luke et al. |
| 2004/0205514 A1 | 10/2004 | Sommerer et al. |
| 2005/0022138 A1 | 1/2005 | Tunney |
| 2005/0091608 A1 | 4/2005 | Gusmorino et al. |
| 2005/0132281 A1 | 6/2005 | Pan et al. |
| 2005/0149879 A1 | 7/2005 | Jobs et al. |
| 2005/0223068 A1 | 10/2005 | Shohfi et al. |
| 2005/0289482 A1 | 12/2005 | Anthony et al. |
| 2006/0031776 A1 | 2/2006 | Glein et al. |
| 2006/0033724 A1 | 2/2006 | Chaudhri et al. |
| 2006/0041846 A1 | 2/2006 | Masselle et al. |
| 2006/0041896 A1 | 2/2006 | Yagi et al. |
| 2006/0055789 A1 | 3/2006 | Jin et al. |
| 2006/0101122 A1 | 5/2006 | Ishii |
| 2006/0107226 A1 | 5/2006 | Matthews et al. |
| 2006/0150215 A1 | 7/2006 | Wroblewski |
| 2006/0160528 A1 | 7/2006 | Wang et al. |
| 2006/0161861 A1 | 7/2006 | Holecek et al. |

(56) References Cited

U.S. PATENT DOCUMENTS

| | | |
|---|---|---|
| 2006/0161868 A1 | 7/2006 | Van Dok et al. |
| 2006/0184894 A1 | 8/2006 | Daniels et al. |
| 2006/0185005 A1 | 8/2006 | Graves et al. |
| 2006/0214953 A1 | 9/2006 | Crew et al. |
| 2006/0218503 A1 | 9/2006 | Matthews et al. |
| 2006/0224986 A1 | 10/2006 | Lindsay et al. |
| 2006/0230346 A1 | 10/2006 | Bhogal et al. |
| 2006/0242602 A1 | 10/2006 | Schechter et al. |
| 2007/0004451 A1 | 1/2007 | C. Anderson |
| 2007/0070066 A1 | 3/2007 | Bakhash |
| 2007/0083828 A1 | 4/2007 | Toriyama et al. |
| 2007/0115933 A1 | 5/2007 | Muhamed et al. |
| 2007/0128899 A1 | 6/2007 | Mayer |
| 2007/0157089 A1 | 7/2007 | Van Os et al. |
| 2007/0174761 A1 | 7/2007 | Lin et al. |
| 2007/0220445 A1 | 9/2007 | Yach et al. |
| 2007/0233736 A1 | 10/2007 | Xiong et al. |
| 2007/0236476 A1 | 10/2007 | Suzuki |
| 2007/0239831 A1 | 10/2007 | Basu |
| 2007/0262964 A1 | 11/2007 | Zotov et al. |
| 2007/0277121 A1 | 11/2007 | Beckman |
| 2007/0294639 A1 | 12/2007 | Van Berkel et al. |
| 2008/0034307 A1 | 2/2008 | Cisler et al. |
| 2008/0034316 A1 | 2/2008 | Thoresson |
| 2008/0036743 A1 | 2/2008 | Westerman et al. |
| 2008/0094368 A1 | 4/2008 | Ording et al. |
| 2008/0109753 A1 | 5/2008 | Karstens |
| 2008/0134033 A1 | 6/2008 | Burns et al. |
| 2008/0141182 A1 | 6/2008 | Barsness et al. |
| 2008/0160974 A1 | 7/2008 | Vartiainen et al. |
| 2008/0168073 A1 | 7/2008 | Siegel et al. |
| 2008/0168379 A1 | 7/2008 | Forstall et al. |
| 2008/0168401 A1 | 7/2008 | Boule et al. |
| 2008/0174570 A1 | 7/2008 | Jobs et al. |
| 2008/0204424 A1 | 8/2008 | Jin et al. |
| 2008/0270910 A1 | 10/2008 | Lukasik et al. |
| 2008/0282202 A1 | 11/2008 | Sunday |
| 2008/0307335 A1 | 12/2008 | Chaudhri et al. |
| 2008/0307345 A1 | 12/2008 | Hart et al. |
| 2008/0307351 A1 | 12/2008 | Louch et al. |
| 2008/0307360 A1 | 12/2008 | Chaudhri et al. |
| 2008/0313257 A1 | 12/2008 | Allen et al. |
| 2008/0319856 A1 | 12/2008 | Zito et al. |
| 2008/0319944 A1 | 12/2008 | Venolia et al. |
| 2009/0007017 A1 | 1/2009 | Anzures et al. |
| 2009/0064021 A1 | 3/2009 | Boettcher et al. |
| 2009/0089712 A1 | 4/2009 | Sato |
| 2009/0100383 A1 | 4/2009 | Sunday et al. |
| 2009/0103780 A1 | 4/2009 | Nishihara et al. |
| 2009/0113347 A1 | 4/2009 | Hess et al. |
| 2009/0140960 A1 | 6/2009 | Mahowald |
| 2009/0158217 A1 | 6/2009 | Stuart |
| 2009/0179867 A1 | 7/2009 | Shim et al. |
| 2009/0187825 A1 | 7/2009 | Sandquist et al. |
| 2009/0197635 A1 | 8/2009 | Kim et al. |
| 2009/0213086 A1 | 8/2009 | Chae et al. |
| 2009/0228126 A1 | 9/2009 | Spielberg et al. |
| 2009/0235155 A1 | 9/2009 | Ueda |
| 2009/0235162 A1 | 9/2009 | Nuccio et al. |
| 2009/0241054 A1 | 9/2009 | Hendricks |
| 2009/0254867 A1 | 10/2009 | Farouki et al. |
| 2009/0259939 A1 | 10/2009 | Lockett et al. |
| 2009/0259942 A1 | 10/2009 | Bitonti et al. |
| 2009/0271381 A1 | 10/2009 | Beezer et al. |
| 2009/0293007 A1 | 11/2009 | Duarte et al. |
| 2009/0315841 A1 | 12/2009 | Cheng et al. |
| 2009/0319888 A1 | 12/2009 | Oygard |
| 2010/0023878 A1 | 1/2010 | Douris et al. |
| 2010/0023883 A1 | 1/2010 | Khazaka et al. |
| 2010/0029255 A1 | 2/2010 | Kim et al. |
| 2010/0044121 A1 | 2/2010 | Simon et al. |
| 2010/0045616 A1 | 2/2010 | Li et al. |
| 2010/0064262 A1 | 3/2010 | Liao et al. |
| 2010/0066763 A1 | 3/2010 | Macdougall et al. |
| 2010/0088628 A1 | 4/2010 | Flygh et al. |
| 2010/0095240 A1 | 4/2010 | Shiplacoff et al. |
| 2010/0107078 A1 | 4/2010 | Hayashi |
| 2010/0115388 A1 | 5/2010 | Nguyen |
| 2010/0125807 A1 | 5/2010 | Easterday et al. |
| 2010/0156812 A1 | 6/2010 | Stallings et al. |
| 2010/0159995 A1 | 6/2010 | Stallings et al. |
| 2010/0162108 A1 | 6/2010 | Stallings et al. |
| 2010/0174606 A1 | 7/2010 | Hoyle |
| 2010/0175018 A1 | 7/2010 | Petschnigg et al. |
| 2010/0185989 A1 | 7/2010 | Shiplacoff et al. |
| 2010/0205563 A1 | 8/2010 | Haapsaari et al. |
| 2010/0211872 A1 | 8/2010 | Rolston et al. |
| 2010/0241699 A1 | 9/2010 | Muthukumarasamy et al. |
| 2010/0242066 A1 | 9/2010 | Tseng |
| 2010/0251168 A1 | 9/2010 | Fujita et al. |
| 2010/0269039 A1 | 10/2010 | Pahlavan et al. |
| 2010/0281399 A1* | 11/2010 | Banker ............... G06Q 10/10 715/758 |
| 2010/0333045 A1 | 12/2010 | Guéziec et al. |
| 2011/0007029 A1 | 1/2011 | Ben-david |
| 2011/0010667 A1* | 1/2011 | Sakai ................. G06F 3/04817 715/810 |
| 2011/0029864 A1 | 2/2011 | Stewart et al. |
| 2011/0029891 A1* | 2/2011 | Kim ................. H04M 1/72561 715/752 |
| 2011/0041056 A1 | 2/2011 | Griffin et al. |
| 2011/0041096 A1 | 2/2011 | Larco et al. |
| 2011/0041102 A1 | 2/2011 | Kim |
| 2011/0065384 A1 | 3/2011 | Cader et al. |
| 2011/0074824 A1 | 3/2011 | Srinivasan et al. |
| 2011/0087955 A1 | 4/2011 | Ho et al. |
| 2011/0087982 A1 | 4/2011 | McCann et al. |
| 2011/0088086 A1 | 4/2011 | Swink et al. |
| 2011/0091182 A1 | 4/2011 | Look et al. |
| 2011/0107241 A1 | 5/2011 | Moore |
| 2011/0115721 A1 | 5/2011 | Li et al. |
| 2011/0138295 A1* | 6/2011 | Momchilov ........ G06F 3/0484 715/740 |
| 2011/0145691 A1 | 6/2011 | Noyes |
| 2011/0145692 A1 | 6/2011 | Noyes et al. |
| 2011/0157029 A1 | 6/2011 | Tseng |
| 2011/0179386 A1 | 7/2011 | Shaffer et al. |
| 2011/0191710 A1 | 8/2011 | Jang et al. |
| 2011/0209099 A1 | 8/2011 | Hinckley et al. |
| 2011/0209104 A1 | 8/2011 | Hinckley et al. |
| 2011/0227810 A1 | 9/2011 | Mckinney et al. |
| 2011/0252062 A1 | 10/2011 | Hanatani et al. |
| 2011/0252357 A1 | 10/2011 | Chaudhri |
| 2011/0252364 A1 | 10/2011 | Anzures et al. |
| 2011/0252368 A1 | 10/2011 | Anzures et al. |
| 2011/0252369 A1 | 10/2011 | Chaudhri |
| 2011/0252370 A1 | 10/2011 | Chaudhri |
| 2011/0252376 A1 | 10/2011 | Chaudhri |
| 2011/0252377 A1 | 10/2011 | Anzures et al. |
| 2011/0252380 A1 | 10/2011 | Chaudhri |
| 2011/0252381 A1 | 10/2011 | Chaudhri |
| 2011/0258582 A1 | 10/2011 | Bang |
| 2011/0261030 A1 | 10/2011 | Bullock |
| 2011/0275358 A1 | 11/2011 | Faenger |
| 2011/0281568 A1 | 11/2011 | Le Clech |
| 2011/0291945 A1 | 12/2011 | Ewing, Jr. et al. |
| 2011/0295879 A1 | 12/2011 | Logis et al. |
| 2011/0296333 A1 | 12/2011 | Bateman et al. |
| 2011/0296344 A1 | 12/2011 | Habib et al. |
| 2011/0307778 A1 | 12/2011 | Tsai et al. |
| 2011/0314398 A1 | 12/2011 | Yano |
| 2012/0023438 A1 | 1/2012 | Xia et al. |
| 2012/0023462 A1 | 1/2012 | Rosing et al. |
| 2012/0084644 A1 | 4/2012 | Robert et al. |
| 2012/0096069 A1 | 4/2012 | Chan |
| 2012/0096076 A1 | 4/2012 | Chan |
| 2012/0096344 A1 | 4/2012 | Ho et al. |
| 2012/0096386 A1 | 4/2012 | Baumann et al. |
| 2012/0102387 A1 | 4/2012 | Badoiu et al. |
| 2012/0105225 A1* | 5/2012 | Valtonen ............... G01S 19/47 340/539.13 |
| 2012/0121185 A1 | 5/2012 | Zavesky |
| 2012/0129496 A1 | 5/2012 | Park et al. |
| 2012/0131470 A1 | 5/2012 | Wessling et al. |

(56) References Cited

U.S. PATENT DOCUMENTS

| | | |
|---|---|---|
| 2012/0143694 A1 | 6/2012 | Zargahi et al. |
| 2012/0159373 A1 | 6/2012 | Archer et al. |
| 2012/0166950 A1 | 6/2012 | Frumar et al. |
| 2012/0179970 A1 | 7/2012 | Hayes |
| 2012/0185467 A1* | 7/2012 | Prager .................. G06F 16/30 707/722 |
| 2012/0192068 A1 | 7/2012 | Migos et al. |
| 2012/0192102 A1 | 7/2012 | Migos et al. |
| 2012/0192118 A1 | 7/2012 | Migos et al. |
| 2012/0214552 A1 | 8/2012 | Sirpal et al. |
| 2012/0223890 A1 | 9/2012 | Borovsky et al. |
| 2012/0240085 A1 | 9/2012 | Sim et al. |
| 2012/0274550 A1 | 11/2012 | Campbell et al. |
| 2012/0284673 A1 | 11/2012 | Lamb et al. |
| 2012/0290657 A1 | 11/2012 | Parks et al. |
| 2012/0290943 A1 | 11/2012 | Toney et al. |
| 2013/0005487 A1 | 1/2013 | Frazzini et al. |
| 2013/0041790 A1 | 2/2013 | Murugesan et al. |
| 2013/0046893 A1 | 2/2013 | Hauser et al. |
| 2013/0050263 A1 | 2/2013 | Khoe et al. |
| 2013/0054697 A1 | 2/2013 | Cha et al. |
| 2013/0080525 A1 | 3/2013 | Aoki et al. |
| 2013/0102281 A1 | 4/2013 | Kanda et al. |
| 2013/0111342 A1 | 5/2013 | Alameh et al. |
| 2013/0120254 A1 | 5/2013 | Mun et al. |
| 2013/0145303 A1 | 6/2013 | Prakash et al. |
| 2013/0151959 A1* | 6/2013 | Flynn, III .............. G06Q 50/01 715/702 |
| 2013/0159930 A1 | 6/2013 | Paretti et al. |
| 2013/0173699 A1 | 7/2013 | Parks et al. |
| 2013/0185642 A1* | 7/2013 | Gammons ............ G06F 3/0482 715/733 |
| 2013/0191911 A1 | 7/2013 | Dellinger et al. |
| 2013/0212212 A1 | 8/2013 | Addepalli et al. |
| 2013/0232445 A1 | 9/2013 | Ording et al. |
| 2013/0283199 A1 | 10/2013 | Selig et al. |
| 2013/0298024 A1 | 11/2013 | Rhee et al. |
| 2013/0318158 A1 | 11/2013 | Teng et al. |
| 2013/0318249 A1 | 11/2013 | McDonough et al. |
| 2013/0325967 A1 | 12/2013 | Parks et al. |
| 2014/0013271 A1 | 1/2014 | Moore et al. |
| 2014/0032706 A1 | 1/2014 | Kuscher et al. |
| 2014/0047020 A1 | 2/2014 | Matus et al. |
| 2014/0047382 A1 | 2/2014 | Kim |
| 2014/0068477 A1 | 3/2014 | Roh |
| 2014/0082136 A1 | 3/2014 | Garcia Puga et al. |
| 2014/0101597 A1 | 4/2014 | Bamford et al. |
| 2014/0122730 A1 | 5/2014 | Burch et al. |
| 2014/0136481 A1 | 5/2014 | Quan et al. |
| 2014/0149884 A1 | 5/2014 | Flynn, III et al. |
| 2014/0165012 A1 | 6/2014 | Shen et al. |
| 2014/0168696 A1 | 6/2014 | Matsuhara et al. |
| 2014/0171064 A1 | 6/2014 | Das |
| 2014/0173447 A1 | 6/2014 | Das |
| 2014/0173517 A1 | 6/2014 | Chaudhri |
| 2014/0282240 A1 | 9/2014 | Flynn, III |
| 2014/0320387 A1 | 10/2014 | Eriksson et al. |
| 2014/0320425 A1 | 10/2014 | Jeong et al. |
| 2014/0325447 A1 | 10/2014 | Jin et al. |
| 2014/0351722 A1 | 11/2014 | Frederickson et al. |
| 2014/0359637 A1 | 12/2014 | Yan |
| 2014/0375577 A1 | 12/2014 | Yeh et al. |
| 2014/0380187 A1 | 12/2014 | Gardenfors et al. |
| 2015/0049591 A1 | 2/2015 | Adams et al. |
| 2015/0098309 A1 | 4/2015 | Adams et al. |
| 2015/0163188 A1 | 6/2015 | Faaborg et al. |
| 2015/0169146 A1 | 6/2015 | Lalwani |
| 2015/0169182 A1 | 6/2015 | Khoe et al. |
| 2015/0177927 A1 | 6/2015 | Chaudhri |
| 2015/0193069 A1 | 7/2015 | Di Censo et al. |
| 2015/0193392 A1 | 7/2015 | Greenblatt et al. |
| 2015/0309689 A1 | 10/2015 | Jin et al. |
| 2015/0324067 A1* | 11/2015 | Cabral .................. G06F 3/0338 715/811 |
| 2015/0331571 A1 | 11/2015 | Chaudhri |
| 2015/0332031 A1* | 11/2015 | Mistry .................. G06F 21/316 726/19 |
| 2015/0339007 A1* | 11/2015 | Yoshizawa ............ G06F 3/0482 715/739 |
| 2015/0339466 A1 | 11/2015 | Gao et al. |
| 2015/0347010 A1 | 12/2015 | Yang et al. |
| 2015/0350296 A1 | 12/2015 | Yang et al. |
| 2015/0350297 A1 | 12/2015 | Yang et al. |
| 2015/0370529 A1* | 12/2015 | Zambetti ................ G06F 1/1694 345/156 |
| 2016/0048296 A1 | 2/2016 | Gan et al. |
| 2016/0059864 A1* | 3/2016 | Feit ........................ B60K 35/00 701/36 |
| 2016/0062567 A1 | 3/2016 | Yang et al. |
| 2016/0065708 A1 | 3/2016 | Yang et al. |
| 2016/0170608 A1 | 6/2016 | Zannbetti et al. |
| 2016/0306328 A1 | 10/2016 | Ko et al. |
| 2016/0327911 A1 | 11/2016 | Eim et al. |
| 2018/0329586 A1 | 11/2018 | Sundstrom et al. |

FOREIGN PATENT DOCUMENTS

| | | |
|---|---|---|
| CN | 1955906 A | 5/2007 |
| CN | 101226444 A | 7/2008 |
| CN | 201107762 Y | 8/2008 |
| CN | 101356493 A | 1/2009 |
| CN | 101409743 A | 4/2009 |
| CN | 101535938 A | 9/2009 |
| CN | 102037435 A | 4/2011 |
| CN | 102099776 A | 6/2011 |
| CN | 102262506 A | 11/2011 |
| CN | 102707994 A | 10/2012 |
| CN | 102750086 A | 10/2012 |
| CN | 103250138 A | 8/2013 |
| CN | 103582873 A | 2/2014 |
| DE | 212009000073 U1 | 2/2011 |
| DE | 202009018283 U1 | 8/2011 |
| DE | 112009001281 T5 | 9/2011 |
| DE | 112009001276 T5 | 1/2012 |
| EP | 483777 A2 | 5/1992 |
| EP | 584392 A1 | 3/1994 |
| EP | 1215575 A2 | 6/2002 |
| EP | 1517228 A2 | 3/2005 |
| EP | 1760584 A1 | 3/2007 |
| EP | 2151745 A2 | 2/2010 |
| EP | 2286324 A2 | 2/2011 |
| EP | 2286325 A2 | 2/2011 |
| EP | 2725473 A1 | 4/2014 |
| EP | 2770708 A1 | 8/2014 |
| EP | 3091421 A2 | 11/2016 |
| GB | 2473389 A | 3/2011 |
| GB | 2474153 A | 4/2011 |
| GB | 2492709 A | 1/2013 |
| JP | 6-110881 A | 4/1994 |
| JP | 7-325700 A | 12/1995 |
| JP | 8-76926 A | 3/1996 |
| JP | 10-240488 A | 9/1998 |
| JP | 2000-40158 A | 2/2000 |
| JP | 2000-148348 A | 5/2000 |
| JP | 2000-200092 A | 7/2000 |
| JP | 2000-242390 A | 9/2000 |
| JP | 2001-101202 A | 4/2001 |
| JP | 2002-286489 A | 10/2002 |
| JP | 2003-195998 A | 7/2003 |
| JP | 2003-526820 A | 9/2003 |
| JP | 2004-152169 A | 5/2004 |
| JP | 2005-45744 A | 2/2005 |
| JP | 2005-309933 A | 11/2005 |
| JP | 2008-276801 A | 11/2008 |
| JP | 2009-80710 A | 4/2009 |
| JP | 2009-296577 A | 12/2009 |
| JP | 2010-97353 A | 4/2010 |
| JP | 2010-511939 A | 4/2010 |
| JP | 2010-522935 A | 7/2010 |
| JP | 2010-245940 A | 10/2010 |
| JP | 2012-168966 A | 9/2012 |
| JP | 2013-93699 A1 | 5/2013 |
| JP | 2014-503861 A | 2/2014 |

(56) References Cited

FOREIGN PATENT DOCUMENTS

| | | |
|---|---|---|
| JP | 2015-520456 A | 7/2015 |
| KR | 10-2008-0057326 A | 6/2008 |
| KR | 10-2008-0078108 A | 8/2008 |
| KR | 10-2010-0010302 A | 2/2010 |
| KR | 10-2010-0023637 A | 3/2010 |
| KR | 10-2010-0034608 A | 4/2010 |
| KR | 10-2013-0063019 A | 6/2013 |
| KR | 10-2013-0075783 A | 7/2013 |
| KR | 10-2013-0082190 A | 7/2013 |
| TW | 201415345 A | 4/2014 |
| TW | 201416959 A | 5/2014 |
| WO | 2005/109829 A1 | 11/2005 |
| WO | 2006/048028 A1 | 5/2006 |
| WO | 2007/002621 A2 | 1/2007 |
| WO | 2007/102110 A2 | 9/2007 |
| WO | 2008/067498 A2 | 6/2008 |
| WO | 2008/090902 A1 | 7/2008 |
| WO | 2009/143075 A2 | 11/2009 |
| WO | 2009/143076 A2 | 11/2009 |
| WO | 2010/134729 A2 | 11/2010 |
| WO | 2012/028773 A1 | 3/2012 |
| WO | 2012/051052 A1 | 4/2012 |
| WO | 2012/103117 A1 | 8/2012 |
| WO | 2012/126078 A1 | 9/2012 |
| WO | 2013/132144 A1 | 9/2013 |
| WO | 2013/173838 A2 | 11/2013 |
| WO | 2014/197279 A1 | 12/2014 |
| WO | 2015/192085 A2 | 12/2015 |
| WO | 2016/022204 A1 | 2/2016 |

OTHER PUBLICATIONS

Advisory Action received for U.S. Appl. No. 10/179,775, dated Oct. 14, 2010, 2 pages.
Advisory Action received for U.S. Appl. No. 10/179,775, dated Sep. 15, 2009, 2 pages.
Benge et al., "Designing Custom Controls", Spring U.S.A., 1993, pp. 72-85.
Final Office Action received for U.S. Appl. No. 10/179,775, dated Apr. 5, 2006, 14 pages.
Final Office Action received for U.S. Appl. No. 10/179,775, dated Aug. 16, 2013, 12 pages.
Final Office Action received for U.S. Appl. No. 10/179,775, dated Jul. 8, 2009, 11 pages.
Final Office Action received for U.S. Appl. No. 10/179,775, dated Jun. 22, 2010, 13 pages.
Final Office Action received for U.S. Appl. No. 10/179,775, dated May 22, 2015, 15 pages.
Final Office Action received for U.S. Appl. No. 10/179,775, dated Oct. 8, 2008, 12 pages.
King, Adrian, "Inside Windows 95", Microsoft Press., Aug. 1994, pp. 176-182.
Harris, et al., "Inside WordPerfect 6 for Windows", New Riders Publishing, 1994, pp. 1104-1107.
International Search Report received for PCT Patent Application No. PCT/US95/11025, dated Jan. 3, 1996, 3 pages.
"Microsoft Windows 3.1", available at:- http://www.guidebookgallery.org/screenshots/win31, 1992, pp. 1-31.
Non Final Office Action received for U.S. Appl. No. 10/179,775, dated Aug. 14, 2014, 13 pages.
Non Final Office Action received for U.S. Appl. No. 10/179,775, dated Dec. 23, 2009, 13 pages.
Non Final Office Action received for U.S. Appl. No. 10/179,775, dated Dec. 23, 2015, 14 pages.
Non Final Office Action received for U.S. Appl. No. 10/179,775, dated Jan. 22, 2009, 11 pages.
Non Final Office Action received for U.S. Appl. No. 10/179,775, dated Jul. 7, 2007, 12 pages.
Non Final Office Action received for U.S. Appl. No. 10/179,775, dated Mar. 14, 2008, 11 pages.
Non Final Office Action received for U.S. Appl. No. 10/179,775, dated Mar. 28, 2013, 11 pages.
Non Final Office Action received for U.S. Appl. No. 10/179,775, dated Oct. 12, 2005, 16 Pages.
Notice of Allowance received for U.S. Appl. No. 10/179,775, dated Aug. 24, 2017, 3 pages.
Notice of Allowance received for U.S. Appl. No. 10/179,775, dated Jul. 13, 2017, 11 pages.
Written Opinion received for PCT Patent Application No. PCT/US95/11025, dated Oct. 4, 1996.
Advisory Action received for U.S. Appl. No. 12/890,499, dated Jan. 11, 2016, 3 pages.
Advisory Action received for U.S. Appl. No. 13/077,850, dated Apr. 24, 2014, 3 pages.
Advisory Action received for U.S. Appl. No. 13/077,855, dated Jun. 15, 2016, 4 pages.
Advisory Action received for U.S. Appl. No. 13/077,862, dated Apr. 7, 2016, 3 pages.
Advisory Action received for U.S. Appl. No. 13/077,874, dated Aug. 19, 2016, 3 pages.
Advisory Action received for U.S. Appl. No. 14/183,316, dated Dec. 9, 2016, 3 pages.
Advisory Action received for U.S. Appl. No. 14/599,339, dated Nov. 8, 2016, 4 pages.
Wolfe, Joanna, "Annotation Technologies: A Software and Research Review", Computers and Composition, vol. 19, No. 4, 2002, pp. 471-497.
Australian Examination Report received for Australian Patent Application No. 2012209199, dated Dec. 17, 2015, 3 pages.
Chapter 13: "Menus, Apple Human Interface Guidelines", available at <https://developer.apple.com/library/mac/documentation/UserExperience/Conceptual/OSXHIGuidelines/index.html>, retrieved on Aug. 20, 2009, pp. 165-190.
Decision to Grant received for European Patent Application No. 10799259.6, dated Aug. 31, 2017, 2 pages.
Evaluation Report for Utility Model Patent received for Chinese Patent Application No. 201620051290.7, completed on Sep. 19, 2016, 11 pages (6 pages of English translation and 5 pages of Official Copy).
Extended European Search Report received for European Patent Application No. 15186629.0, dated Nov. 12, 2015, 9 pages.
Final Office Action received for U.S. Appl. No. 14/183,347, dated Dec. 18, 2015, 6 pages.
Final Office Action received for U.S. Appl. No. 14/599,339, dated May 9, 2016, 20 pages.
Final Office Action received for U.S. Appl. No. 14/814,420, dated Mar. 24, 2016, 18 pages.
Final Office Action received for U.S. Appl. No. 12/843,814, dated Apr. 23, 2015, 28 pages.
Final Office Action received for U.S. Appl. No. 12/843,814, dated Jan. 31, 2014, 20 pages.
Final Office Action received for U.S. Appl. No. 12/843,814, dated Nov. 14, 2012, 13 pages.
Final Office Action received for U.S. Appl. No. 12/888,381, dated Nov. 19, 2012, 14 pages.
Final Office Action received for U.S. Appl. No. 12/888,382, dated Nov. 15, 2012, 11 pages.
Final Office Action received for U.S. Appl. No. 12/888,384, dated Nov. 7, 2012, 14 pages.
Final Office Action received for U.S. Appl. No. 12/888,386, dated Nov. 8, 2012, 13 pages.
Final Office Action received for U.S. Appl. No. 12/888,389, dated Sep. 12, 2013, 9 pages.
Final Office Action received for U.S. Appl. No. 12/890,472, dated Feb. 6, 2013, 10 pages.
Final Office Action received for U.S. Appl. No. 12/890,482, dated Sep. 12, 2013, 10 pages.
Final Office Action received for U.S. Appl. No. 12/890,489, dated Aug. 14, 2013, 9 pages.
Final Office Action received for U.S. Appl. No. 12/890,499, dated Jul. 8, 2013, 17 pages.
Final Office Action received for U.S. Appl. No. 12/890,499, dated May 22, 2017, 17 pages.

(56) References Cited

OTHER PUBLICATIONS

Final Office Action received for U.S. Appl. No. 12/890,499, dated Oct. 19, 2015, 14 pages.
Final Office Action received for U.S. Appl. No. 13/077,850, dated Nov. 7, 2013, 14 pages.
Final Office Action received for U.S. Appl. No. 13/077,855, dated Mar. 17, 2014, 11 pages.
Final Office Action received for U.S. Appl. No. 13/077,855, dated Nov. 7, 2013, 14 pages.
Final Office Action received for U.S. Appl. No. 13/077,862, dated Nov. 8, 2013, 15 pages.
Final Office Action received for U.S. Appl. No. 13/077,862, dated Oct. 22, 2015, 16 pages.
Final Office Action received for U.S. Appl. No. 13/077,867, dated May 23, 2013, 10 pages.
Final Office Action received for U.S. Appl. No. 13/077,874, dated Dec. 3, 2014, 23 pages.
Final Office Action received for U.S. Appl. No. 13/077,874, dated May 5, 2016, 26 pages.
Final Office Action received for U.S. Appl. No. 13/333,909, dated Dec. 5, 2013, 24 pages.
Final Office Action received for U.S. Appl. No. 14/183,316, dated Jun. 16, 2016, 20 pages.
Final Office Action received for U.S. Appl. No. 14/641,289, dated Jul. 1, 2016, 32 pages.
Final Office Action received for U.S. Appl. No. 13/077,855, dated Mar. 24, 2016, 19 pages.
G Pad, "LG's Latest Uls That Shine More Lightly on the G-Pad", online available at: http://bungq.com/1014, Nov. 19, 2013, 38 pages (2 pages of English Translation and 36 pages of Official Copy).
Chan, Christine, "Handoff Your Browser to Your iPhone or iPad! Plus a Chance to Win a Copy!", Apr. 12, 2011, 2 pages.
Intention to Grant received for European Patent Application No. 10799259.6, dated Apr. 20, 2017, 8 pages.
International Preliminary Report on Patentability received for PCT Patent Application No. PCT/US2010/050057, dated Oct. 9, 2012, 6 pages.
International Preliminary Report on Patentability received for PCT Patent Application No. PCT/US2010/062314, dated Jul. 10, 2012, 14 pages.
International Preliminary Report on Patentability received for PCT Patent Application No. PCT/US2012/022401, dated Aug. 8, 2013, 12 pages.
International Preliminary Report on Patentability received for PCT Patent Application No. PCT/US2015/019306, dated Dec. 15, 2016, 10 pages.
International Preliminary Report on Patentability Received for PCT Patent Application No. PCT/US2015/019309, dated Dec. 15, 2016, 10 pages.
International Search Report and Written Opinion received for PCT Application No. PCT/US2015/019309, dated Jun. 25, 2015, 15 pages.
International Search Report and Written Opinion received for PCT Patent Application No. PCT/US2010/050057, dated Dec. 10, 2010, 9 pages.
International Search Report and Written Opinion received for PCT Patent Application No. PCT/US2010/062314, dated Jun. 22, 2011, 17 pages.
International Search Report and Written Opinion received for PCT Patent Application No. PCT/US2012/022401, dated Jul. 6, 2012, 16 pages.
International Search Report and Written Opinion received for PCT Patent Application No. PCT/US2015/019306, dated Jun. 17, 2015, 15 pages.
Invitation to Pay Additional Fee received for PCT Patent Application No. PCT/US2017/035326, dated Aug. 7, 2017, 2 pages.
Invitation to Pay Additional Fees received for PCT Patent Application No. PCT/US2012/022401, dated May 4, 2012, 8 pages.
"iPhone People", Autumn-Winter, Oct. 29, 2010, 3 pages of Official Copy only (See Communication under 37 CFR § 1.98(a) (3)).

"iPhone User Guide for iPhone and iPhone 3G", available at <http://manuals.info.apple.com/en_US/iPhone_User_Guide.pdf>, Jul. 11, 2008, 154 pages.
"iPhone User's Guide", Available at <http://mesnotices.20minutes.fr/manuel-notice-mode-emploi/APPLE/IPHONE%2D%5FE#>, Retrieved on Jun. 2007, 137 pages.
Kimura, Ryoji, "Keynote presentation practice guide for iPad & iPhone", K.K. Rutles, first edition, Feb. 29, 2012, 4 pages of Official Copy only (See Communication under 37 CFR § 1.98(a) (3)).
Kim, et al., "Menu Design in Cell Phones: Use of 3D Menu, Human-computer Interaction", Part 3, vol. 5612, Jul. 19, 2009, pp. 48-57.
Non-Final Office Action received for U.S. Appl. No. 14/456,852, dated Jul. 1, 2015, 19 pages.
Non-Final Office Action received for U.S. Appl. No. 14/641,289, dated Jul. 16, 2015, 31 pages.
Non-Final Office Action received for U.S. Appl. No. 14/641,289, dated Mar. 11, 2016, 26 pages.
Non-Final Office Action received for U.S. Appl. No. 14/641,304, dated Sep. 11, 2017, 18 pages.
Non-Final Office Action received for U.S. Appl. No. 14/183,316, dated Nov. 23, 2015, 17 pages.
Non-Final Office Action received for U.S. Appl. No. 12/789,436, dated Jun. 25, 2012, 23 pages.
Non-Final Office Action received for U.S. Appl. No. 12/843,814, dated Apr. 27, 2012, 26 pages.
Non-Final Office Action received for U.S. Appl. No. 12/843,814, dated May 28, 2013, 17 pages.
Non-Final Office Action received for U.S. Appl. No. 12/843,814, dated Oct. 8, 2014, 14 pages.
Non-Final Office Action received for U.S. Appl. No. 12/888,381, dated Dec. 10, 2013, 13 pages.
Non-Final Office Action received for U.S. Appl. No. 12/888,381, dated May 22, 2012, 18 pages.
Non-Final Office Action received for U.S. Appl. No. 12/888,382, dated Dec. 10, 2013, 12 pages.
Non-Final Office Action received for U.S. Appl. No. 12/888,382, dated May 10, 2012, 9 pages.
Non-Final Office Action received for U.S. Appl. No. 12/888,384, dated May 17, 2012, 15 pages.
Non-Final Office Action received for U.S. Appl. No. 12/888,386, dated May 16, 2012, 11 pages.
Non-Final Office Action received for U.S. Appl. No. 12/888,389, dated Jan. 23, 2013, 11 pages.
Non-Final Office Action received for U.S. Appl. No. 12/890,472, dated Jul. 5, 2012, 9 pages.
Non-Final Office Action received for U.S. Appl. No. 12/890,482, dated Sep. 27, 2012, 11 pages.
Non-Final Office Action received for U.S. Appl. No. 12/890,489, dated Nov. 6, 2014, 22 pages.
Non-Final Office Action received for U.S. Appl. No. 12/890,489, dated Nov. 30, 2012, 8 pages.
Non-Final Office Action received for U.S. Appl. No. 12/890,499, dated Apr. 6, 2015, 14 pages.
Non-Final Office Action received for U.S. Appl. No. 12/890,499, dated Nov. 1, 2016, 16 pages.
Non-Final Office Action received for U.S. Appl. No. 12/890,499, dated Nov. 26, 2012, 12 pages.
Non-Final Office Action received for U.S. Appl. No. 12/890,499, dated Sep. 11, 2014, 11 pages.
Non-Final Office Action received for U.S. Appl. No. 13/077,850, dated Mar. 28, 2013, 15 pages.
Non-Final Office Action received for U.S. Appl. No. 13/077,850, dated Sep. 10, 2015, 14 pages.
Non-Final Office Action received for U.S. Appl. No. 13/077,855, dated Aug. 13, 2015, 13 pages.
Non-Final Office Action received for U.S. Appl. No. 13/077,855, dated Mar. 28, 2013, 15 pages.
Non-Final Office Action received for U.S. Appl. No. 13/077,862, dated Dec. 29, 2014, 11 pages.
Non-Final Office Action received for U.S. Appl. No. 13/077,862, dated Mar. 15, 2013, 10 pages.

(56) References Cited

OTHER PUBLICATIONS

Non-Final Office Action received for U.S. Appl. No. 13/077,867, dated Dec. 21, 2012, 9 pages.
Non-Final Office Action received for U.S. Appl. No. 13/077,867, dated Jul. 20, 2012, 10 pages.
Non-Final Office Action received for U.S. Appl. No. 13/077,874, dated Jun. 19, 2014, 15 pages.
Non-Final Office Action received for U.S. Appl. No. 13/333,909, dated Mar. 19, 2013, 18 pages.
Non-Final Office Action received for U.S. Appl. No. 14/183,316, dated Jan. 20, 2017, 19 pages.
Non-Final Office Action received for U.S. Appl. No. 14/183,347, dated Jul. 7, 2015, 14 pages.
Non-Final Office Action received for U.S. Appl. No. 14/599,339, dated Oct. 7, 2015, 15 pages.
Non-Final Office Action received for U.S. Appl. No. 14/641,298, dated Mar. 6, 2017, 26 pages.
Non-Final Office Action received for U.S. Appl. No. 14/814,420, dated Oct. 7, 2015, 16 pages.
Non-Final Office Action received for U.S. Appl. No. 13/077,874, dated Dec. 3, 2015, 23 pages.
Notice mailed of Acceptance received for Australian Patent Application No. 2010339636, dated Jul. 3, 2014, 2 pages.
Notice mailed of Acceptance received for Australian Patent Application No. 2010350740, dated Jan. 30, 2015, 3 pages.
Notice mailed of Acceptance received for Australian Patent Application No. 2012209199, dated Jan. 27, 2016, 3 pages.
Notice mailed of Acceptance received for Australian Patent Application No. 2015201884, dated Oct. 4, 2016, 3 pages.
Notice of Allowance received for Australian Patent Application No. 2016202837, dated Apr. 21, 2017, 3 Pages.
Notice of Allowance received for Chinese Patent Application No. 201010602688.2, dated May 14, 2015, 2 pages of Official Copy only (See Communication under 37 1.98(a) (3)).
Notice of Allowance received for Chinese Patent Application No. 201080064125.0, dated Sep. 8, 2015, 3 pages (1 pages of English Translation and 2 pages of Official Copy).
Notice of Allowance received for Chinese Patent Application No. 201280006317.5, dated Feb. 17, 2017, 2 Pages (1 pages of English Translation and 1 pages of Official Copy).
Notice of Allowance received for Chinese Patent Application No. 201620051290.7, dated Jun. 22, 2016, 2 Pages (Official Copy only) (See Communication under 37 CFR § 1.98(a) (3)).
Notice of Allowance received for Chinese Patent Application No. 201520364847.8, dated Nov. 5, 2015, 9 pages (7 page of English Translation and 2 pages of Official Copy).
Notice of Allowance received for Japanese Patent Application No. 2013-503722, dated Dec. 8, 2014, 3 pages (Official Copy only) (See Communication under 37 CFR § 1.98(a) (3)).
Notice of Allowance received for Japanese Patent Application No. 2014-263264, dated Aug. 1, 2016, 3 pages (Official Copy only) (See Communication under 37 CFR § 1.98(a) (3)).
Notice of Allowance received for Japanese Patent Application No. 2015-095183, dated Apr. 21, 2017, 3 pages (Official Copy only) (See Communication under 37 CFR § 1.98(a) (3)).
Notice of Allowance received for Korean Patent Application No. 10-2012-7029281, dated Dec. 28, 2015, 3 pages (1 page English Translation and 2 pages of Official Copy).
Notice of Allowance received for Korean Patent Application No. 10-2013-7022057, dated Apr. 27, 2015, 2 pages (Official Copy only) (See Communication under 37 CFR § 1.98(a) (3)).
Notice of Allowance received for Korean Patent Application No. 10-2014-7033660, dated Sep. 25, 2015, 3 pages (1 page of English Translation and 2 pages of Official Copy).
Notice of Allowance received for Korean Patent Application No. 10-2015-7001684, dated Jul. 2, 2015, 3 pages (1 page of English Translation and 2 pages of Official Copy).
Notice of Allowance received for Korean Patent Application No. 10-2015-7013849, dated Mar. 28, 2016, 3 pages (1 page of English Translation and 2 pages of Official Copy).
Notice of Allowance received for Korean Patent Application No. 10-2016-7017508, dated Apr. 27, 2017, 3 pages (1 page of English Translation and 2 pages of Official Copy).
Notice of Allowance Received for Taiwanese Patent Application No. 104117041, dated Feb. 24, 2017, 3 pages (Official Copy only) (See communication under 37 CFR § 1.98(a) (3)).
Notice of Allowance received for U.S. Appl. No. 12/789,436, dated Jan. 7, 2013, 9 pages.
Notice of Allowance received for U.S. Appl. No. 12/843,814, dated Jun. 22, 2016, 13 pages.
Notice of Allowance received for U.S. Appl. No. 12/888,381, dated Apr. 9, 2015, 2 pages.
Notice of Allowance received for U.S. Appl. No. 12/888,381, dated Feb. 17, 2015, 5 pages.
Notice of Allowance received for U.S. Appl. No. 12/888,381, dated Oct. 21, 2014, 10 pages.
Notice of Allowance received for U.S. Appl. No. 12/888,382, dated Feb. 13, 2015, 6 pages.
Notice of Allowance received for U.S. Appl. No. 12/888,382, dated Oct. 31, 2014, 5 pages.
Notice of Allowance received for U.S. Appl. No. 12/888,389, dated Feb. 11, 2015, 15 pages.
Notice of Allowance received for U.S. Appl. No. 12/888,389, dated Sep. 8, 2014, 13 pages.
Notice of Allowance received for U.S. Appl. No. 12/888,391, dated Jun. 15, 2012, 24 pages.
Notice of Allowance received for U.S. Appl. No. 12/890,482, dated May 8, 2014, 5 pages.
Notice of Allowance received for U.S. Appl. No. 12/888,489, dated Jul. 27, 2015, 8 pages.
Notice of Allowance received for U.S. Appl. No. 13/077,850, dated May 5, 2016, 15 pages.
Notice of Allowance received for U.S. Appl. No. 13/077,855, dated Jan. 30, 2017, 7 pages.
Notice of Allowance received for U.S. Appl. No. 13/077,867, dated Mar. 12, 2014, 7 pages.
Notice of Allowance received for U.S. Appl. No. 13/077,867, dated Sep. 18, 2013, 8 pages.
Notice of Allowance received for U.S. Appl. No. 13/077,874, dated Dec. 9, 2016, 2 pages.
Notice of Allowance received for U.S. Appl. No. 13/077,874, dated Nov. 22, 2016, 13 pages.
Notice of Allowance received for U.S. Appl. No. 13/333,909, dated Mar. 31, 2014, 20 pages.
Notice of Allowance received for U.S. Appl. No. 14/183,347, dated Apr. 6, 2016, 7 pages.
Notice of Allowance received for U.S. Appl. No. 14/183,347, dated Apr. 19, 2016, 3 pages.
Notice of Allowance received for U.S. Appl. No. 14/183,347, dated Jul. 15, 2016, 7 pages.
Notice of Allowance Received for U.S. Appl. No. 14/183,347, dated Jun. 3, 2016, 2 pages.
Notice of Allowance Received for U.S. Appl. No. 14/183,347, dated Sep. 29, 2016, 2 pages.
Notice of Allowance received for U.S. Appl. No. 14/456,852, dated Jul. 31, 2015, 8 pages.
Notice of Allowance received for U.S. Appl. No. 14/641,289, dated Aug. 24, 2017, 6 Pages.
Office Action received for Australian Patent Application No. 2015201884, dated Oct. 12, 2015, 4 Pages.
Office Action received for Australian Patent Application No. 2010339636, dated Jun. 19, 2013, 3 pages.
Office Action received for Australian Patent Application No. 2010350740, dated Aug. 8, 2013, 3 pages.
Office Action received for Australian Patent Application No. 2012209199, dated Jan. 15, 2015, 3 pages.
Office Action received for Australian Patent Application No. 2015100490, dated Jun. 9, 2015, 6 pages.
Office Action received for Australian Patent Application No. 2015100490, dated Dec. 15, 2016, 2 pages.
Office Action received for Australian Patent Application No. 2015202565, dated Feb. 24, 2016, 2 pages.

(56) References Cited

OTHER PUBLICATIONS

Office Action received for Australian Patent Application No. 2015230769, dated Aug. 17, 2016, 3 pages.
Office Action received for Australian Patent Application No. 2016202837, dated Jan. 10, 2017, 2 pages.
Office Action received for Chinese Patent Application No. 201010602688.2, dated Jan. 14, 2014, 16 pages (8 pages of English Translation and 8 pages of Official copy).
Office Action received for Chinese Patent Application No. 201010602688,2, dated Sep. 19, 2014, 13 pages (6 pages of English Translation and 7 pages of Official Copy).
Office Action received for Chinese Patent Application No. 201080064125.0, dated Jun. 10, 2014, 8 pages (Official Copy only) (See Communication under 37 CFR § 1.98(a) (3)).
Office Action received for Chinese Patent Application No. 201080064125.0, dated Mar. 11, 2015, 7 pages (2 pages of English Translation and 5 pages of Official Copy).
Office Action received for Chinese Patent Application No. 201280006317.5, dated Jan. 11, 2016, 10 pages (5 pages of English Translation and 5 pages of official Copy).
Office Action received for Chinese Patent Application No. 201280006317.5, dated Jul. 11, 2016, 6 pages (1 page of English Translation and 5 pages of Official Copy).
Office Action received for Danish Patent Application No. PA201570256, dated Jul. 7, 2015, 2 pages.
Office Action received for Danish Patent Application No. PA201570256, dated Mar. 17, 2016, 5 pages.
Office Action received for Danish Patent Application No. PA201570256, dated May 23, 2017, 3 pages.
Office Action received for Danish Patent Application PA201570256, dated Oct. 10, 2016, 3 pages.
Office Action received for European Patent Application No. 10760867.1, dated Aug. 6, 2013, 4 pages.
Office Action received for European Patent Application No. 10760867.1, dated May 28, 2015, 6 pages.
Office Action received for European Patent Application No. 10799259.6, dated Jun. 1, 2015, 9 pages.
Office Action received for Hong Kong Patent Application No. 151051633, dated Jun. 5, 2015, 11 pages (Official Copy only) (See Communication under 37 CFR § 1.98(a) (3).
Office Action received for Japanese Patent Application No. 2013-550664, dated Jun. 10, 2016, 3 pages (Official Copy only) (See Communication under 37 CFR § 1.98(a) (3)).
Office Action received for Japanese Patent Application No. 2013-503722, dated Dec. 6, 2013, 4 pages (2 pages of English Translation and 2 pages of Official copy).
Office Action received for Japanese Patent Application No. 2013-550664, dated Aug. 24, 2015, 9 pages (4 pages of English Translation and 5 pages of Official Copy).
Office Action received for Japanese Patent Application No. 2013-550664, dated Sep. 12, 2014, 10 pages (6 pages of English Translation and 4 pages of Official Copy).
Office Action received for Japanese Patent Application No. 2014-263264, dated Jan. 5, 2016, 8 pages (4 pages of English Translation and 4 pages of Official copy).
Office Action received for Japanese Patent Application No. 2015095183, dated Jun. 3, 2016, 13 pages (6 pages of English Translation and 7 pages of Official copy).
Office Action received for Korean Patent Application No. 10-2012-7029281, dated Jan. 26, 2015, 7 pages (3 pages of English Translation and 4 pages of Official Copy).
Office Action received for Korean Patent Application No. 10-2012-7020548, dated Oct. 10, 2013, 5 pages (Official Copy only) (See Communication under 37 CFR § 1.98(a) (3)).
Office Action received for Korean Patent Application No. 10-2012-7029281, dated Oct. 22, 2014, 6 pages (3 pages of English Translation and 3 pages of Official Copy).
Office Action received for Korean Patent Application No. 10-2013-7022057, dated May 28, 2014, 7 pages (3 pages of English Translation and 4 copies of Official Copy).
Office Action received for Korean Patent Application No. 10-2014-7033660, dated Feb. 23, 2015, 3 pages (Official Copy only) (See Communication under 37 CFR § 1.98(a) (3)).
Office Action received for Korean Patent Application No. 10-2015-0072162, dated Apr. 20, 2016, 11 pages (6 pages of English Translation and 5 pages of Official Copy).
Office Action received for Korean Patent Application No. 10-2015-0072162, dated Feb. 27, 2017, 12 pages (6 pages of English Translation and 6 pages of Official Copy).
Office Action received for Korean Patent Application No. 10-2015-7013849, dated Aug. 20, 2015, 5 pages (2 pages of English Translation and 3 pages of Official Copy).
Office Action received for Korean Patent Application No. 10-2015-7020457, dated Dec. 10, 2015, 8 pages (4 pages of English Translation and 4 pages of Official Copy).
Office Action received for Korean Patent Application No. 10-2015-7020457, dated Oct. 26, 2016, 7 pages (3 pages of English Translation and 4 pages of Official Copy).
Office Action received for Korean Patent Application No. 10-2016-7017508, dated Oct. 20, 2016, 5 pages (2 pages of English Translation and 3 pages of Official Copy).
Office Action received for Taiwanese Patent Application No. 104117041, dated Aug. 22, 2016, 6 pages (3 pages of English Translation and 3 pages of Official Copy).
Office Action received for Taiwanese Patent Application No. 104117042, dated Apr. 20, 2017, 18 pages (7 pages of English Translation and 11 pages of Official Copy).
Nikkei Electronics, "Palm Pre Adopts HTML 5, Considering a Multi Tasking Operation, Nikkei Business Publications", Inc, No. 1010, Aug. 10, 2009, pp. 38-43. (Official Copy only ) (See Communication under 37 CFR § 1.98(a) (3)).
Baig, Ed, "Palm Pre: The Missing Manual, Safari Books", Online, Available at <http://my.safaribooksonline.com/book/operating-systems/0596528264>, Aug. 27, 2009, 16 pages.
Ziegler, Chris, "Palm® Pre.TM. for Dummies®", Oct. 19, 2009, 9 pages.
"QPair", online available at: http://mongri.net/entry/G-Pad-83-0pair, 2013, 22 pages (10 pages of English translation and 12 pages of Official Copy).
Search Report received for Netherlands Patent Application No. 2014737, dated Oct. 29, 2015, 9 pages.
"Stupid Geek Tricks: Tile or Cascade Multiple Windows in Windows 7", Feb. 18, 2010, 3 pages.
Summons to Attend oral proceedings received for European Patent Application No. 10799259.6, dated Aug. 2, 2016, 16 pages.
Fahey, M., "The iPad Blows Up iPhone Apps Real Good", Available at <www.kotaku.com.au/2010/01/the-ipad-blows-up-iphone-apps-real-good/>, Jan. 28, 2010, 3 pages.
Robertson et al., "The Task Gallery: A 3D Window Manager", CHI 2000, Conference Proceedings, Apr. 1-6, 2000, pp. 494-501.
"Topics in CommonSpace Application", Available at <http://www.cuyamaca.net/librarylab/Technical%20Help/cmspace.asp, Retrieved on May 19, 2014, 16 pages.
"UltimateFaves for Android", Available on URL:http:f/web.archive.org/web/20100122231537/http:f/ultimatefaves.wordpress.com/2010/01/12/ultimatefavespro-1-2/, Jan. 22, 2010, pp. 1-10.
HTC, "User manual—PDA Phone—HTC_P3050 Touch", available at <http://web.archive.org/web/20101228223033/http://www.comparecellular.com/images/phones/userguide1130.pdf>, Nov. 2, 2007, pp. 12-28.
HTC, "User Manual—PDA Phone—HTC-P3050 Touch", Available on URL:http://web.archive.org/web/20071102143359/http://www.comparecellular.com/user_guides_manufacturer.asp?I=&ManufacturerID=92, Nov. 2, 2007, pp. 1-38.
Fehily, C., "Visual QuickStart Guide: Microsoft Windows 7", Peachpit Press, Sep. 8, 2009, pp. x, 34-37, 40, 71, 76, and 267.
Windows 7 Aero 3D Trick, Availalble on https://www.youtube.com/watch?v=N7X3LECEKkM, Jan. 17, 2010, 1 page.
Pogue, David, "Windows Vista for Starters: The Missing Manual", available at <http://academic.safaribooksonline.com/book/operating-systems/0596528264>, Jan. 25, 2007, 18 pages.
Office Action received for Australian Patent Application No. 2016266010, dated Aug. 23, 2018, 4 pages.

(56) References Cited

OTHER PUBLICATIONS

International Search Report and Written Opinion received for PCT Patent Application No. PCT/US2017/035326, dated Oct. 5, 2017, 22 pages.
Final Office Action received for U.S. Appl. No. 14/641,298, dated Oct. 4, 2017, 30 pages.
Notice of Allowance received for Japanese Patent Application No. 2016-130565, dated Aug. 28, 2017, 3 pages (Official Copy Only) (See Communication under 37 CFR § 1.98(a) (3)).
Intention to Grant received for European Patent Application No. 12704175.4, dated Mar. 22, 2018, 8 pages.
Office Action received for Chinese Patent Application No. 201510288981.9, dated Jul. 3, 2018, 19 pages (8 pages of English Translation and 11 pages of Official Copy).
Office Action received for Korean Patent Application No. 10-2018-0035949, dated Jun. 20, 2018, 9 pages (4 pages of English Translation and 5 pages of Official Copy).
"Q Pair, Posting of a Blog", Online Available at: <"http://www.leaderyou.co.kr/2595">, Dec. 7, 2013, 24 pages (Official Copy Only) (See Communication under 37 CFR § 1.98(a) (3)).
Notice of Allowance received for Korean Patent Application No. 10-2015-0072162, dated Dec. 27, 2017, 4 pages (2 pages of English Translation and 2 pages of Official copy).
Office Action received for Australian Patent Application No. 2016266010, dated May 4, 2018, 4 pages.
Decision to Grant received for European Patent Application No. 12704175.4, dated Jul. 19, 2018, 2 pages.
Final Office Action received for U.S. Appl. No. 14/641,304, dated Jul. 24, 2018, 19 pages.
Notice of Allowance received for Taiwanese Patent Application No. 106144804, dated Jun. 27, 2018, 6 pages (2 pages of English Translation and 4 pages of Official copy).
Notice of Allowance received for Taiwanese Patent Application No. 104117042, dated Nov. 17, 2017, 5 pages (2 pages of English Translation and 3 pages of Official Copy).
Notice of Allowance received for U.S. Appl. No. 14/641,289, dated Dec. 12, 2017, 5 pages.
Office Action received for Australian Patent Application No. 2016266010, dated Nov. 30, 2017, 5 pages.
Office Action received for European Patent Application No. 15713062.6, dated Dec. 6, 2017, 7 pages.
Extended European Search Report received for European Patent Application No. 18185408.4, dated Oct. 17, 2018, 10 pages.
Esther, "Instructions for Kobo Books: How to change to scrolling mode and do table of contents navigation—Google Groups", XP055513050, Online Available at: <https://groups.google.com/forum/print/msg/viphone/-dkgODh_31N8acJK2dGPe8J?ctz=4607561_48_52_123900_48_436380>, Aug. 28, 2010, 3 pages.
Non-Final Office Action received for U.S. Appl. No. 15/784,806, dated Jan. 4, 2019, 27 pages.
Office Action received for Korean Patent Application No. 10-2018-0035949, dated Dec. 24, 2018, 7 pages (3 pages of English Translation and 4 pages of Official Copy).
MR Analytical, "Samsung Gear S3 App Launcher Widget—App Review", Available Online at <https://www.youtube.com/watch?v=HEfTv17peik>, Dec. 26, 2016, 5 pages.

Trish's World, "Samsung Gear S3 Apps Launcher", Available Online at <https://www.youtube.com/watch?v=zlamYA-4XSQ>, Feb. 5, 2017, 1 page.
International Preliminary Report on Patentability received for PCT Patent Application No. PCT/US2017/035326, dated Dec. 20, 2018, 19 pages.
International Search Report and Written Opinion received for PCT Patent Application No. PCT/US2018/032396, dated Jul. 30, 2018, 13 pages.
Office Action received for Australian Patent Application No. 2016266010, dated Nov. 28, 2018, 5 pages.
Extended European Search Report received for European Patent Application No. 17810737.1, dated Oct. 28, 2019, 11 pages.
Non-Final Office Action received for U.S. Appl. No. 13/077,862, dated Nov. 21, 2019, 18 pages.
Final Office Action received for U.S. Appl. No. 14/641,304, dated Oct. 15, 2019, 21 pages.
Notice of Allowance received for U.S. Appl. No. 13/077,862, dated Sep. 20, 2019, 2 pages.
Office Action received for German Patent Application No. 102015208532.5, dated Aug. 21, 2019, 15 pages (5 pages of English Translation and 10 pages of Official Copy).
Appeal Decision received for U.S. Appl. No. 13/077,862, dated Mar. 22, 2019, 10 pages.
Decision to Grant received for European Patent Application No. 15713062.6, dated Apr. 11, 2019, 2 pages.
Final Office Action received for U.S. Appl. No. 14/641,298, dated May 16, 2019, 50 pages.
Final Office Action received for U.S. Appl. No. 15/784,806, dated May 22, 2019, 38 pages.
Intention to Grant received for European Patent Application No. 15713062.6, dated Mar. 25, 2019, 7 pages.
Non-Final Office Action received for U.S. Appl. No. 14/641,304, dated Feb. 27, 2019, 18 pages.
Notice of Allowance received for Japanese Patent Application No. 2017-101107, dated Jun. 3, 2019, 5 pages (1 page of English Translation and 4 pages of Official Copy).
Notice of Allowance received for U.S. Appl. No. 13/077,862, dated Jun. 20, 2019, 9 pages.
Office Action received for Chinese Patent Application No. 201510288981.9, dated Mar. 6, 2019, 20 pages (10 pages of English Translation and 10 pages of Official Copy).
Office Action received for German Patent Application No. 102015208532.5, dated Apr. 1, 2019, 20 pages (10 pages of English Translation and 10 pages of Official Copy).
Office Action received for Korean Patent Application No. 10-2018-0035949, dated Apr. 24, 2019, 9 pages (4 pages of English Translation and 5 pages of Official Copy).
Office Action received for Chinese Patent Application No. 201710240907.9, dated Jun. 5, 2019, 10 pages (5 pages of English Translation and 5 pages of Official Copy).
Intention to Grant received for European Patent Application No. 15713062.6, dated Oct. 8, 2018, 8 pages.
Non-Final Office Action received for U.S. Appl. No. 14/641,298, dated Sep. 19, 2018, 41 pages.
Office Action received for Japanese Patent Application No. 2017-101107, dated Sep. 7, 2018, 14 pages (7 pages of English Translation and 7 pages of Official Copy).

* cited by examiner

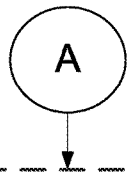

1015
wherein the user input is received while displaying an open application that is the most recently opened application that is not one of the preselected application views, the method further comprising:

1016
further in response to receiving the user input, displaying the adaptive view that corresponds to the most recently opened application that is not one of the preselected application views,

1017
wherein the adaptive view includes an affordance corresponding to adding the adaptive view to the preselected application views, receiving a user input corresponding to selection of the affordance

1018
in response to receiving the user input for selecting the affordance, adding the adaptive view that corresponds to the most recently opened application to the preselected application views

*FIG. 10C*

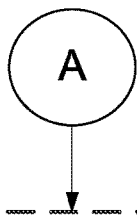

1042
while displaying the plurality of application views of the set of application views, displaying a set of application view indicia, wherein each of the application view indicia corresponds to a respective application view in the set of application views, wherein the application view indicia corresponding to the adaptive view is visually distinguished with respect to the application view indicia corresponding to the preselected application views.

*FIG. 10K*

DISPLAYING AND UPDATING A SET OF APPLICATION VIEWS

CROSS-REFERENCE TO RELATED APPLICATIONS

This application claims priority to U.S. Provisional Patent Application 62/348,849, entitled "DISPLAYING AND UPDATING A SET OF APPLICATION VIEWS", filed on Jun. 10, 2016, the content of which is hereby incorporated by reference in its entirety.

This application relates to the U.S. patent application Ser. No. 15/179,863, entitled "PROVIDING UPDATED APPLICATION DATA FOR PREVIEWING APPLICATIONS ON A DISPLAY," filed on Jun. 10, 2016. This application also relates to the U.S. patent application Ser. No. 15/179,824, entitled "ENHANCED APPLICATION PREVIEW MODE," filed on Jun. 10, 2016. This application also relates to the U.S. patent application Ser. No. 15/179,877, entitled "MEMORY MANAGEMENT FOR APPLICATION LOADING," filed on Jun. 10, 2016. Each of these applications is hereby incorporated by reference in its entirety.

FIELD

The present disclosure relates generally to computer user interfaces, and more specifically to techniques for managing application views.

BACKGROUND

Many modern electronic devices provide the capability to select and open applications for accessing the content and functionality of the applications. Some techniques for selecting and opening applications are based on scrolling through many applications. These techniques can be cumbersome and inefficient.

BRIEF SUMMARY

Some techniques for selecting and opening applications using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present disclosure provides electronic devices with faster, more efficient methods and interfaces for viewing and updating applications views for accessing corresponding applications. Such methods and interfaces optionally complement or replace other methods for selecting and opening applications. Such methods and interfaces reduce the cognitive burden on a user and produce a more efficient human-machine interface. For battery-operated computing devices, such methods and interfaces conserve power and increase the time between battery charges.

In some embodiments, a method, includes, at a device with one or more processors and memory, receiving a user input, the input, when received initiating display of a plurality of application views of a set of application views; and in response to receiving the user input, displaying the plurality of application views of the set of application views, wherein the set of application views includes preselected application views and an adaptive view that corresponds to a most recently opened application that is not one of the preselected application views.

In some embodiments, an electronic device, comprising: a display; one or more processors; one or more input devices; a memory; and one or more programs, wherein the one or more programs are stored in memory and configured to be executed by the one or more processors, the one or more programs including instructions for: receiving a user input, the input, when received initiating display of a plurality of application views of a set of application views; and in response to receiving the user input, displaying the plurality of application views of the set of application views, wherein the set of application views includes preselected application views and an adaptive view that corresponds to a most recently opened application that is not one of the preselected application views.

In some embodiments, a non-transitory computer readable storage medium storing one or more programs, the one or more programs comprising instructions, which when executed by one or more processors of an electronic device with a display and one or more input devices, cause the device to: receive a user input, the input, when received initiating display of a plurality of application views of a set of application views; and in response to receiving the user input, display the plurality of application views of the set of application views, wherein the set of application views includes preselected application views and an adaptive view that corresponds to a most recently opened application that is not one of the preselected application views.

In some embodiments, a transitory computer readable storage medium storing one or more programs, the one or more programs comprising instructions, which when executed by one or more processors of an electronic device with a display and one or more input devices, cause the device to: receive a user input, the input, when received initiating display of a plurality of application views of a set of application views; and in response to receiving the user input, display the plurality of application views of the set of application views, wherein the set of application views includes preselected application views and an adaptive view that corresponds to a most recently opened application that is not one of the preselected application views.

In some embodiments, a method includes, at a device with one or more processors and memory: receiving a first user input, the first user input when received, initiating display of a plurality of application views of a set of application views, wherein the set of application views includes preselected application views, the plurality of application views of the set of application views displayed in a respective first state; automatically determining, without user input, whether a predetermined criteria is met for updating at least one application view of the set of application views to a second state; in accordance with the automatic determination, without user input, that the predetermined criteria is met, updating the at least one application view of the set of application views to the second state; receiving a second user input, the second user input, when received, initiating display of the plurality of application views of the set of application views; and in response to receiving the second user input, displaying the plurality of application views of the set of application views that includes the at least one updated application view updated to the second state.

In some embodiments, an electronic device, comprising: a display; one or more processors; one or more input devices; a memory; and one or more programs, wherein the one or more programs are stored in memory and configured to be executed by the one or more processors, the one or more programs including instructions for: receiving a first user input, the first user input when received, initiating display of a plurality of application views of a set of application views, wherein the set of application views includes preselected application views, the plurality of application views of the set of application views displayed in a respective first state; automatically determining, without user input, whether a predetermined criteria is met for updating at least one application view of the set of application views to a second state; in accordance with the automatic determination, without user input, that the predetermined criteria is met, updating the at least one application view of the set of application views to the second state; receiving a second user input, the second user input, when received, initiating display of the plurality of application views of the set of application views; and in response to receiving the second user input, displaying the plurality of application views of the set of application views that includes the at least one updated application view updated to the second state.

In some embodiments, a non-transitory computer readable storage medium storing one or more programs, the one or more programs comprising instructions, which when executed by one or more processors of an electronic device with a display and one or more input devices, cause the device to: receive a first user input, the first user input when received, initiating display of a plurality of application views of a set of application views, wherein the set of application views includes preselected application views, the plurality of application views of the set of application views displayed in a respective first state; automatically determine, without user input, whether a predetermined criteria is met for updating at least one application view of the set of application views to a second state; in accordance with the automatic determination, without user input, that the predetermined criteria is met, update the at least one application view of the set of application views to the second state; receive a second user input, the second user input, when received, initiate display of the plurality of application views of the set of application views; and in response to receiving the second user input, display the plurality of application views of the set of application views that includes the at least one updated application view updated to the second state.

In some embodiments, a transitory computer readable storage medium storing one or more programs, the one or more programs comprising instructions, which when executed by one or more processors of an electronic device with a display and one or more input devices, cause the device to: receive a first user input, the first user input when received, initiating display of a plurality of application views of a set of application views, wherein the set of application views includes preselected application views, the plurality of application views of the set of application views displayed in a respective first state; automatically determine, without user input, whether a predetermined criteria is met for updating at least one application view of the set of application views to a second state; in accordance with the automatic determination, without user input, that the predetermined criteria is met, update the at least one application view of the set of application views to the second state; receive a second user input, the second user input, when received, initiate display of the plurality of application views of the set of application views; and in response to receiving the second user input, display the plurality of application views of the set of application views that includes the at least one updated application view updated to the second state.

In some embodiments, a method, includes at a device with one or more processors and memory: displaying a watch face; receiving a first user input, the first user input, when received initiating display of a plurality of application views of a set of application views, wherein the set of application views includes preselected application views; in response to receiving the first user input, displaying the plurality of application views of the set of application views; receiving a second user input on an application view of the plurality of displayed application views, the second user input, when received initiating launch of an application corresponding with the application view selected by the second user input; and in response to receiving the second user input, replacing the plurality of displayed application views by displaying a user interface of the launched application.

In some embodiments, an electronic device, comprising: a display; one or more processors; one or more input devices; a memory; and one or more programs, wherein the one or more programs are stored in memory and configured to be executed by the one or more processors, the one or more programs including instructions for: displaying a watch face; receiving a first user input, the first user input, when received initiating display of a plurality of application views of a set of application views, wherein the set of application views includes preselected application views; in response to receiving the first user input, displaying the plurality of application views of the set of application views; receiving a second user input on an application view of the plurality of displayed application views, the second user input, when received initiating launch of an application corresponding with the application view selected by the second user input; and in response to receiving the second user input, replacing the plurality of displayed application views by displaying a user interface of the launched application.

In some embodiments, a non-transitory computer readable storage medium storing one or more programs, the one or more programs comprising instructions, which when executed by one or more processors of an electronic device with a display and one or more input devices, cause the device to: display a watch face; receive a first user input, the first user input, when received initiating display of a plurality of application views of a set of application views, wherein the set of application views includes preselected application views; in response to receiving the first user input, display the plurality of application views of the set of application views; receive a second user input on an application view of the plurality of displayed application views, the second user input, when received initiating launch of an application corresponding with the application view selected by the second user input; and in response to receiving the second user input, replace the plurality of displayed application views by displaying a user interface of the launched application.

In some embodiments, a transitory computer readable storage medium storing one or more programs, the one or more programs comprising instructions, which when executed by one or more processors of an electronic device with a display and one or more input devices, cause the device to: display a watch face; receive a first user input, the first user input, when received initiating display of a plurality of application views of a set of application views, wherein the set of application views includes preselected application views; in response to receiving the first user input, display the plurality of application views of the set of application views; receive a second user input on an application view of the plurality of displayed application views, the second user input, when received initiating launch of an application corresponding with the application view selected by the second user input; and in response to receiving the second user input, replace the plurality of displayed application views by displaying a user interface of the launched application.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for displaying and updating application views, thereby increasing the effectiveness, efficiency, and user satisfaction with such devices. Such methods and interfaces may complement or replace other methods for viewing and updating application views.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for displaying and updating application views that correspond to respective applications. For example, some embodiments of the interfaces and techniques described below provide an efficient and simple user interface for selecting an application for launch. Such techniques can reduce the cognitive burden on a user who browses through various applications and selecting one of the many applications for launch, thereby enhancing productivity. Further, such techniques can reduce processor and battery power otherwise wasted on redundant user inputs.

Figure 15A:
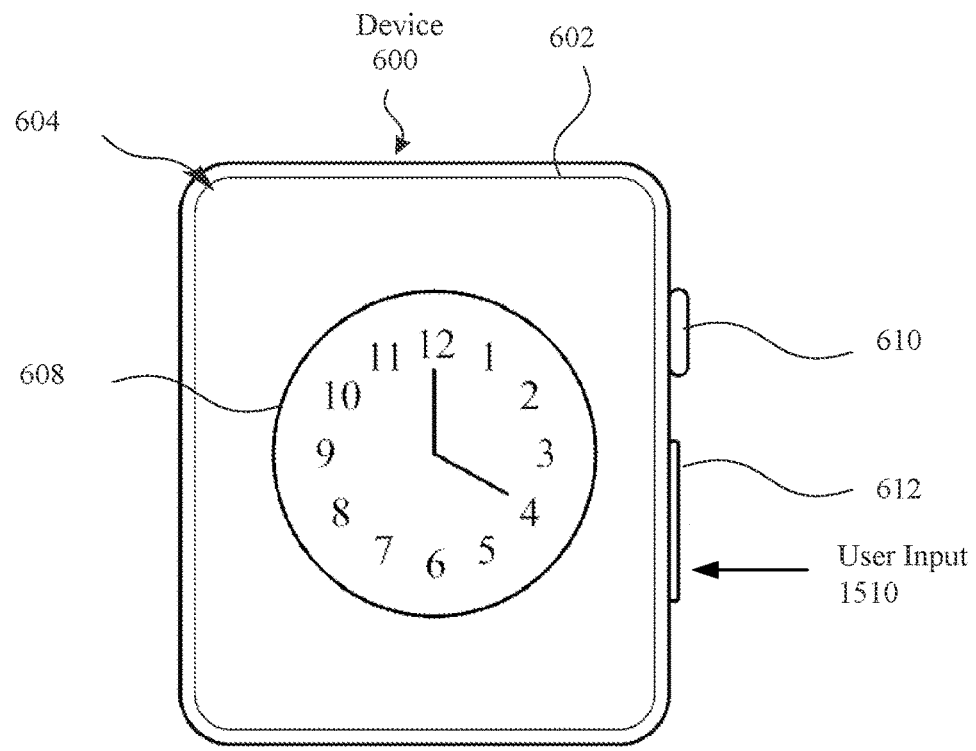
FIGS. 15A-15C illustrate exemplary user interfaces in accordance with some embodiments.
Figure 15B:
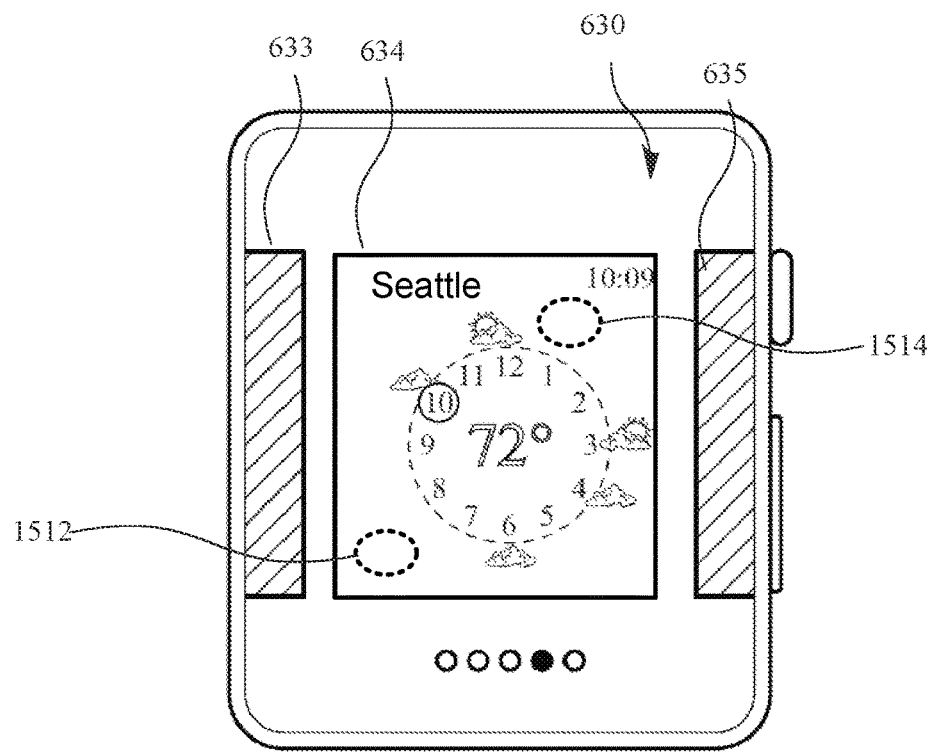
Figure 15C:
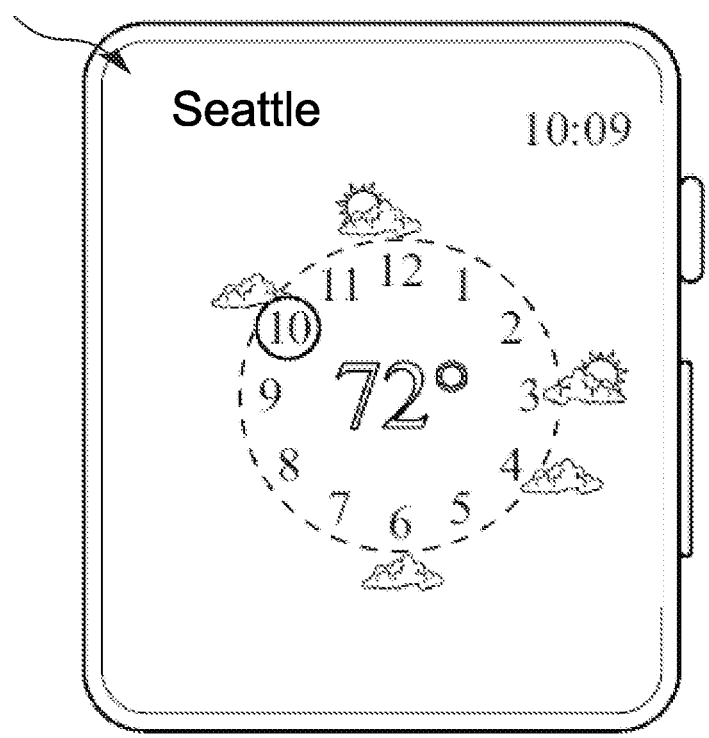
Figure 16:
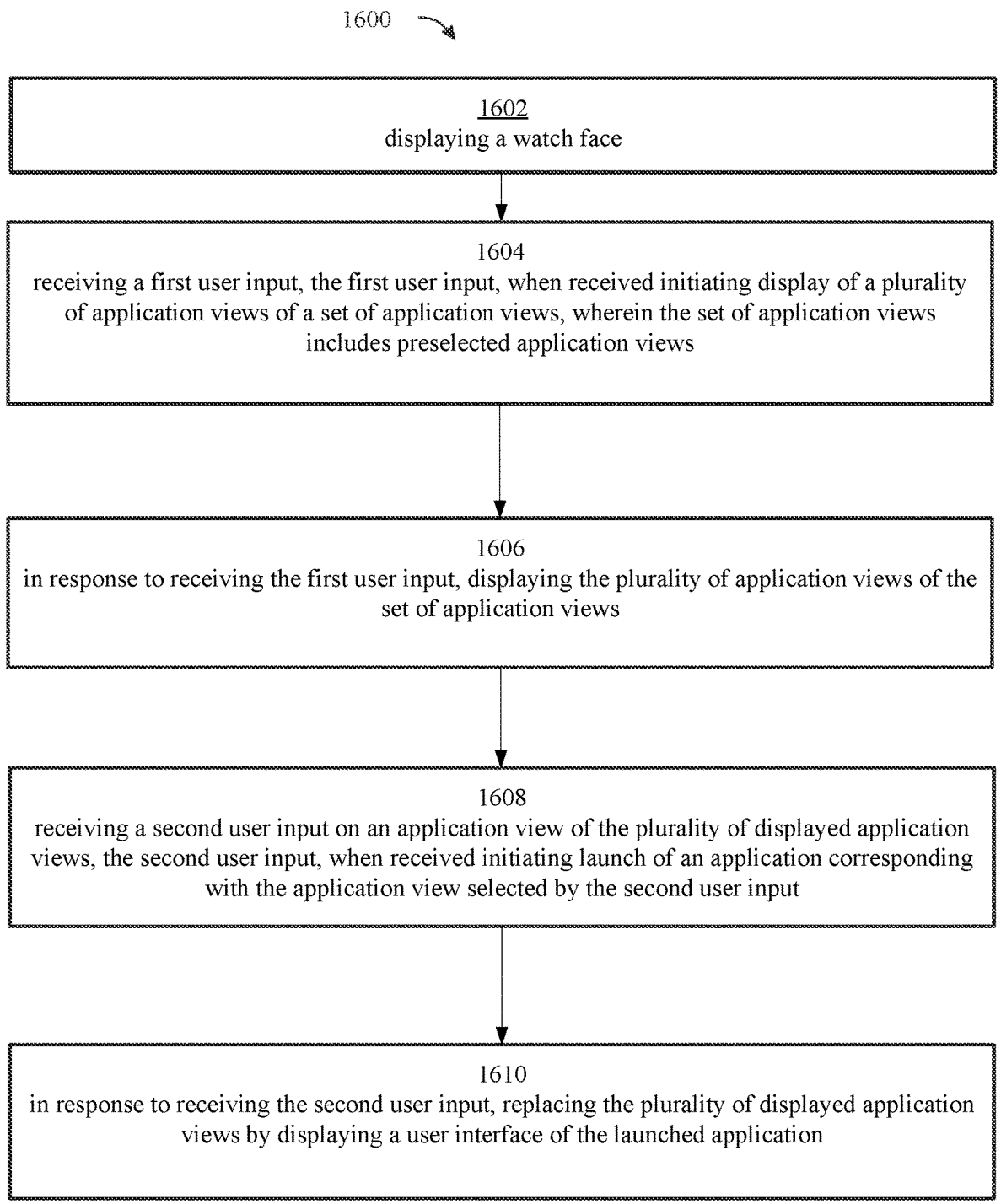
FIG. 16 is a flow diagram illustrating a method for operating an electronic device in accordance with some embodiments.

Below, FIGS. 1A-1B, 2, 3, 4A-4B, and 5A-5H provide a description of exemplary devices for performing the techniques for managing event notifications. FIGS. 6A-9I illustrate exemplary user interfaces for displaying a set of application views. FIGS. 10A-10Q is a flow diagram illustrating methods of displaying a set of application views in accordance with some embodiments. The user interfaces in FIGS. 6A-9I are used to illustrate the processes described below, including the processes in FIGS. 10A-10Q. FIGS. 12A-12G illustrate exemplary user interfaces for updating a set of application views. FIG. 13 is a flow diagram illustrating methods of updating a set of application views in accordance with some embodiments. The user interfaces in FIGS. 12A-12G are used to illustrate the processes described below, including the processes in FIG. 13. FIGS. 15A-15C illustrate exemplary user interfaces for displaying a set of application views. FIG. 16 is a flow diagram illustrating methods of displaying a set of application views in accordance with some embodiments. The user interfaces in FIGS. 15A-15C are used to illustrate the processes described below, including the processes in FIG. 16.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
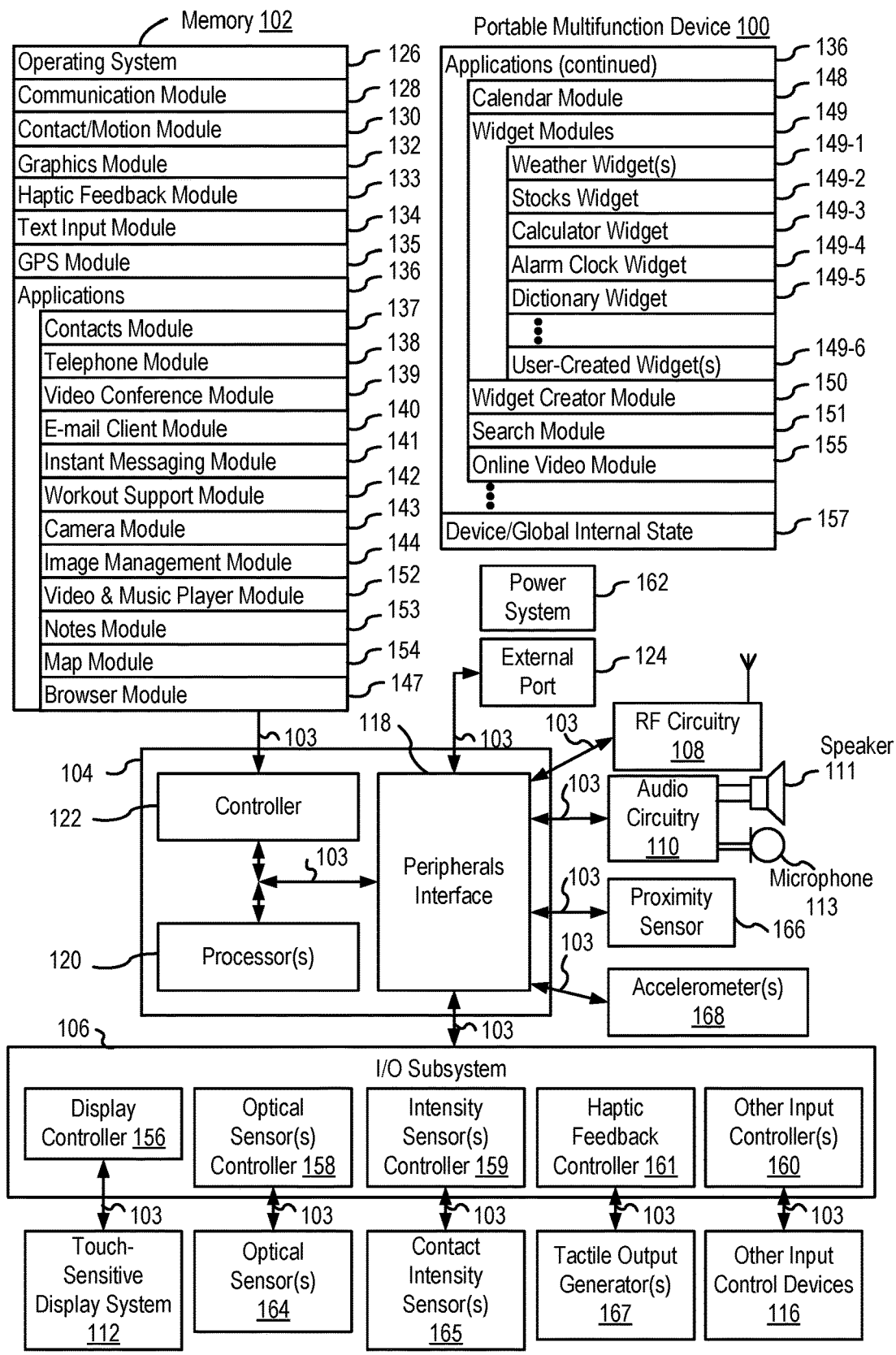
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoW), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
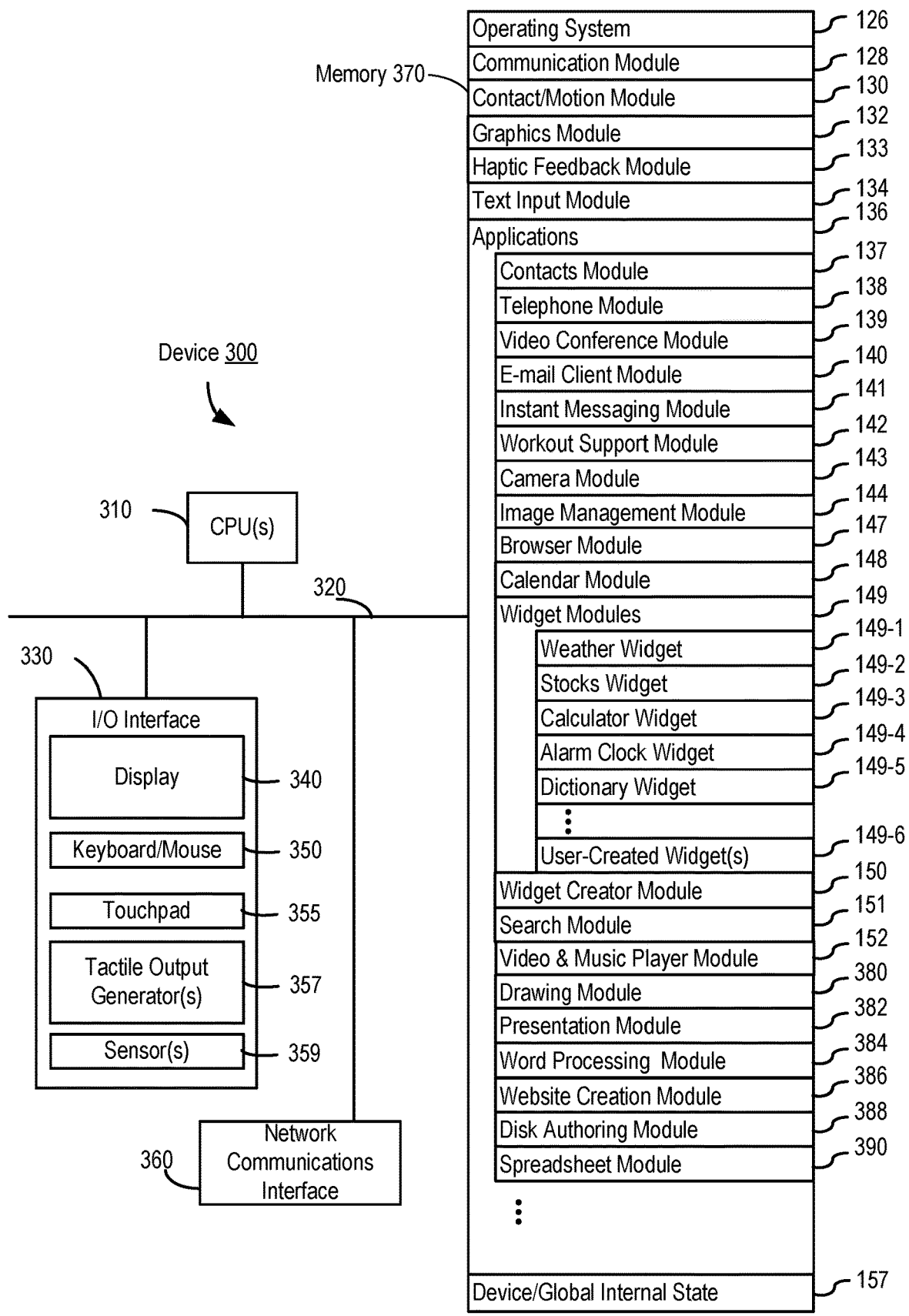
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
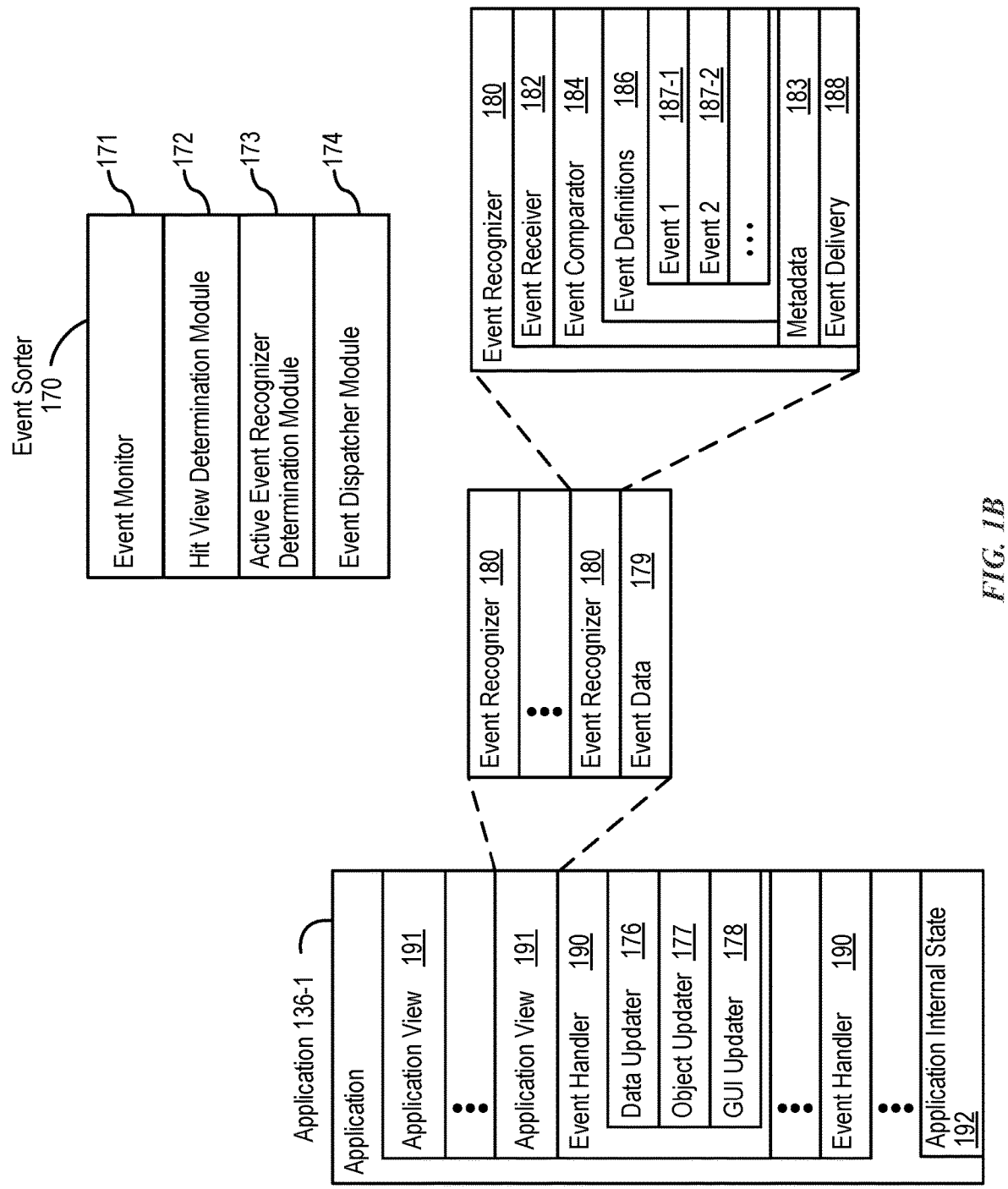
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
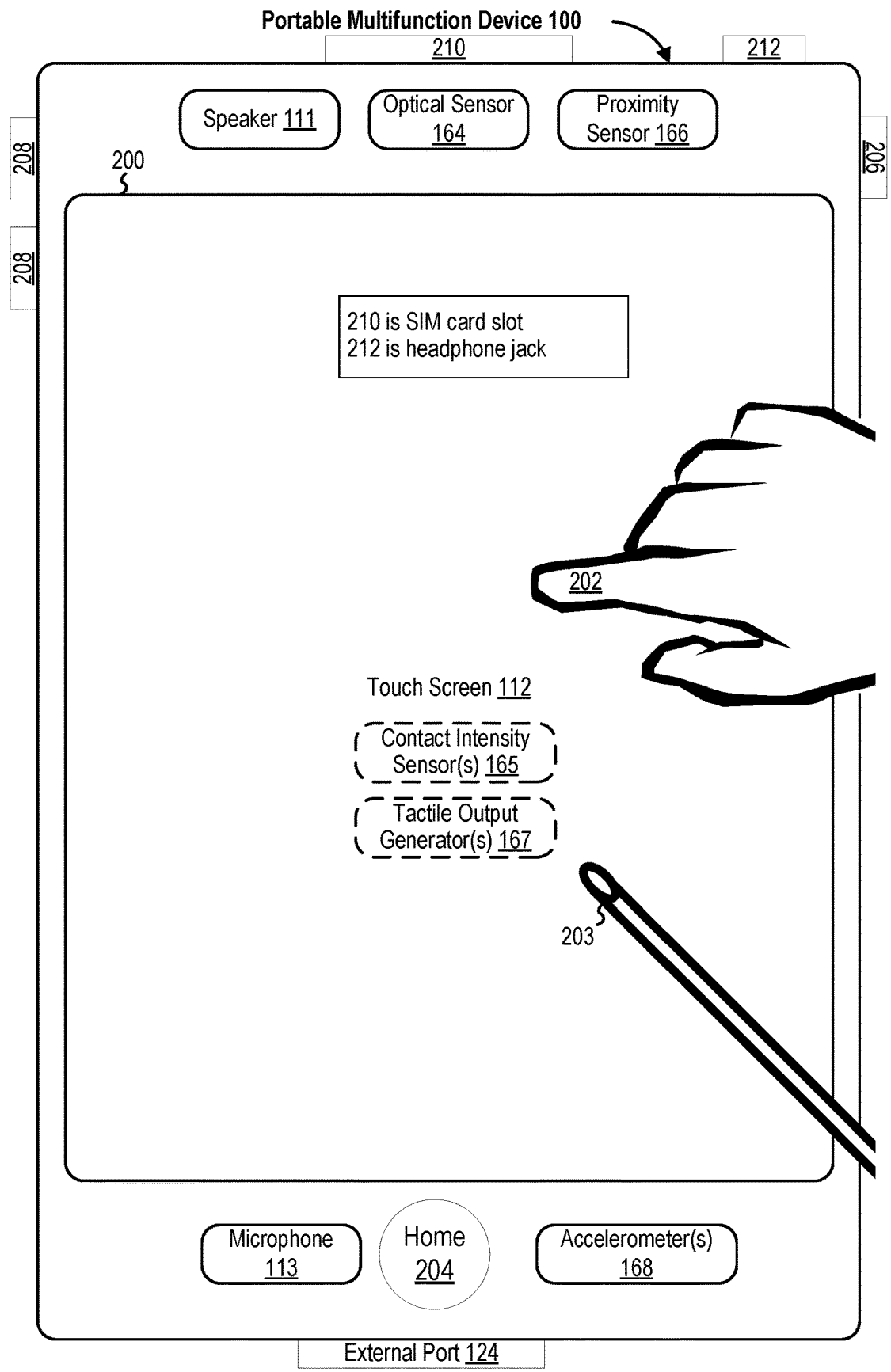
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
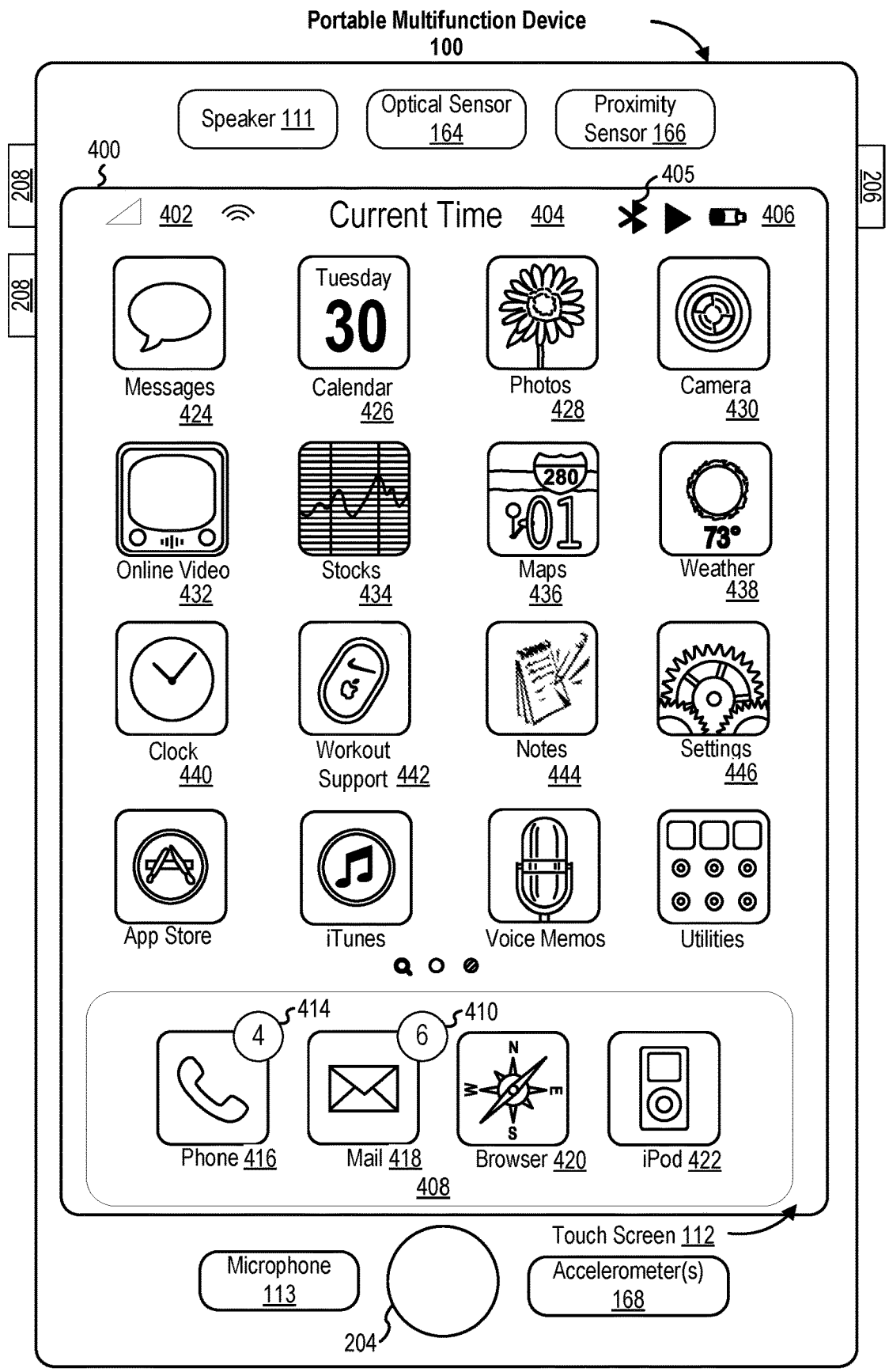
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
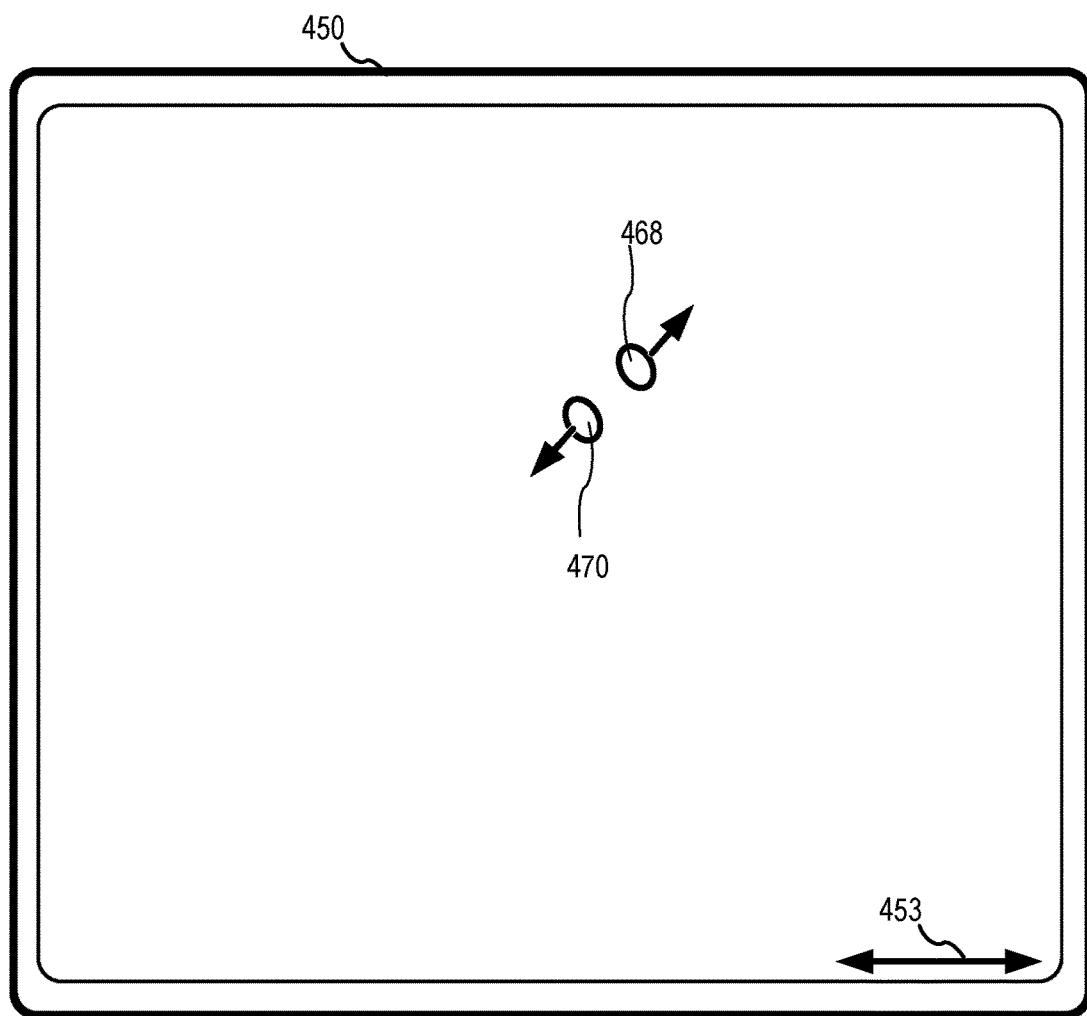
FIG. 4B illustrates an exemplary user interface for a multifunction device with a touch-sensitive surface that is separate from the display in accordance with some embodiments.
Figure 4B:
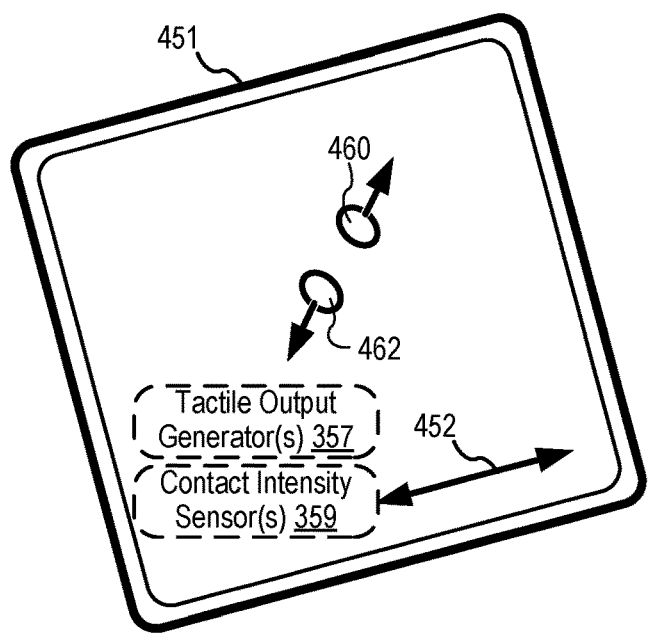

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
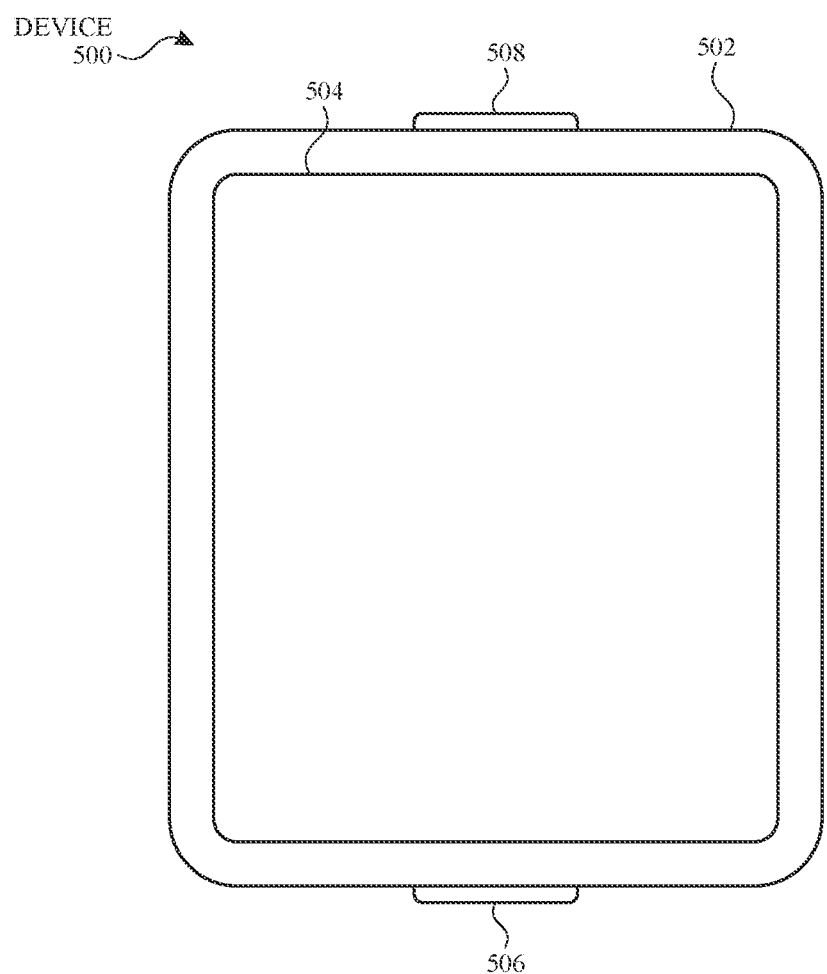
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
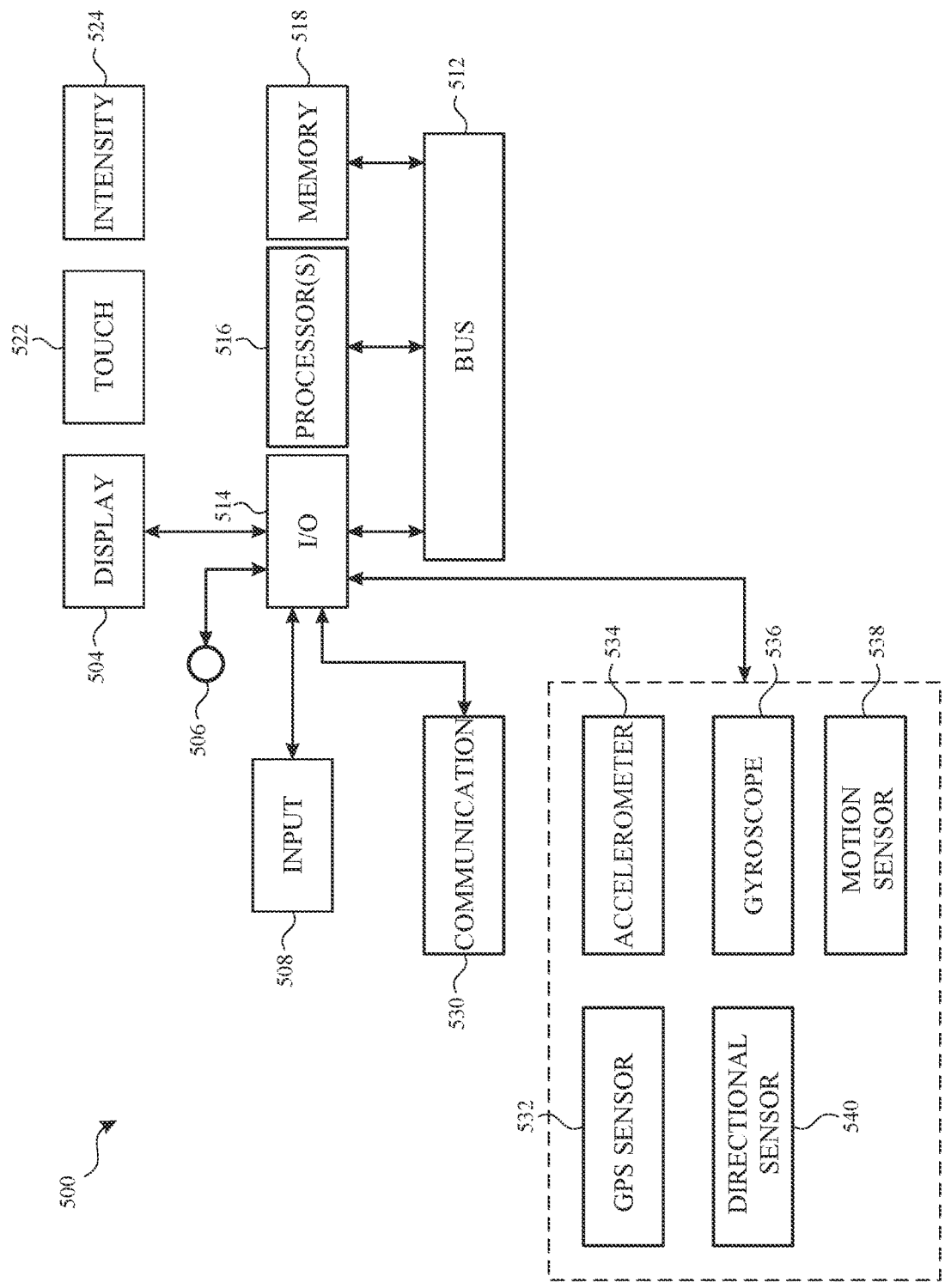
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 1000, 1300 and 1600 (FIGS. 10A-10Q, 13 and 16). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A-1B, 3, and 5A-5H). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
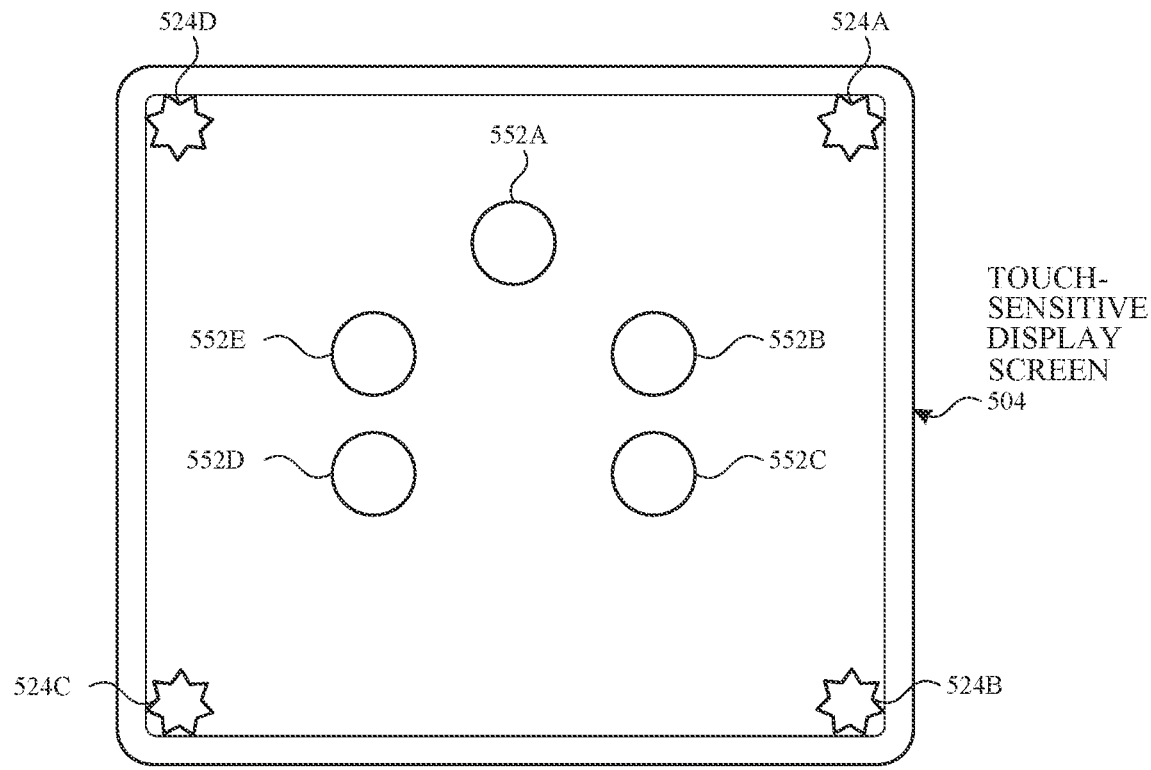
FIGS. 5C-5D illustrate exemplary components of a personal electronic device having a touch-sensitive display and intensity sensors in accordance with some embodiments.
Figure 5C:
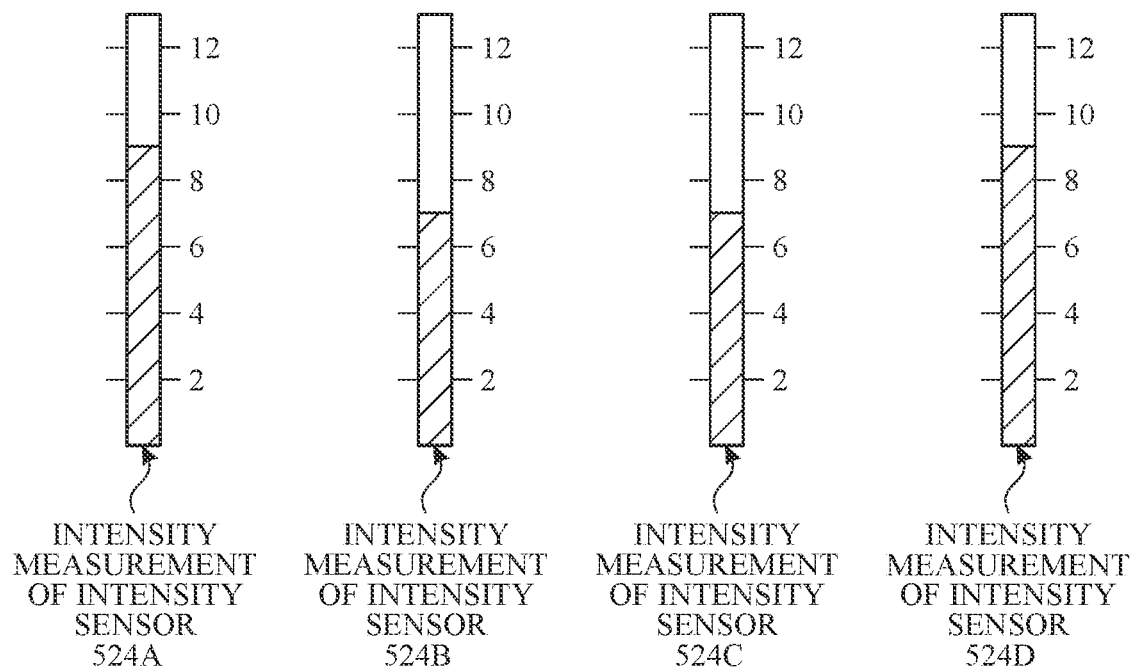
Figure 5D:
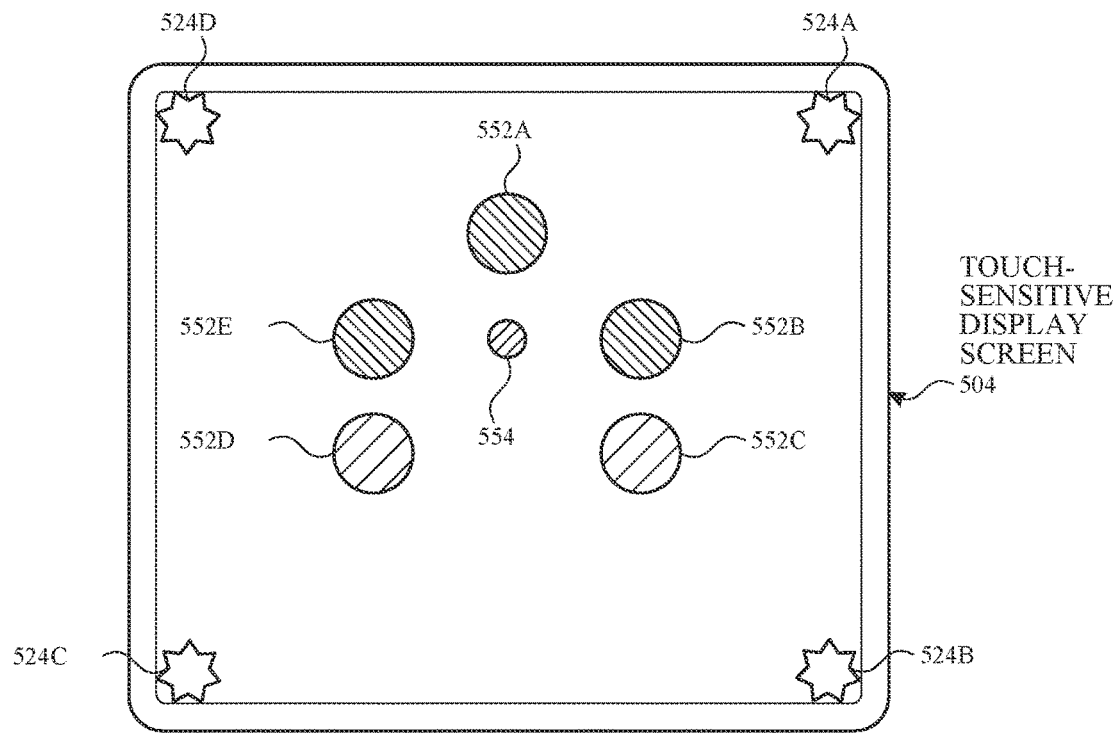
Figure 5D:
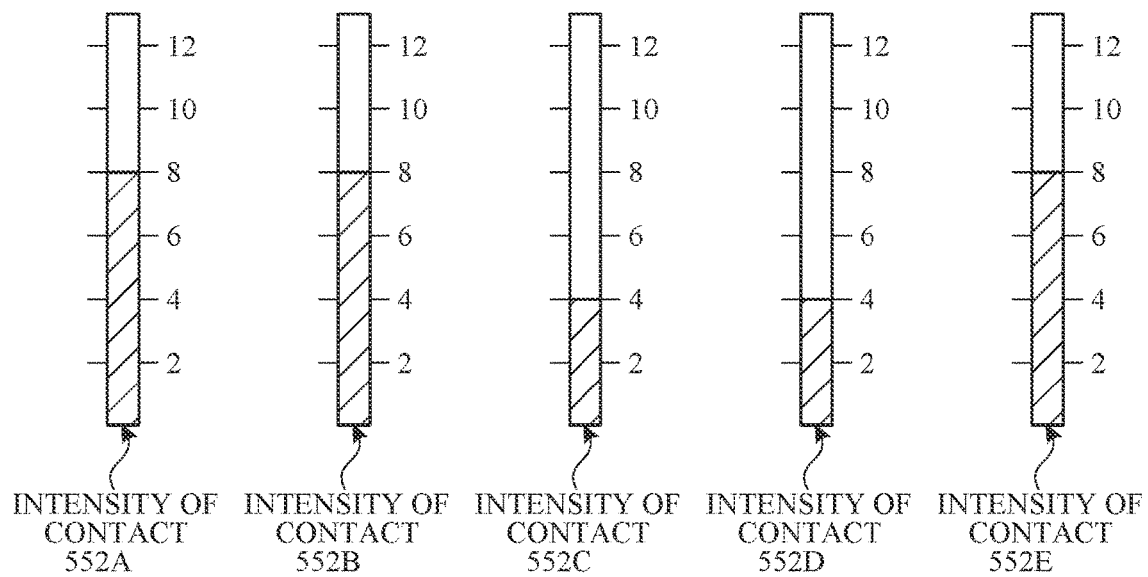

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity $I_j$ that is a portion of the aggregate intensity, A, in accordance with a predefined mathematical function, $I_j = A \cdot (D_j / \Sigma D_i)$, where $D_j$ is the distance of the respective contact j to the center of force, and $D_i$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input.

An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
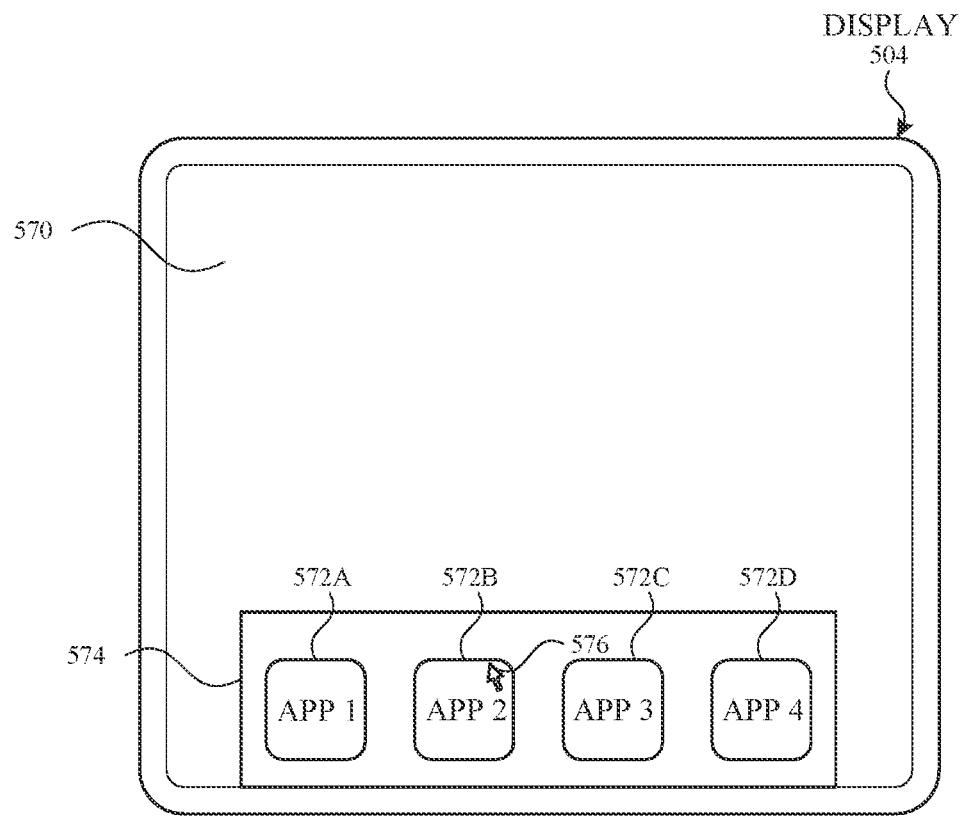
FIGS. 5E-5H illustrate exemplary components and user interfaces of a personal electronic device in accordance with some embodiments.
Figure 5E:
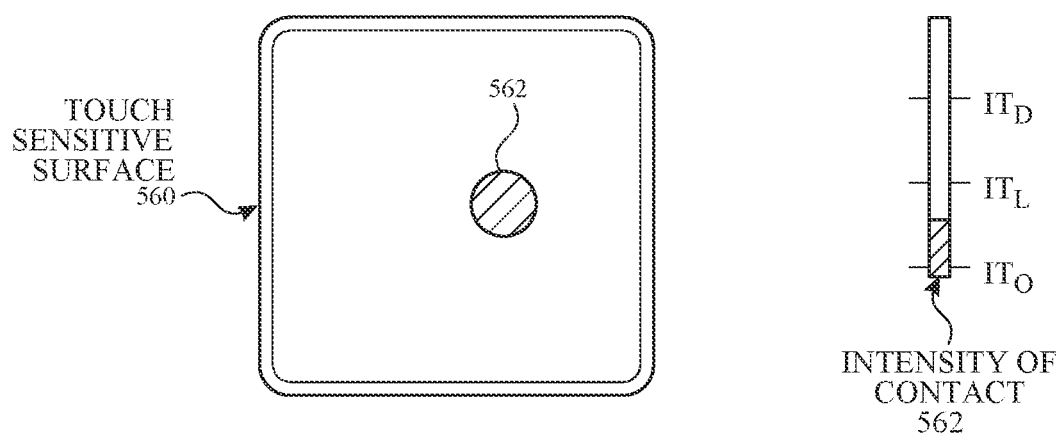
Figure 5F:
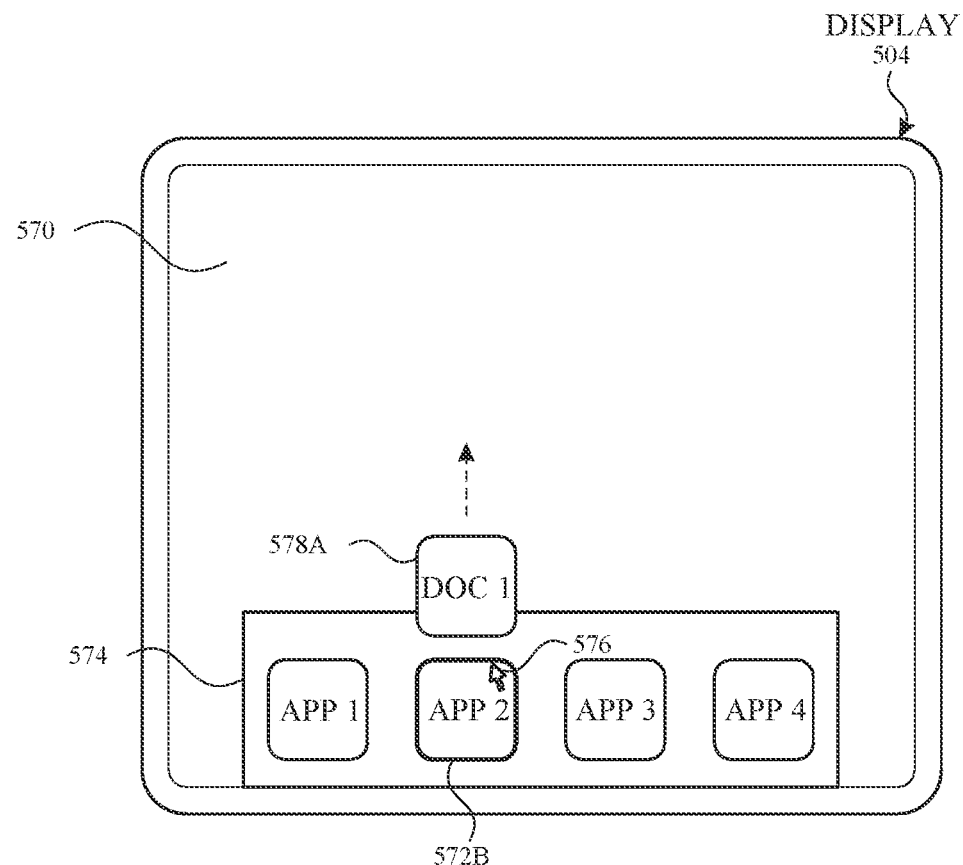
Figure 5F:
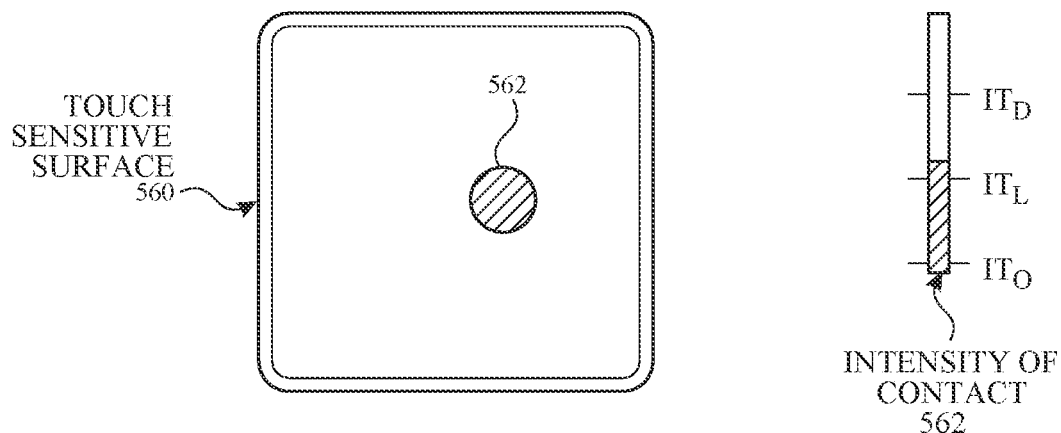
Figure 5G:
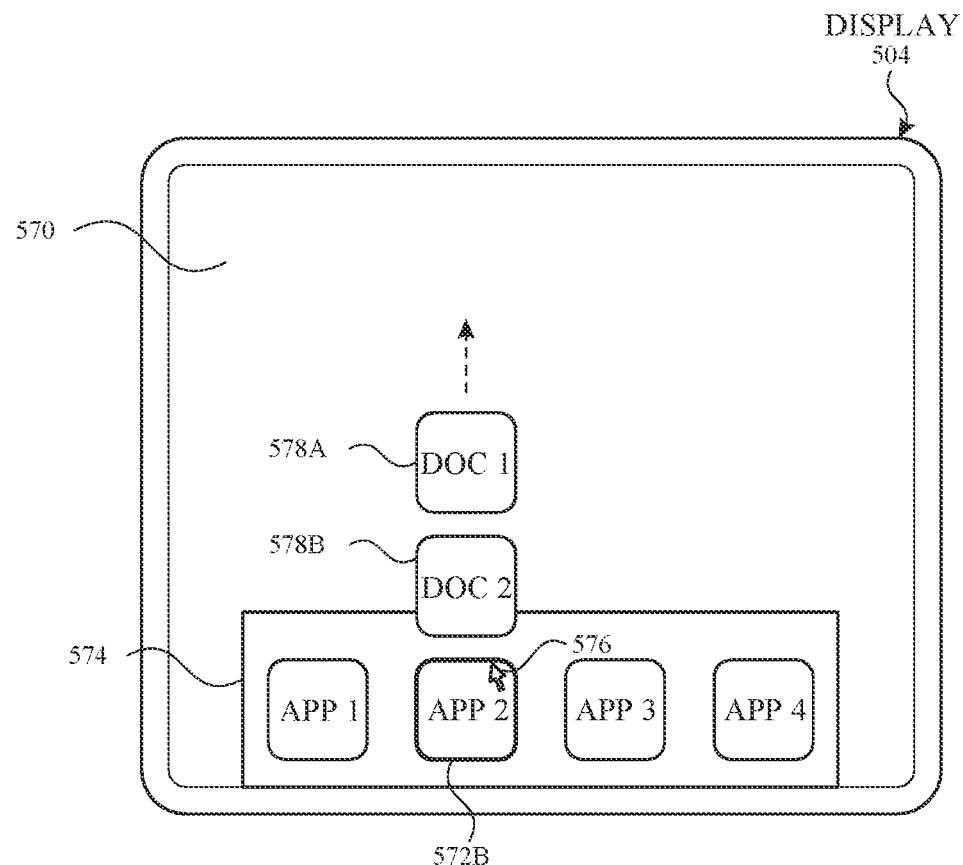
Figure 5G:
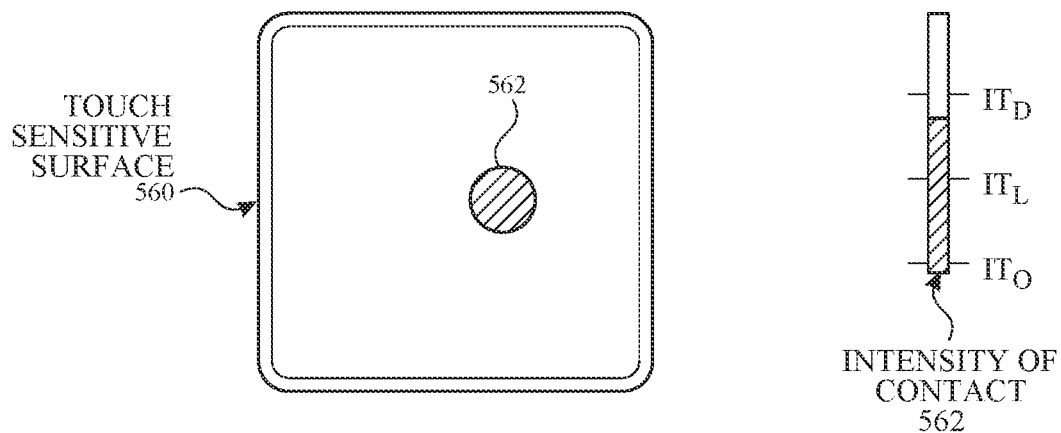
Figure 5H:
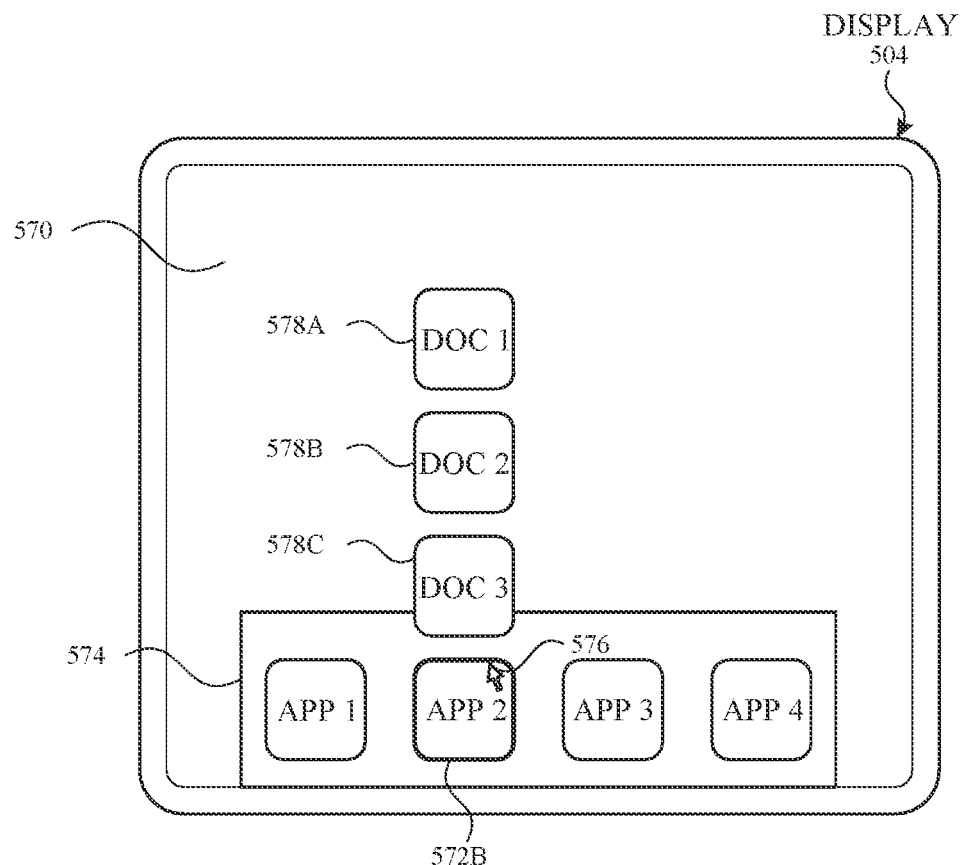
Figure 5H:
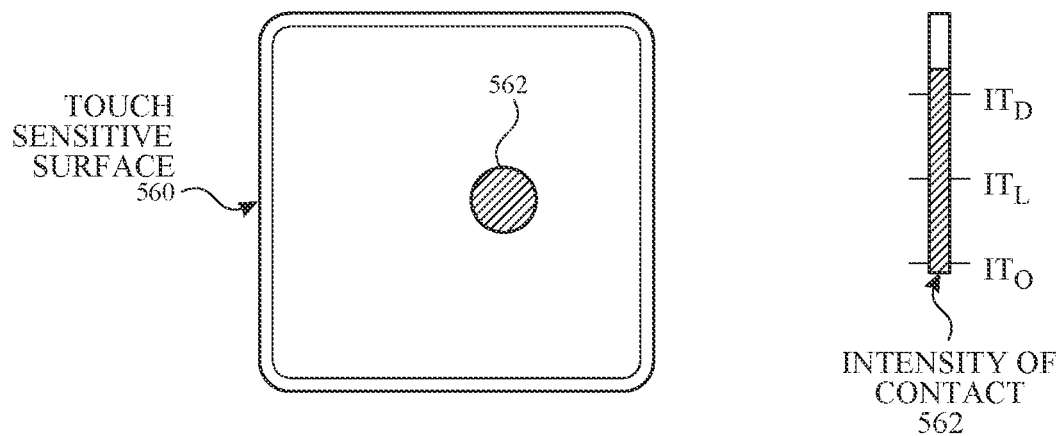

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, device 500, device 600, or device 900.

FIGS. 6A-9I illustrate exemplary user interfaces for displaying application views in a set of application views, in accordance with some embodiments. The user interfaces in these figures are used to illustrate the processes described below, including the processes in FIGS. 10A-10Q.

Figure 6A:
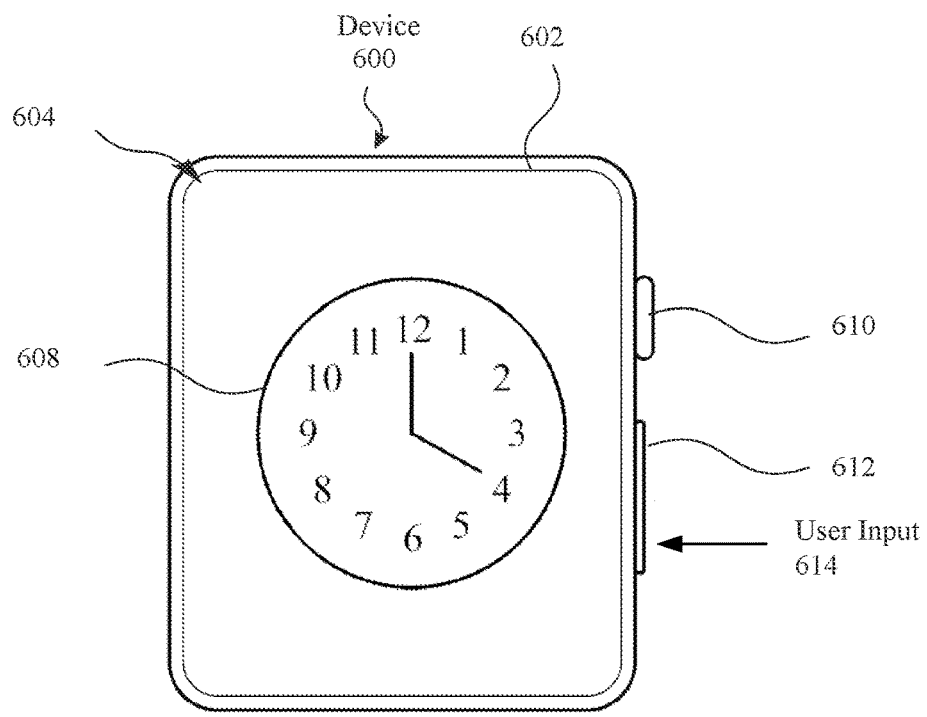
FIGS. 6A-6N illustrate exemplary user interfaces in accordance with some embodiments.

FIG. 6A illustrates device 600 with touch sensitive display 602. Device 600 may be device 100, 300, or 500 in some embodiments. User interface 604 is displayed on touch-sensitive display 602. User interface 604, as illustrated in FIG. 6A, includes watch face 608 of a watch application.

Device 600 includes various input mechanisms that receives user input, such as, rotatable input mechanism 610, that is able to receive a rotatable input (and may also receive a push input), and input mechanism 612 that is able to receive a push user input.

Figure 6B:
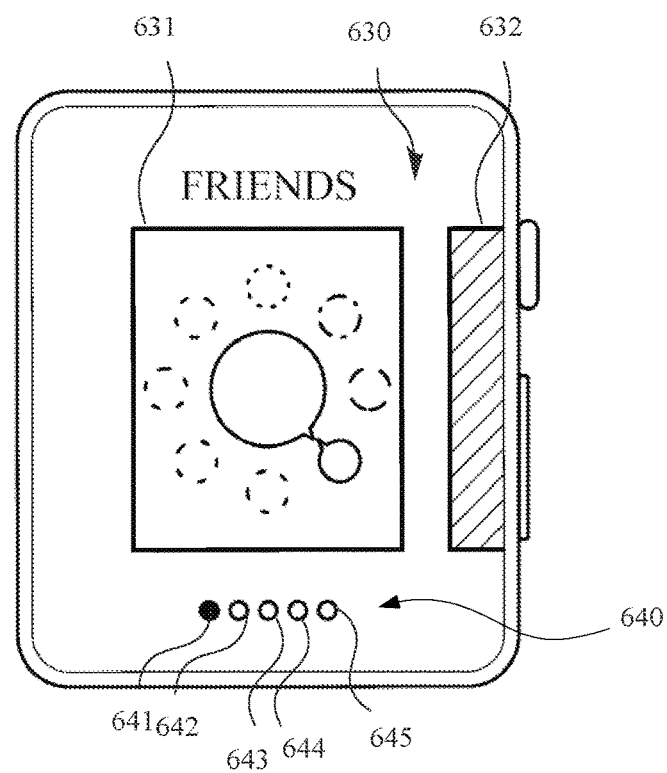
Figure 6C:
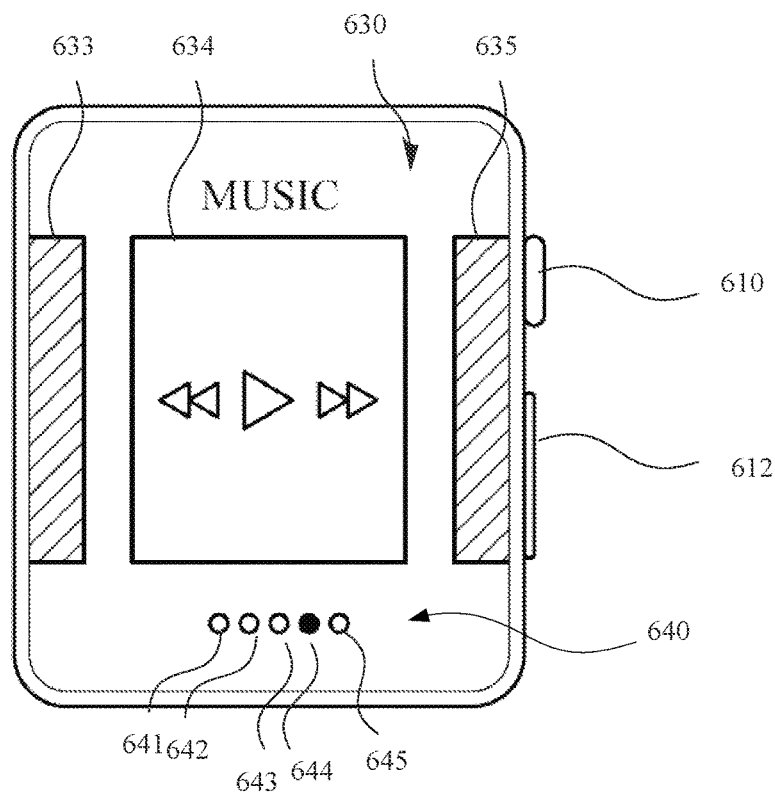

Referring now to FIGS. 6A-C, in response to receiving user input 614 at input mechanism 612, a plurality of application views of a set of application views 630 are displayed. The set of application views are a sequential list of application views that correspond to respective applications. As shown in FIGS. 6B-6C, in some embodiments, the set of application views 630 include a first application view 631 corresponding to a first application (e.g., friends application), a second application view 632 corresponding to second application (e.g., stock application, weather application), a third application view 633 corresponding to a third application, a fourth application view 634 corresponding to a fourth application, and a fifth application view 635 corresponding to a fifth application. It is noted that, as shown in FIGS. 6A-6C, the set of application views may include one or more application views that are not displayed on display 602 at a given time.

In some embodiments, referring to FIGS. 6A-B, in response to user input 614, device 600 displays a subset of the set of application views, such as first application view 631 and second application view 632. Alternatively, in some embodiments, referring to FIGS. 6A and 6C, in response to user input 614, device 600 displays a subset of the set of application views, such as application view 633 application view 634, and application view 635.

As shown in FIGS. 6A-C, the application views are a screenshot of corresponding applications. Each of the application views in the set of application views 630 are an affordance, that when selected, launch the application that corresponds to the application view. For example, the selection (e.g., a touch input on the affordance) of application view 631 that corresponds with a friends application launches the friends application. Similarly, the selection of application view 634 that corresponds to a music application launches the music application.

In some embodiments, the applications respectively corresponding to the set of application views 630 (e.g., preselected application views and adaptive application view) are stored in memory (e.g., volatile memory). As such, the applications corresponding to the respective application views in the set of application views 630 quickly and easily accessed, (e.g., launch instantaneously), in response to selection of the respective application view.

Device 600, in some embodiments, displays various application view indicia (or page dots) 640 concurrently with the set of application views. Each application view indicia corresponds to a respective application view in the set of application views. For example, application view indicia 641 corresponds to application view 631, application view indicia 642 corresponds to application 632 (as shown in FIG. 6B) and application view indicia 643, 644 and 645 respectively correspond to sequential application views 633, 634 and 635 (as shown in FIG. 6C) in the set of application views. As shown in FIGS. 6B-C, the five separate application view indicia (e.g., application view indicia 641, 642, 643, 644 and 645) respectively corresponds to five separate application views in the set of application views 630. However, the set of application views 630 can include any number of predefined application views (e.g., ten predefined application views in the set of application views) that correspond to a respective number of application view indicia.

The set of application views 630 include preselected application views. The preselected application views are application views corresponding to respective applications, wherein the respective applications have been preselected such that their corresponding application views are displayed in response to user input 614. As a result, the set of application views 630 provides quick and easy access to the applications corresponding to the application views in the set of application views 630. In one example, application views 631-634 are preselected application views because they have been affirmatively selected to be in the set of application views 630. In some embodiments, a user of device 600 affirmatively selects the applications (or application views) that are a part of the set of application views 630, which will be described in further detail below. In other embodiments, a party (other than the user) selects one or more applications (or application views), prior to shipping of the device for commercial sale or initial use by the user.

In some embodiments, the preselected application views (and the adaptive application view) remain in the set of application views regardless of the operational state of the respective application. The various operational states of the application can be a launched (e.g., become opened) application, an open or executing application, or a closed application. In particular, an open or executing application can be, but is not limited to (1) an active application, which is currently displayed on a display screen of the device that the application is being used on, (2) a background application (or background processes), which is not currently displayed, but one or more processes for the application are being processed by one or more processors, and (3) a suspended or hibernated application, which is not running, but has state information that is stored in memory (volatile and non-volatile, respectively) and that can be used to resume execution of the application.

As a result, in some embodiments, the preselected application views are able to be displayed regardless of the operational state of the application. Moreover, in some embodiments, the preselected application views remain in the set of application views until affirmatively removed by the user, which will be described in further detail below.

Figure 6D:
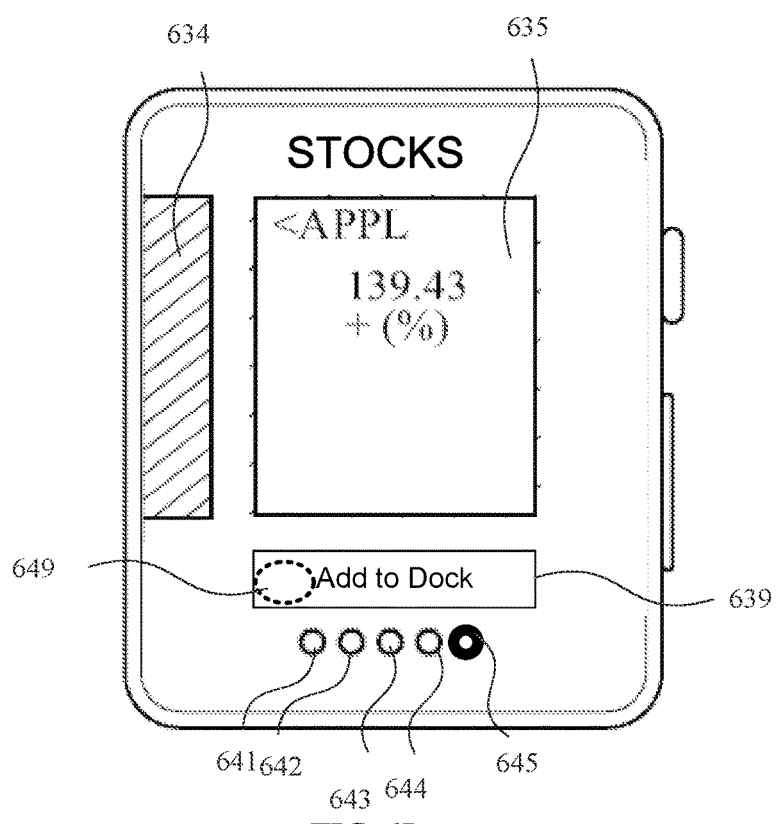

As seen in FIG. 6D, the set of application views 630 also includes an adaptive application view 635. The adaptive application view corresponds to a most recently opened application that is not currently one of the preselected application views. The adaptive application view includes a screenshot of the most recently opened application regardless of the operational state of the most recently opened application (e.g., running, suspended, not launched)

Referring to FIG. 6D, application view 635 is an adaptive application view that corresponds to a stocks application. In this example, the stocks application is the most recently opened application and the stocks application has not been affirmatively added to the preselected application views (e.g., application views 631-634) of the set of application views 630.

In some embodiments, the stocks application is an open application on the device and is not a view in the set of application views. While the stock application is open (and displayed in user-interface 604), device 600 receives user input 614 is received to display the set of application views. In response to receiving user input 614, device 600 displays the adaptive application view that corresponds to the stocks application because the stocks application is the most recently opened application.

In some embodiments, device 600 displays the adaptive application view at a terminus (e.g., beginning or end) of the sequence of the set of application views. Alternatively, the adaptive application view is not displayed at the terminus of the sequence of application views. In some embodiments, the set of application views includes more than one adaptive application view that respectively corresponds to the most recently opened applications.

In some embodiments, referring to FIG. 6D, while displaying application views 634 and 635 of the set of application views 630, the set of application view indicia 640 are displayed, with each of the application view indicia corresponding to a respective application view in the set of application views. In particular, the application view indicia 645 that corresponds to the adaptive view 635 is visually distinguished with respect to the application view indicia corresponding to the preselected application views. In the embodiment depicted in FIG. 6D, application view indicia 645 is a hollow indicia (in the highlighted state), when the adaptive application view 635 is center focused. In comparison, the application view indicia that corresponds to the preselected application views are highlighted as a solid page dote when their respective preselected application views are center focused, as seen, for example, in FIG. 6B.

Further as seen in FIG. 6D, the adaptive application view 635 includes affordance 639 ("add to dock" button) that corresponds to adding the adaptive view to the preselected application views of the set of application views. In response to receiving user input 649 (e.g., tap gesture) for selecting the affordance, the adaptive application view (e.g., application view 635) that corresponds to the most recently opened application (e.g., stocks application) is added to the preselected application views. For example, referring to FIG. 6E, in response to user input 649, device 600 adds application view 635 to the preselected application views of the set of application views such that application view 635 is no longer an adaptive application view. In some embodiments, when an adaptive application view (e.g., stock application) is added to the preselected application views via selection of affordance 639, the adaptive application view remains in the set of application view and a new preselected application view (e.g., stock application) is created.

In some embodiments, the adaptive application view adapts such that it corresponds to the most recently opened application that is not one of the already existing preselected application views. For example, when the stocks application is launched it is the most recently opened application. As a result, the adaptive application view corresponds to the stocks application, as shown in FIG. 6D.

Furthermore, a subsequent new application may be launched (or opened), that is also not associated with the preselected application views. In response to the detecting the launch of the new application, that is also not associated with the preselected application views, the adaptive view is updated again to correspond with the new most recently opened application. For example, referring to FIG. 6F, when the weather application is the most recently opened application (and not associated with the preselected application views) then device 600 updates adaptive application view 635 such that it is corresponds with the weather application (rather than the previous recently opened application such as the stocks application). In some embodiments, the adaptive application view permits a user to quickly access a recently used application, without having to perform the steps necessary to add the application to the set of preselected application views.

In some embodiments, the application view of the most recently opened application is center focused upon initiating display of the application views. For example, referring to FIG. 6C, in response to user input at input mechanism 612, device 600 displays a subset of the set of application views. In particular, device 600 displays a portion of preselected application view 633, the full view of preselected application view 634, and a portion of adaptive application view 635. The full view of preselected application view 634 that corresponds to the music application is fully displayed and centered because the music application that corresponds to preselected application view 634 is the most recently opened application.

Additionally, in some embodiments, the center focused application view is lit brighter than the one or more adjacent application views. For example, application view 634 is lit brighter than sequentially adjacent views 633 and 635 that are partially displayed. In particular, in some embodiments, the one or more sequentially adjacent views to the center focused application view are dimmed with respect to the center focused application view.

Figure 6E:
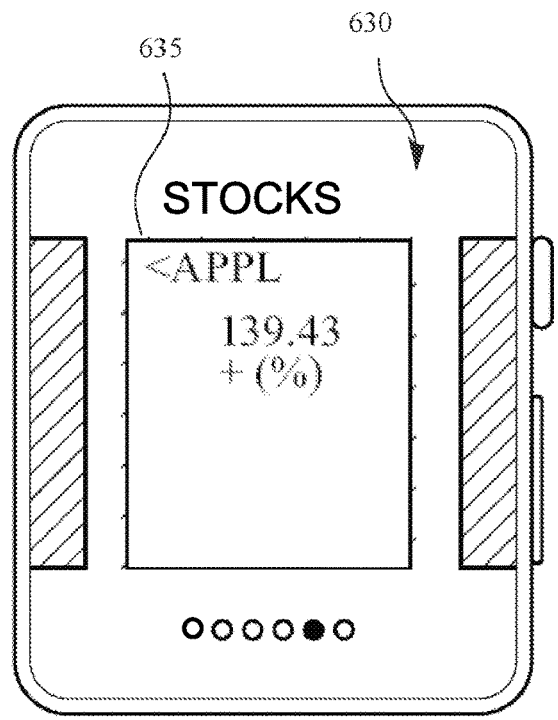
Figure 6F:
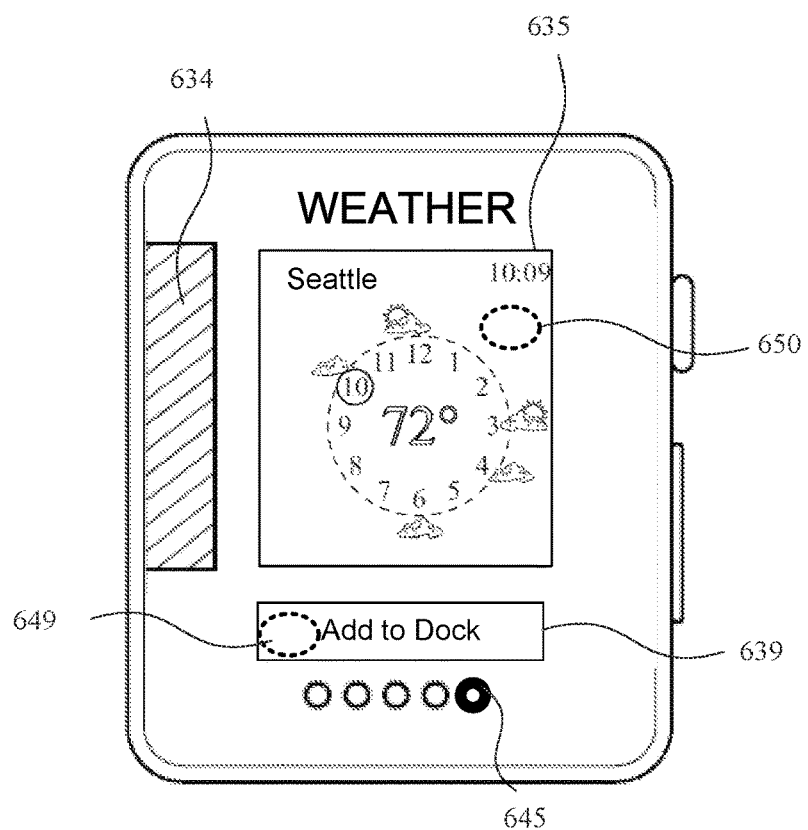

In another example, referring to FIG. 6F, in response to user input at input mechanism 612, a subset of the set of application views are displayed. In particular, a portion of preselected application view 634 and the full view of adaptive application view 635 are displayed. The full view of adaptive application view 635 that corresponds to the weather application is fully displayed and centered because the weather application that corresponds to adaptive application view 635 is the most recently opened application (and is not associated with the preselected views).

Figure 6G:
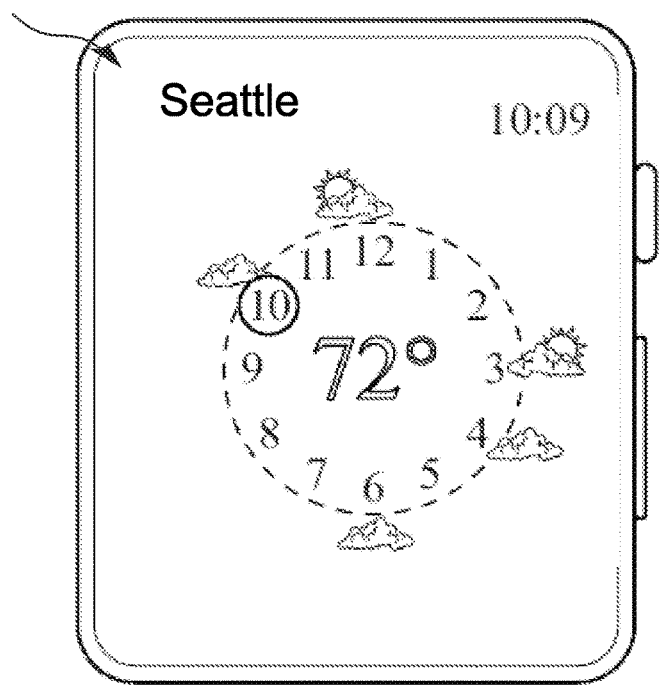

Referring to FIGS. 6F-6G, the weather application associated with adaptive application view 635 can be opened in response to selecting the adaptive application view. For example, while the weather application associated with the adaptive view is not opened, device 600 receives user input 650 on the adaptive application view. In response to receiving user input 650, device 600 launches (or opens) the weather application, as shown in FIG. 6G.

Figure 6H:
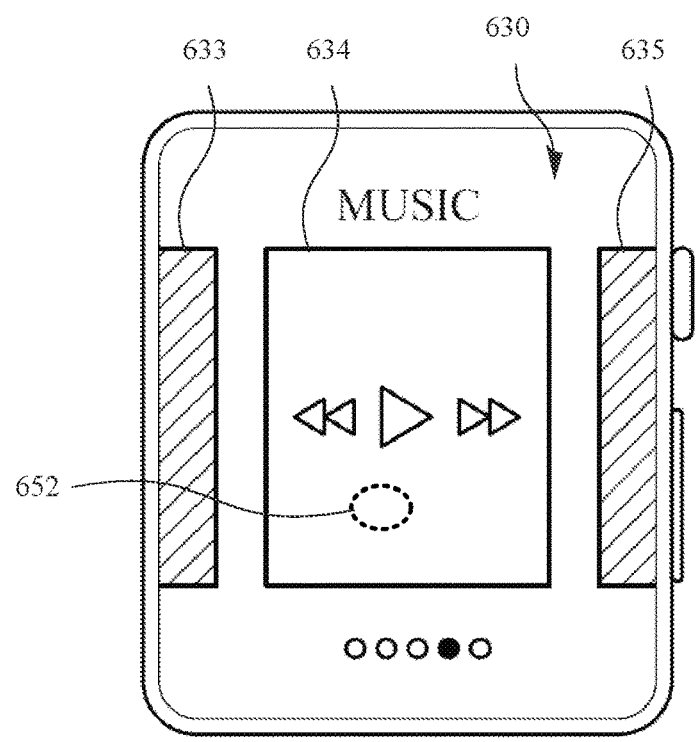

FIGS. 6H-6K illustrates reordering the application views in the set of application views 630. Referring to FIG. 6H (which is similar to FIG. 6C, as described above), device 600 receives user input 652 (e.g., hard press) on preselected application view 634 that corresponds to a music application. User input 652 is for selecting and reordering the preselected application view in the sequence of application views in the set of application views.

Figure 6I:
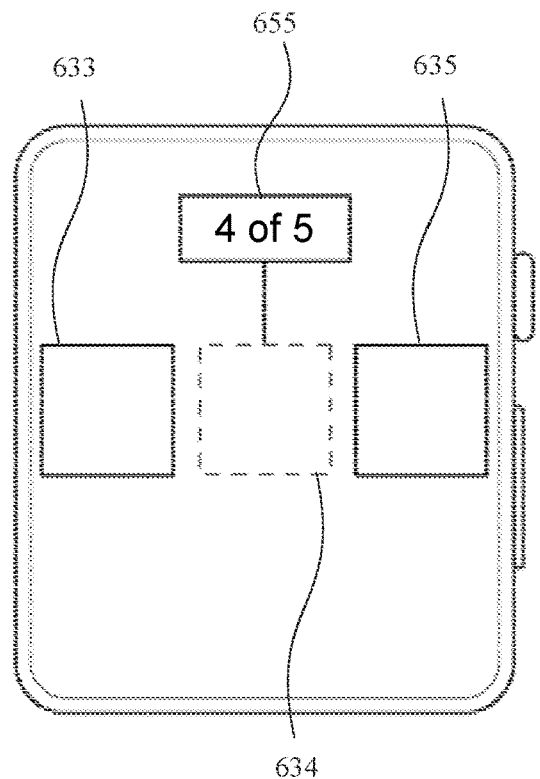

Referring to FIG. 6I, in response to user input 652, device 600 visually distinguishes the selected preselected view 634 that corresponds to the music application from the other views in the set of application views. The visual distinguishing of the selected application view may include change of size (e.g., larger than the other application views), change of location (e.g., vertical offset from the other application views), change to being translucent, change to being dimmed, etc. In some embodiments, device 600 reduces each of the displayed application views in size in response to user input 652 such that more application views are able to be concurrently displayed to aid in reordering of the selected application view.

Textual reference 655, in some embodiments, is displayed associated with the selected application view. Textual reference 655 indicates the current sequential order of the selected application view (e.g., 4 of 5) in the sequence of the set of application views.

Figure 6J:
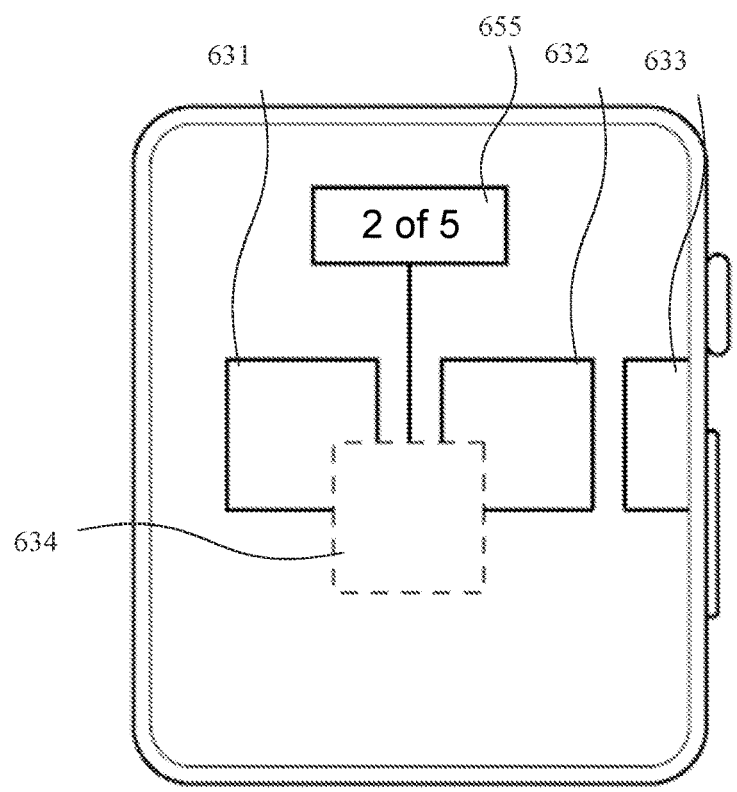

Referring to FIG. 6J, in response detecting movement of user input 652 (e.g., slide to the left) to a new location in the sequence of the set of application views, the selected application view 634 translates in accordance to the detected movement of user input 652 to the new location in the sequence of the set of application views. As illustrated in FIG. 6J, device 600 translates the selected application view to a new position between the application view 631 and application view 632 in the set of application views 630. As indicated by textual reference 655, in response to the movement of user input 652, the selected application view is translated to a new position (e.g., 2 of 5) in the sequence of the set of application views.

Figure 6K:
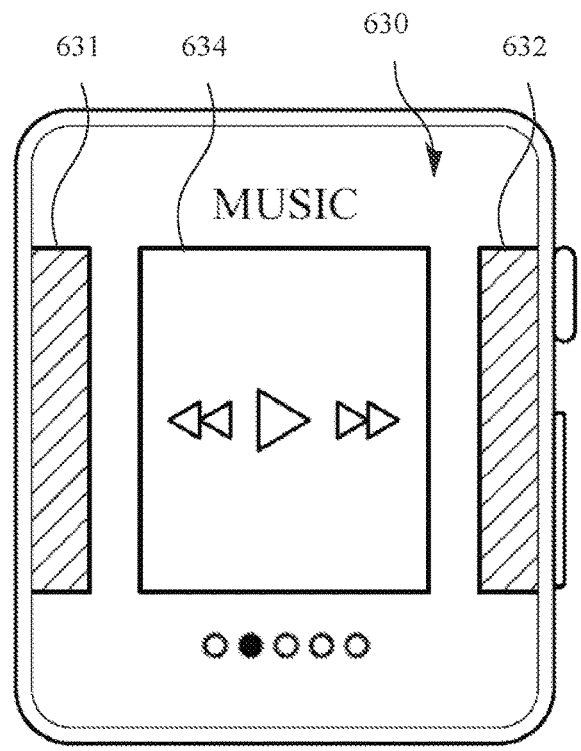

Referring to FIG. 6K, in response to a break in the contact of user input 652, device 600 places the selected application view 634 between application views 631 and 632 such that selected application view 634 is reordered in the sequence of the set of application views. In particular, application view 634 is reordered to the second application view (from the fourth application view) in the sequence of the set of application views. Additionally, the application views move to make space for the newly reordered application view. For example, device 600 moves application view 631 to the left and/or application views 632 and 633 move to right to provide room for the reordering of application view 634 to its new position between application view 631 and application view 632.

It is contemplated that the techniques for reordering illustrated and described in reference to FIGS. 6H-6K can be applied to reordering other items. For example, such techniques may be used to reorder context-specific user interfaces or watch faces configured for display on device 600. Exemplary user interfaces and techniques for editing and/or selecting the same are provided in International Patent Application Serial No. PCT/US2015/034607, titled "Context-Specific User Interfaces," filed Jun. 7, 2015, published as WIPO Publication No. WO/2016/022205, which is incorporated by reference herein in its entirety. In this instance, FIGS. 6H-6K illustrate a mode for reordering a sequential library of saved user interfaces for display on device 600. The reordering mode of device 600 may be entered, e.g., by a touch gesture on the touch-sensitive display such as a hard press or long press. 633, 634, and 635 depict preview images representing context-specific user interfaces in the library. In some embodiments, preview image 634 represents an active user interface, e.g., the user interface displayed on device 600 before entering the reordering mode, which is visually distinguished on the display as described above. In response detecting movement of user input 652 (e.g., slide to the left) to a new location in the sequence of the set of user interface preview images, the selected preview image 634 translates in accordance to the detected movement of user input 652 to the new location in the sequence of the set of application views (e.g., as depicted in FIG. 6J). In some embodiments, the stored library of user interfaces is also reordered accordingly, e.g., such that the user interface represented by preview image 634 is reordered at position 2 out of 5 in the library between the user interfaces represented by preview images 631 and 632. In other embodiments, rather than depicting the translation of 634 below the sequence of user interface preview images (the rest of which are arrayed in a linear sequence behind and/or above 634), device 600 enlarges the display of preview image 634 larger than 633 and 635 and increases the transparency of 634, such that the user can perceive preview image 634 and the sequence of other preview images behind it on the display. In response detecting movement of user input 652 (e.g., slide to the left) to a new location in the sequence of the set of user interface preview images, the sequence of preview images translates behind the enlarged and transparent 634 such that it occupies position 2 out of 5 as illustrated in FIG. 6J, then 634 returns to its previous size and transparency after the user input has ceased.

Figure 6L:
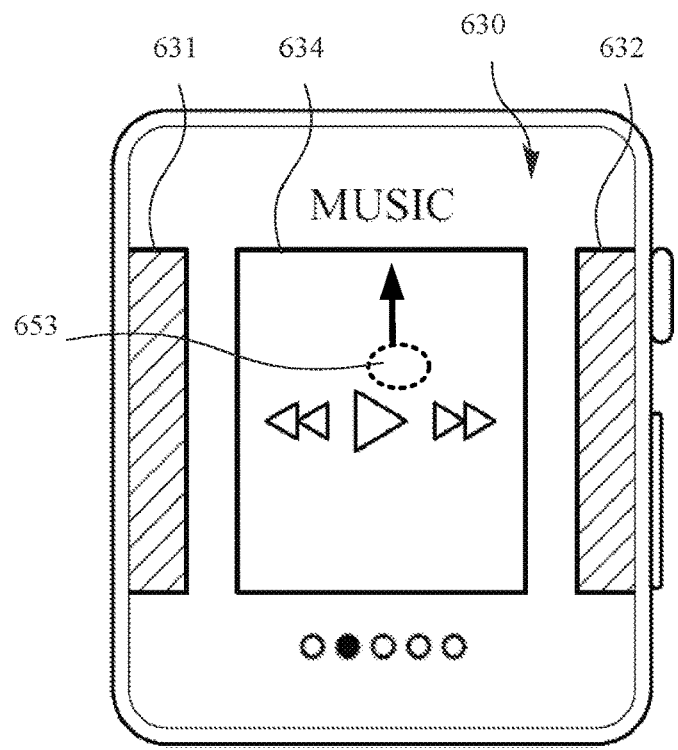
Figure 6M:
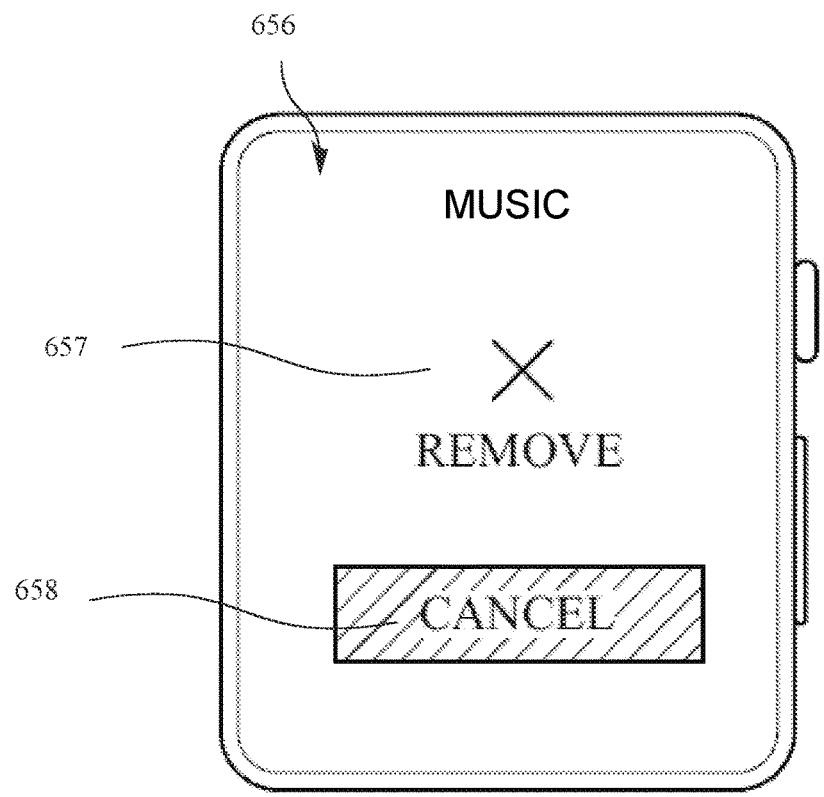
Figure 6N:
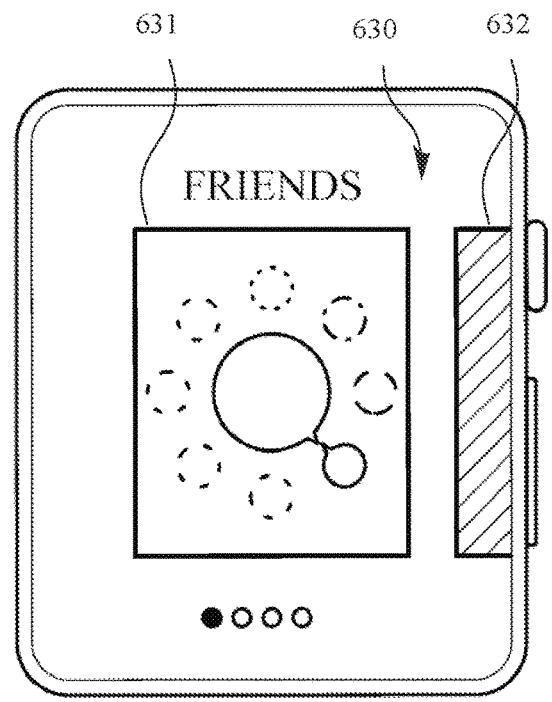

FIGS. 6L-6N illustrates removing an application view from the set of application views 630. Referring to FIG. 6L, device 600 detects, user input 653 (e.g., upward swipe gesture) on application view 634 that corresponds to a music application. In response to user input 653 that corresponds to removing an application view from the set of application views 630, device 600 displays an application view removal user interface 656 (FIG. 6M). Application view removal user interface 656 includes an application view removal affordance 657, and cancel affordance 658. Application view removal affordance 657, when selected removes or deletes the selected application view (e.g., application view 634) from the set of application views 630. Cancel affordance 658 cancels the process of removing an application view (e.g., application view 634) from the set of application views.

Referring to FIG. 6N, in response to selection of application view removal affordance 657, device 600 removes the selected application view 634 (that is currently in second application view in the set of application views 630) from the set of application views.

Additionally, the application views are moved to close the space left by the removed application view. For example, device 600 moves application view 631 to the right and/or moves application views 632 (and the rest of the sequence of the set of application views 630) to the left to close the open space that once held the removed application view.

As a result of removing an application view, as illustrated in FIGS. 6L-6N, the set of application views 630 is reduced to four application views (from five application views). Similarly, the number of application view indicia (or page dots) 640 are reduced to four indicia (from five indicia) that respectively correspond to each of the application views in the set of application views.

Figure 7A:
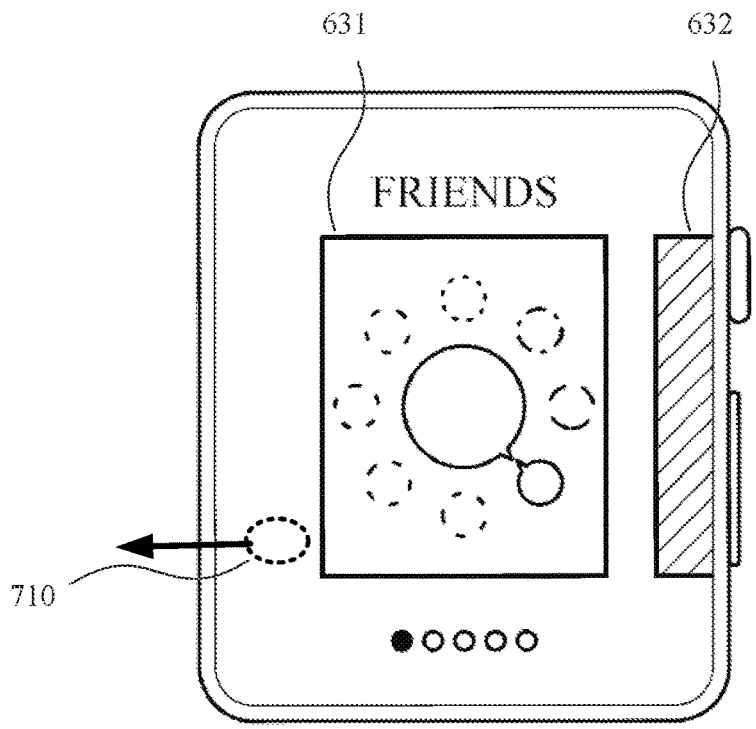
FIGS. 7A-7L illustrate exemplary user interfaces in accordance with some embodiments.
Figure 7B:
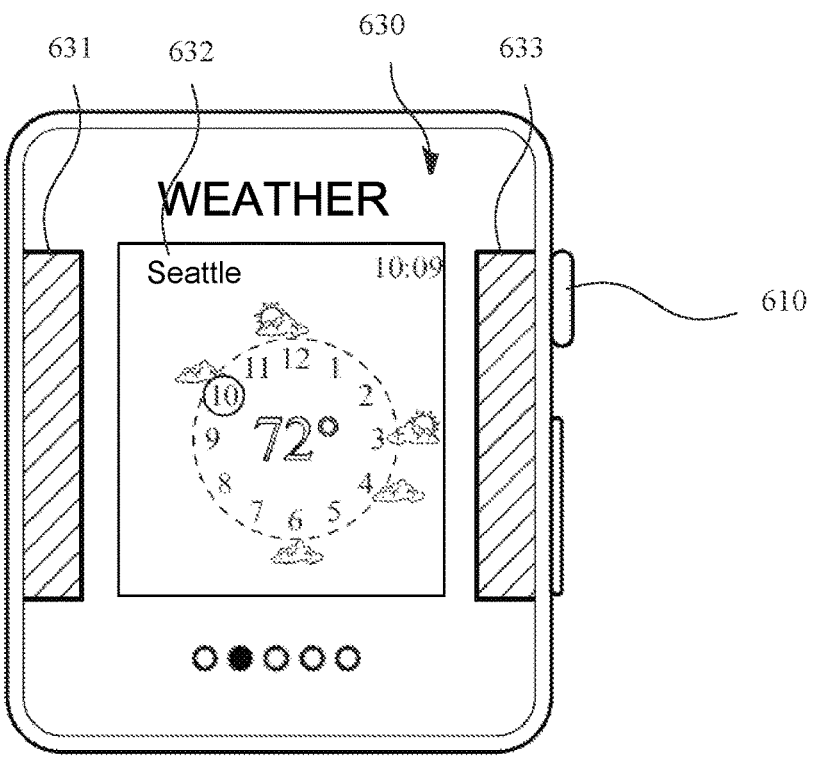

FIGS. 7A-7D illustrates scrolling through the set of application views. Referring to FIG. 7A, while application view 631 is the focused and centered application view in the set of application views 630, a swipe gesture 710 is received for scrolling through the set of application views 630. In response to receiving swipe gesture 710, device 600 scrolls the application views to the adjacent application view 632 (from application view 631) in accordance to the velocity of the swipe gesture being below a predetermined velocity, as depicted in FIG. 7B.

Figure 7C:
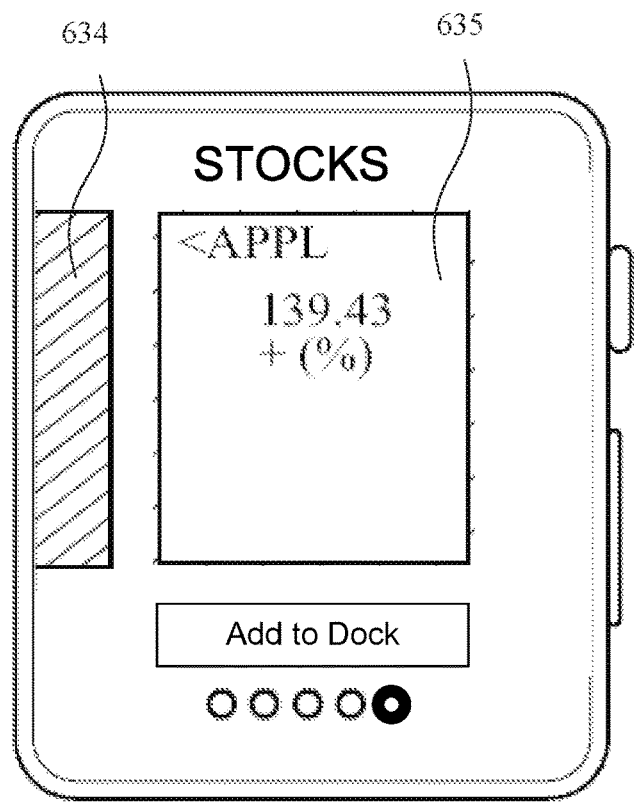

Alternatively, in response to receiving swipe gesture 710, the application views are scrolled through a plurality of application views (from application view 631), for example, to adaptive application view 635, in accordance to the velocity of the swipe gesture being above a predetermined velocity (e.g., 0.1 m/s), as depicted in FIG. 7C. In particular, the greater the velocity of the swipe gesture (above the predetermined velocity), the further the scrolling through application view. For example, while application view 631 is the centered and focused application view, device 600 may scroll to application view 633 when the swipe gesture 710 has a first velocity, $V_1$, that is slightly above the predetermined threshold. Similarly, while application view 631 is the centered and focused application view, device 600 may scroll to application view 634 when the swipe gesture 710 has a second velocity, $V_2$, that is greater than $V_1$. Additionally, while application view 631 is the centered and focused application view, device 600 may scroll to adaptive application view 635 (from application view 631) when the swipe gesture 710 has a third velocity, $V_3$, that is greater than $V_2$.

Figure 7D:
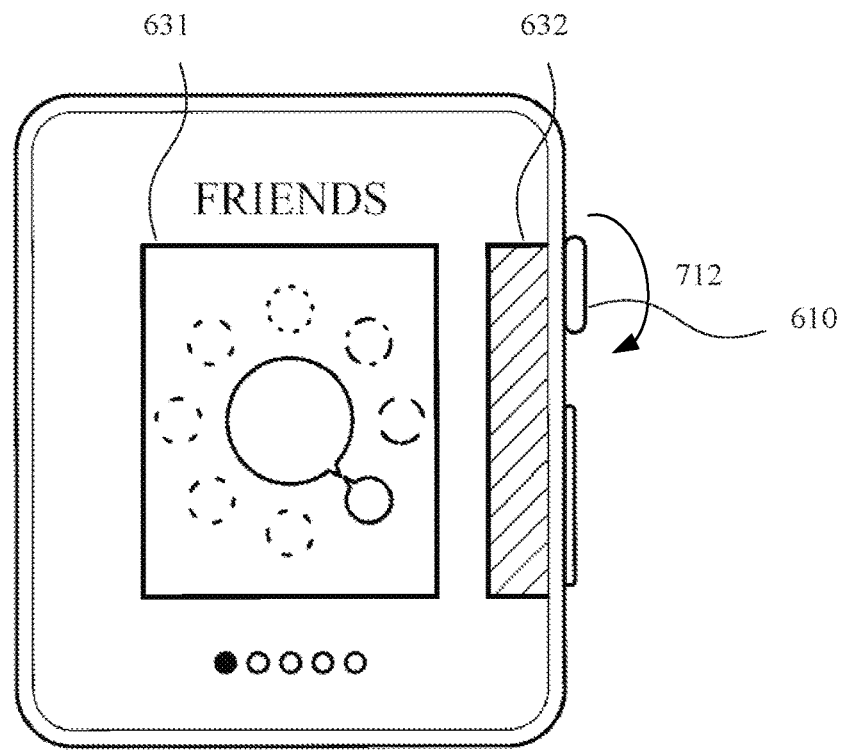

Referring now to FIG. 7D, while application view 631 is the focused and centered application view in the set of application views 630, rotational input 712 for scrolling to an adjacent application view is received at rotatable input mechanism 610. In response to receiving rotational input 712 at rotatable input mechanism 610, the application views are scrolled to the adjacent application view 632 (from application view 631), as depicted in FIG. 7B. In some embodiments, the scrolling to the adjacent application view includes a decrease in velocity based on a predetermined coefficient of friction. For example, the speed of the scrolling from application view 631 to application view 632 slows down until application view 632 is the new focused and centered application, wherein the slowing down of the scrolling is based on a coefficient of friction.

Figure 7E:
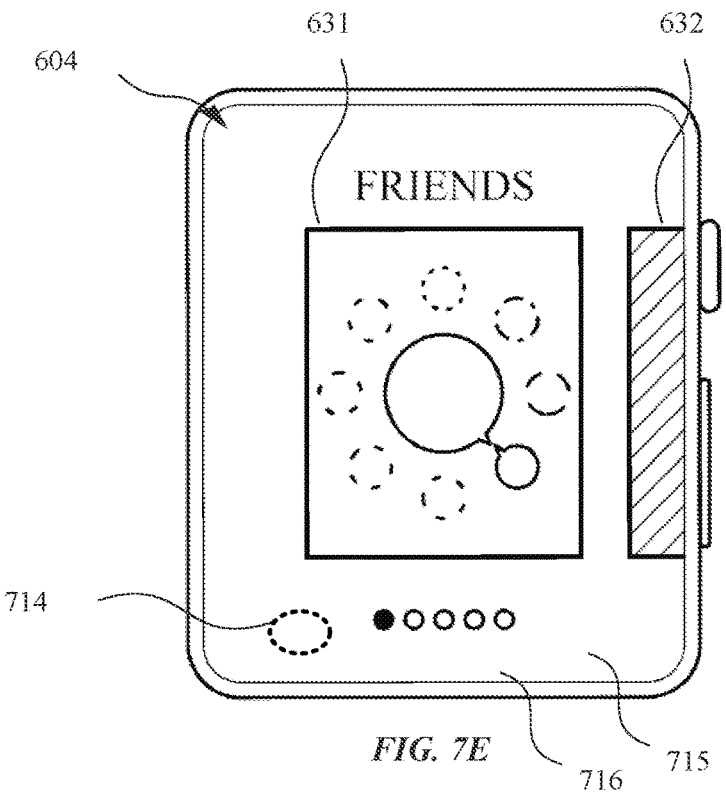
Figure 7F:
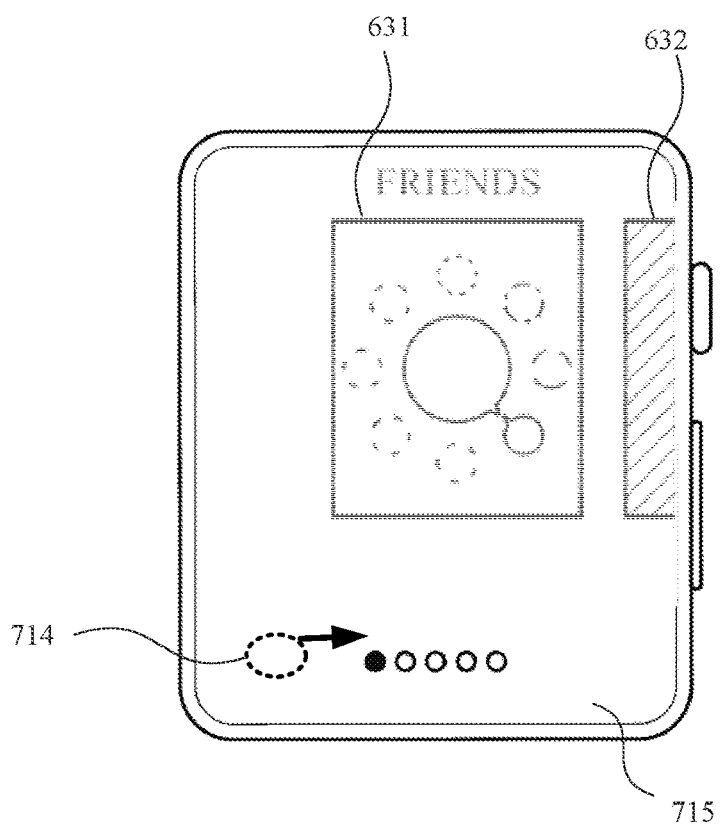

FIGS. 7E-7I illustrate scrolling through the set of application view 630. Referring to FIG. 7E, while displaying application views 631 and 632 in a display area (e.g., user interface 604), device 600 receives input 714 (e.g., press and hold gesture) at an edge 715 of the display area (e.g., near bottom edge of user interface 604, or near bottom bezel 716 of the touch display screen). Referring to FIG. 7F, in response to receiving input 714, device 600 moves the displayed application views away from the edge 715 of the display area. In this example, the application views translate up and towards the top edge of the display area opposite the bottom edge 715. In some embodiments, the application views move away from edge 715 to provide adequate area for a user's finger to touch the bottom edge. As a result, a user is able to touch on or around edge 715 without visually blocking the displayed application views.

Referring to FIGS. 7F-7I, movement of the input 714 is detected along edge 715 (e.g., horizontal scroll gesture to the right). In response to the detected movement of the input along the bottom edge of the display area, the set of application views are scrolled. For example, referring to FIG. 7G, as the input 714 is detected towards the middle of the length of the edge 715, device 600 displays the application views in the middle of the sequence of the set of application views (e.g., application views 632, 634 and 635). Similarly, referring to FIG. 7H, as the input is detected towards the end of the length of the edge of 715, device 600 displays the application views at the end of the sequence of the set of application views (e.g., application views 634 and 635). In some embodiments, referring to FIG. 7I, in response to a break in input 714, devices moves the application views down towards edge 715 into their original location (prior to input 714).

Figure 7G:
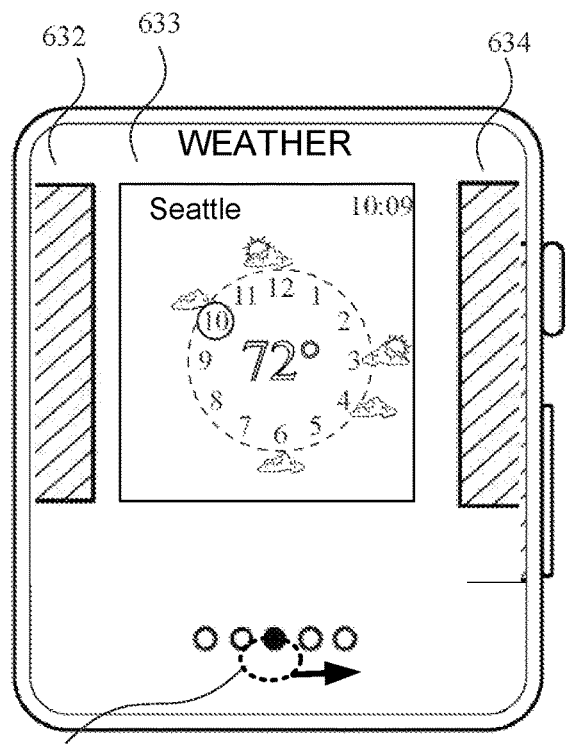

In some embodiments, in response to a touch from one terminus of edge 715 to the opposite terminus of edge 715, a user can scroll through each of the application views (regardless of the number of application views in the set of application views). Additionally, the initial location of input 714 can be anywhere along the length of edge 715. For example, the initial location of input 714 may be towards the middle of the length of edge 715, as depicted in FIG. 7G.

Figure 7H:
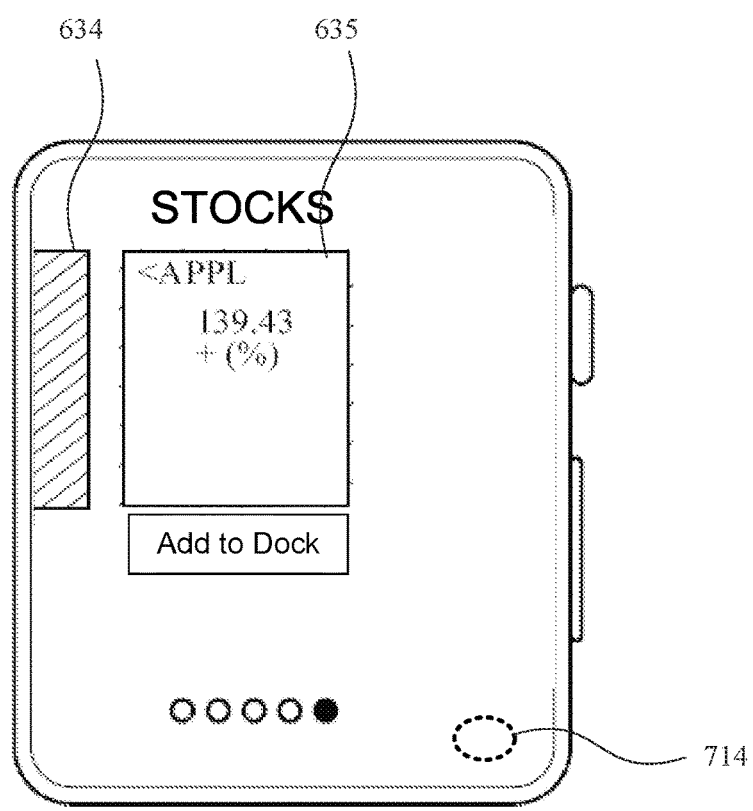
Figure 7I:
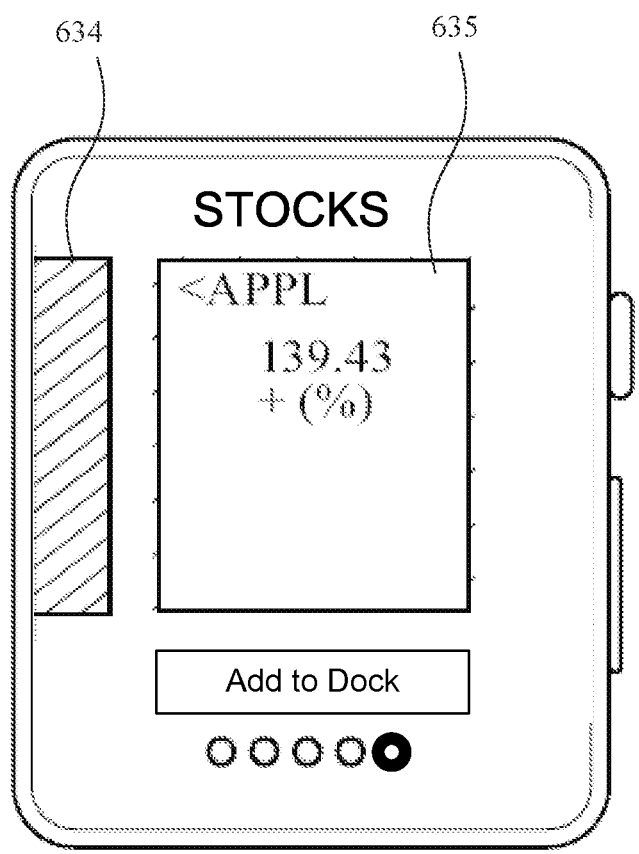
Figure 7J:
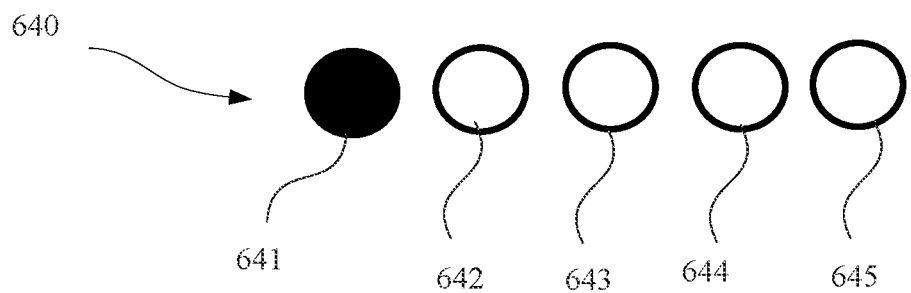
Figure 7K:
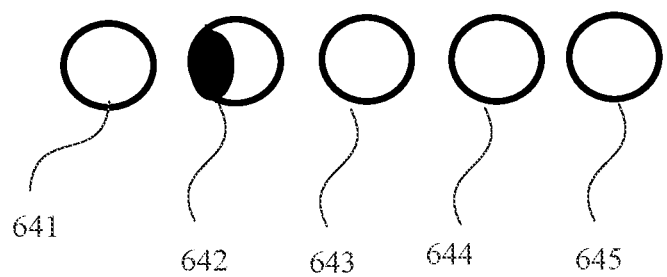
Figure 7L:
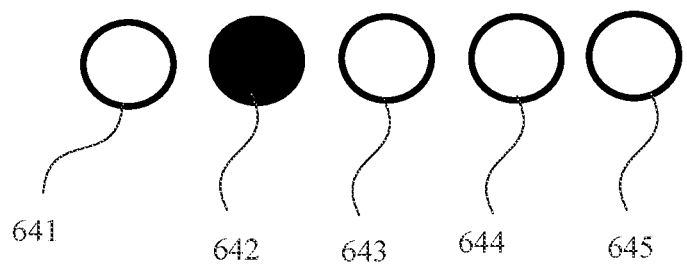

FIGS. 7J-7L illustrate dynamic highlighting of application view indicia 640. The dynamic highlighting of the application view indicia, as illustrated in FIGS. 7J-7L, corresponds with scrolling from application view 631 (that corresponds to application view indicia 641) to application view 632 (that corresponds to application view indicia 641), such as described with respect to FIGS. 7A-7B.

Referring to FIG. 7J (and FIG. 7A), while displaying application views 631 and 632 of the set of application views 630, a set of application view indicia 640 are displayed, wherein each of the application view indicia (e.g., indicia 641-645) correspond to a respective application views in the set of application views 630. Indicia 641 is highlighted corresponding to displayed application view 631 that is center focused. In response to receiving user input (e.g., scrolling input) to scroll to adjacent application view 632 (such that application view 632 is center focused), application view indicia 642 is highlighted to indicate that application view 632 is the center focused application view. The highlighting of application view indicia 642 includes an initial brightness and a final highlighting brightness, wherein the brightness of the highlighting increases during the transition from the initial highlighting brightness to the final highlighting brightness. For example, referring to FIG. 7K, indicia 642 includes an initial brightness, as application view 642 initially transitions into the center focused position. Referring to FIG. 7L, indicia 642 includes a transition to a final highlighting brightness that is greater than the initial highlighting brightness (as shown in FIG. 7K). In some embodiments, the dynamic highlighting acts as if a backlight is moved between indicia (e.g., a backlight moves from indicia 641 to 642).

Figure 8A:
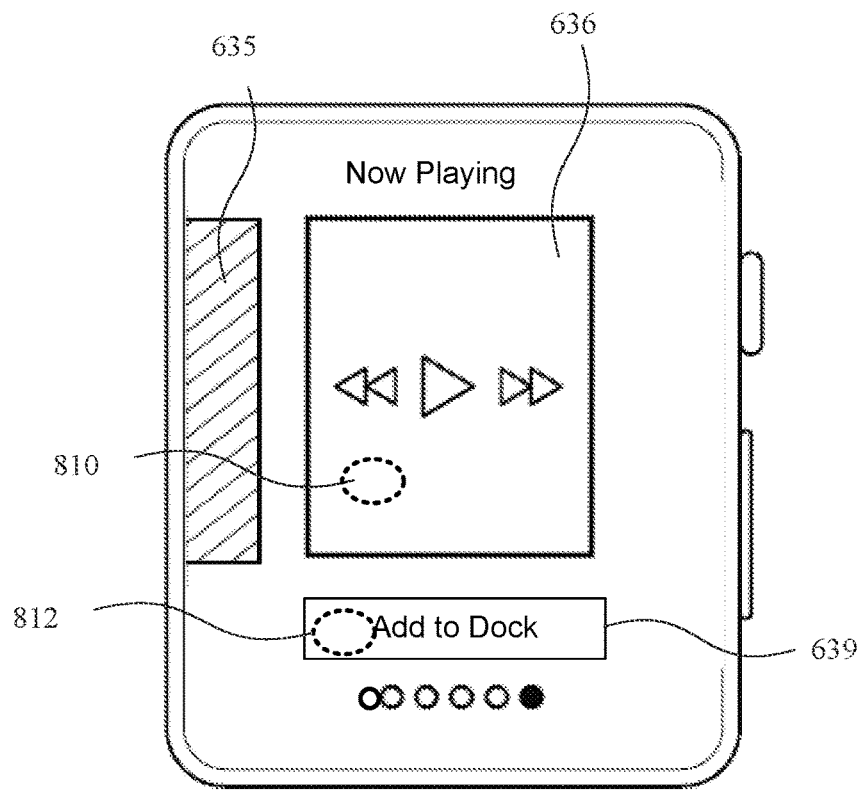
FIGS. 8A-8C illustrate exemplary user interfaces in accordance with some embodiments.
Figure 8B:
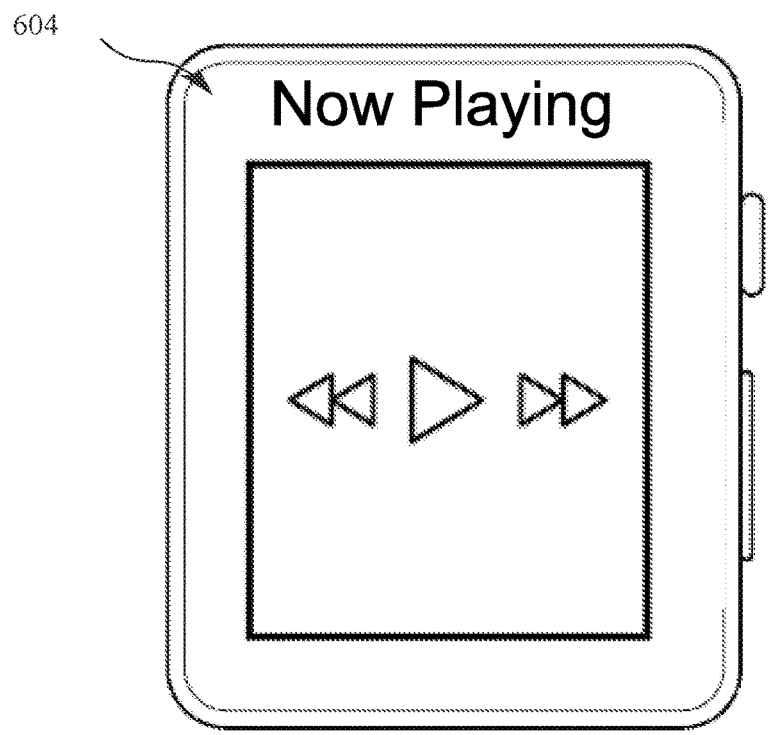

FIGS. 8A-8B illustrates a universal audio application control interface. Referring to FIG. 8A, while an audio application is playing audio content (e.g., a third party music application is playing a song), device 600 updates the set of application views 630 with a universal audio application control interface view 636 that corresponds to a universal audio application control interface for controlling playback of the currently playing audio content. The set of application views 630 is updated with universal audio application control interface view 636 when the set of application views 630 does not correspond to the audio application currently playing the audio content. For example, the audio application playing the audio content is not a preselected application view in the set of application views.

The audio application, that is playing the audio content, includes an application-specific control interface to control audio playback exclusively for the audio application. The universal audio application control interface is different and distinct from the application-specific control interface. For example, the universal audio application control interface is able to control playback of various third party music applications (e.g., Pandora, Spotify, SoundCloud) that are not associated with the preselected application views.

User input 810 on the universal audio application control interface view 635 is received. User input 810 is for initiating launching the universal audio application control interface.

Referring to FIG. 8B, in response to receiving the user input 810, device 600 launches and displays the universal audio application control interface. As a result, the audio content currently playing by the audio application is able to be controlled via the universal audio application control interface rather than the application-specific control interface.

Figure 8C:
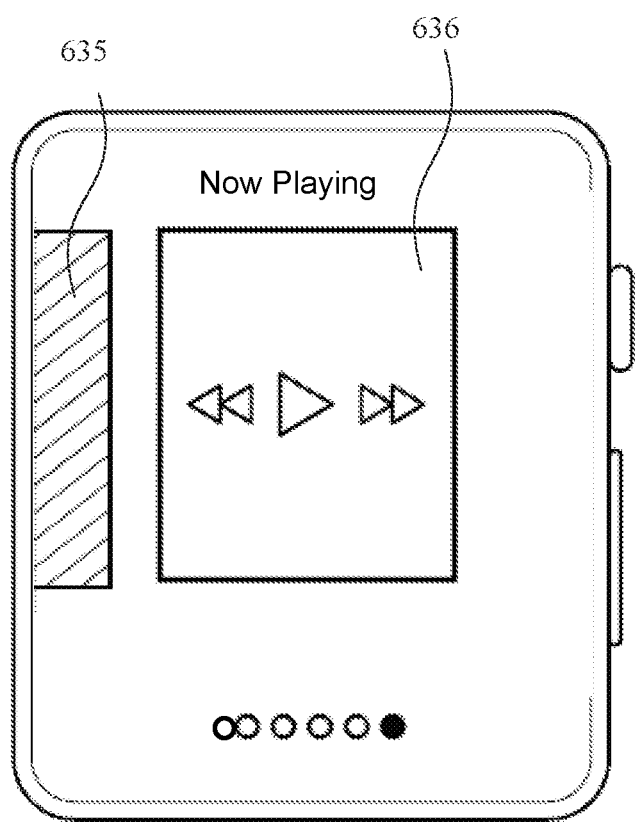

Referring now to FIGS. 8A and 8C, universal audio application control interface view 636 includes affordance 639 for adding universal audio application control interface view 636 to the preselected application views. In response to user input 812 for adding universal audio application control interface view 636 to the preselected application views, device 600 affirmatively adds universal audio application control interface view 636 to the preselected application views, as depicted in FIG. 8C.

FIGS. 9A-9I illustrates companion device 900 that is paired to device 600. Companion device 900 includes touch sensitive display 902. User interface 904 is displayed on touch-sensitive display 902. Companion device 900 when paired to device 600 is able to display the application views and perform at least some of the same processes as device 600, as described herein.

Figure 9A:
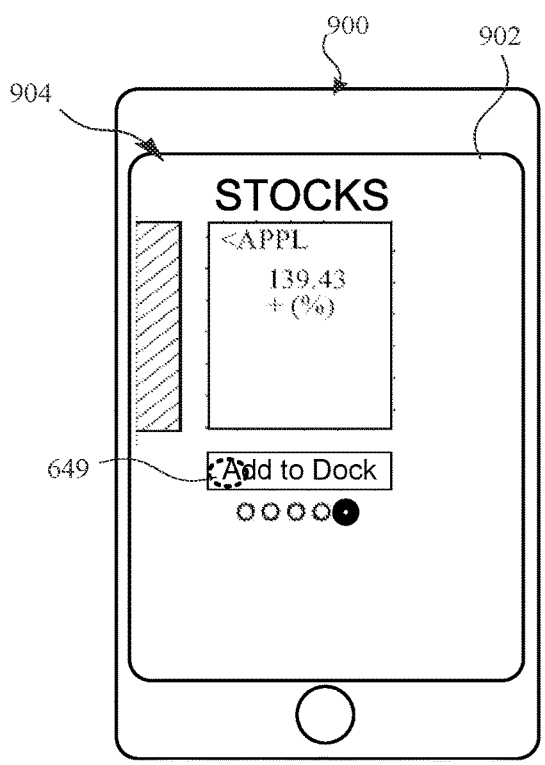
FIGS. 9A-9I illustrate exemplary user interfaces in accordance with some embodiments.
Figure 9B:
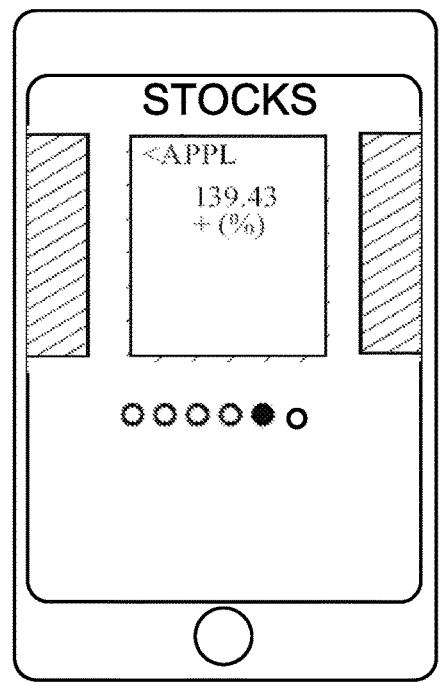
Figure 10A:
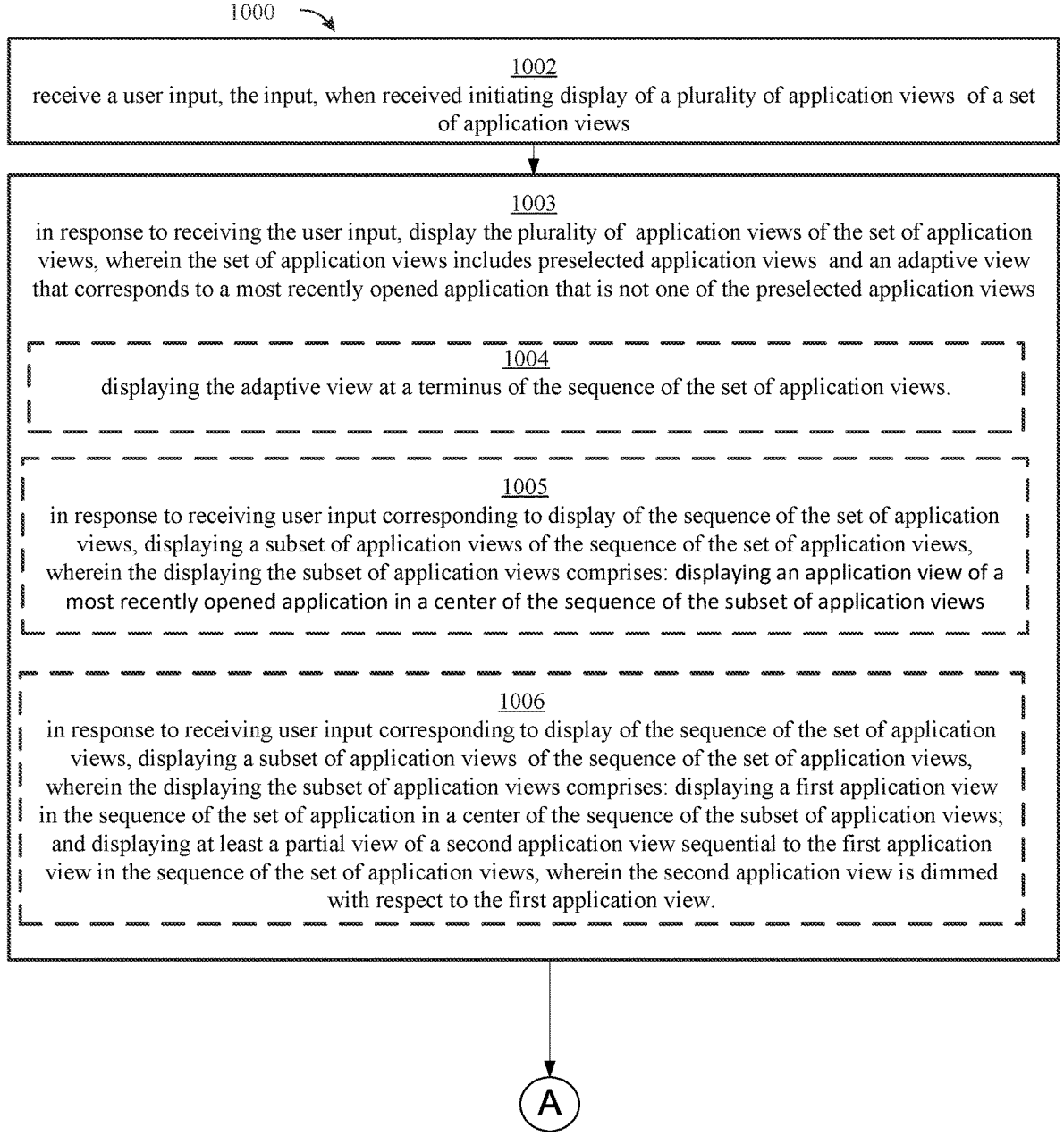
FIGS. 10A-10Q is a flow diagram illustrating a method for operating an electronic device in accordance with some embodiments.
Figure 10B:
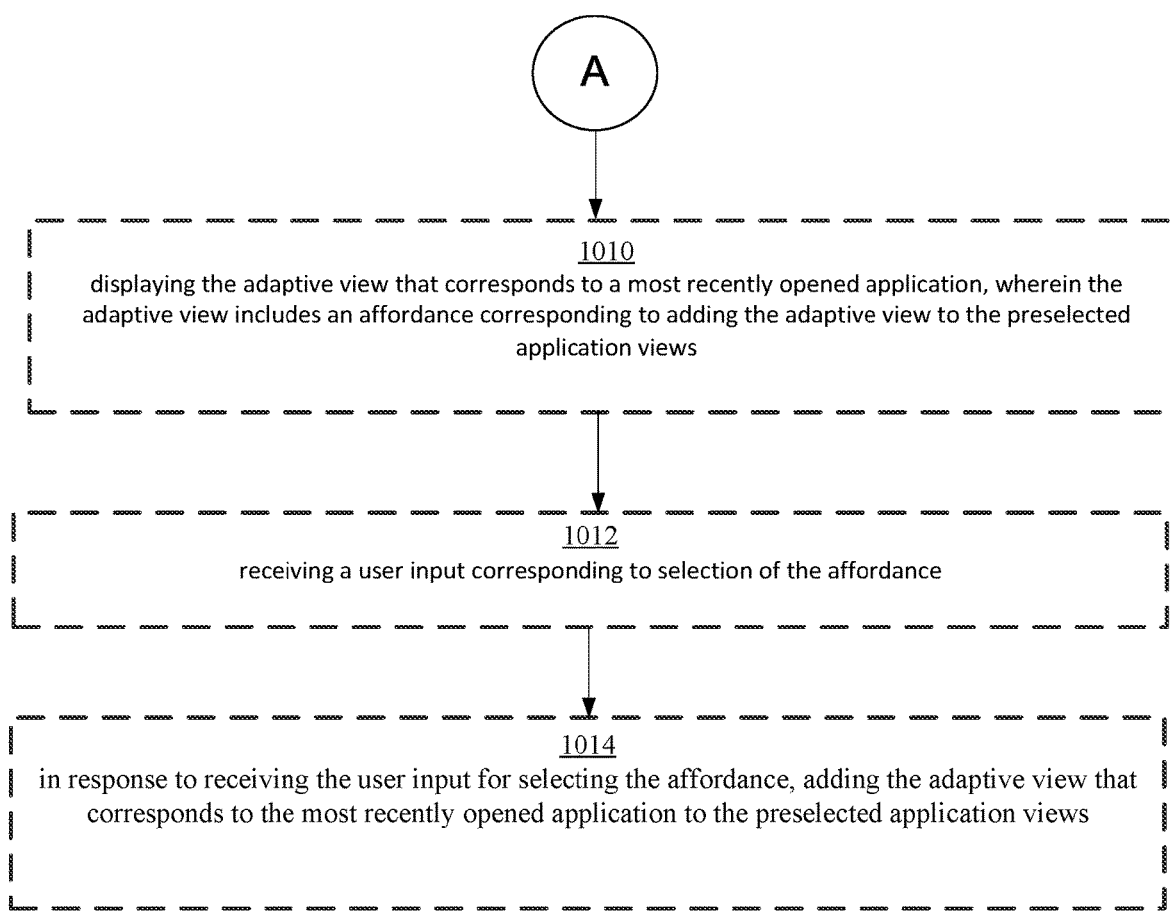
Figure 10D:
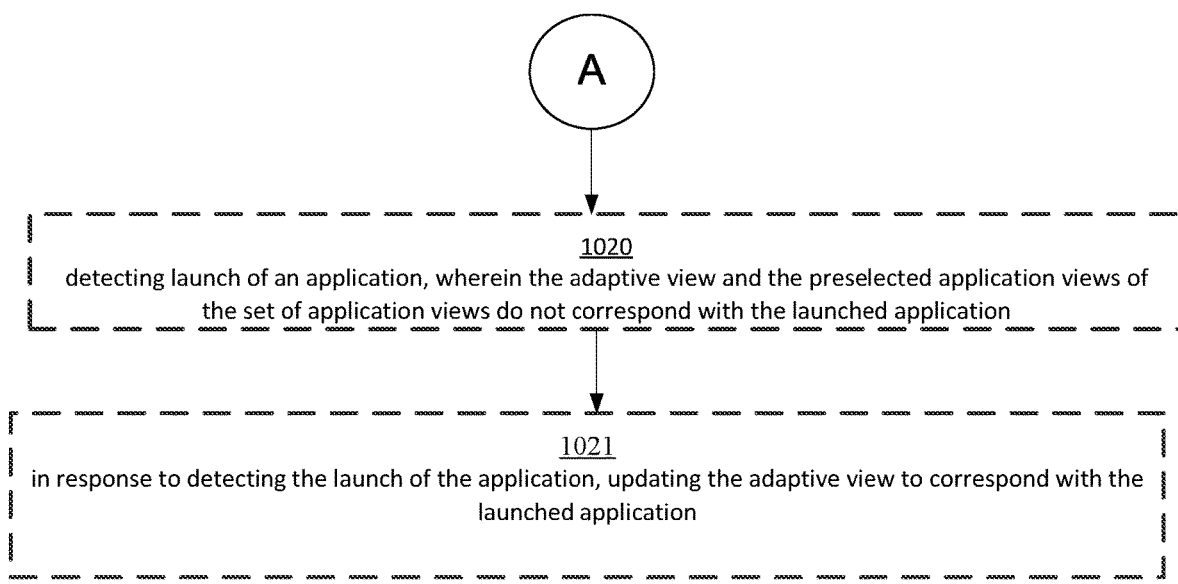
Figure 10E:
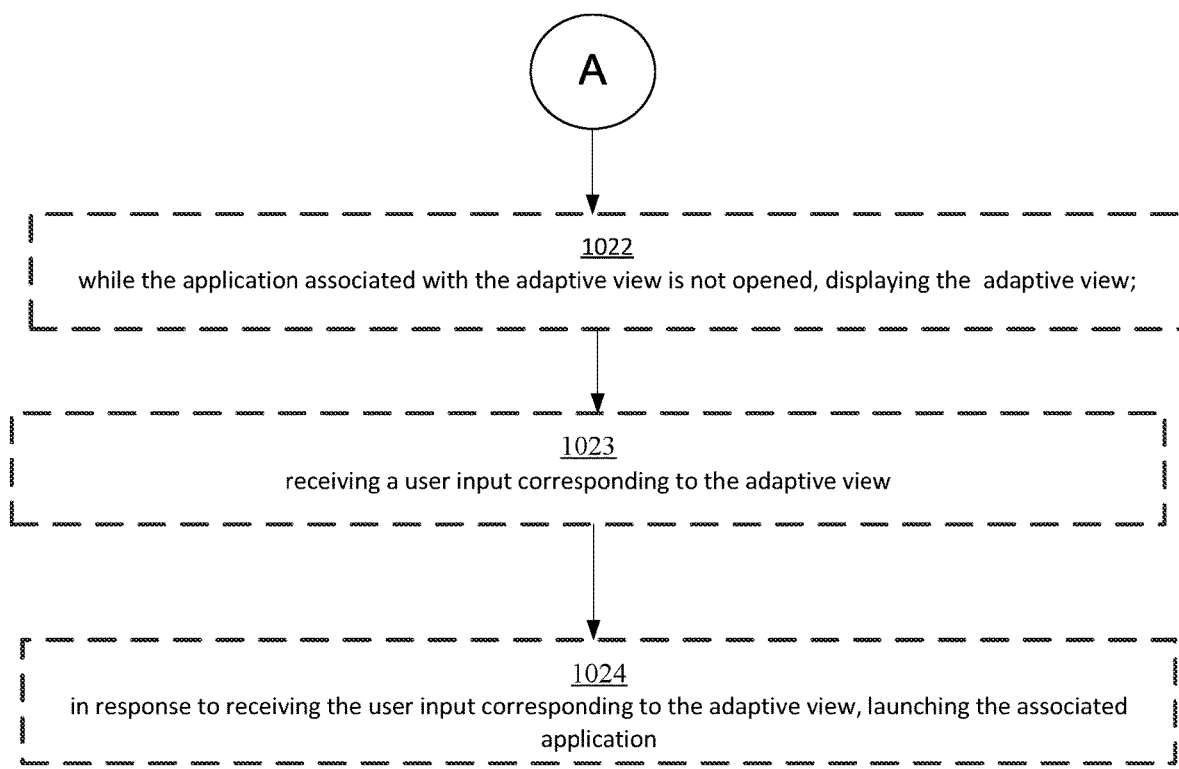
Figure 10F:
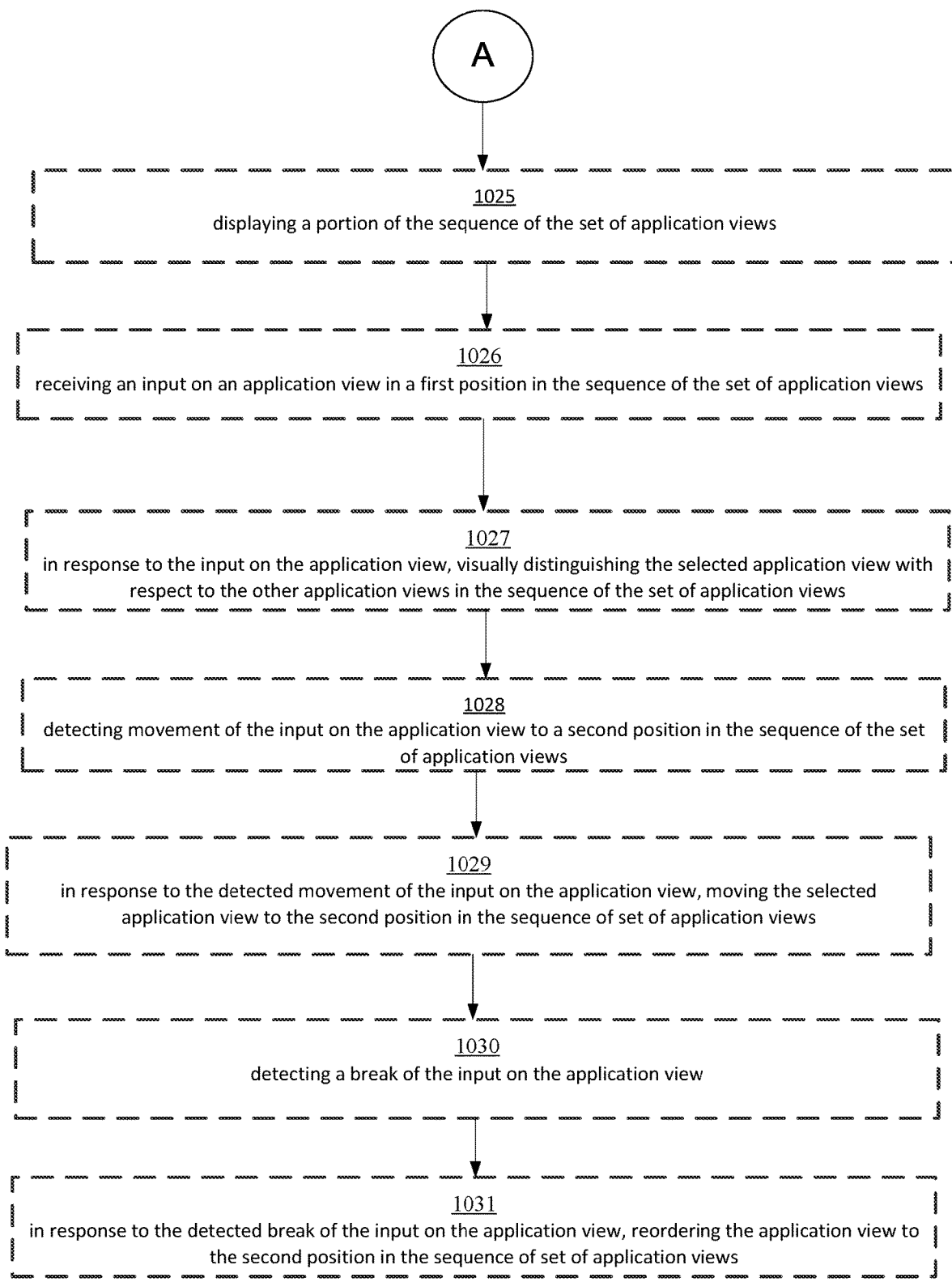
Figure 10G:
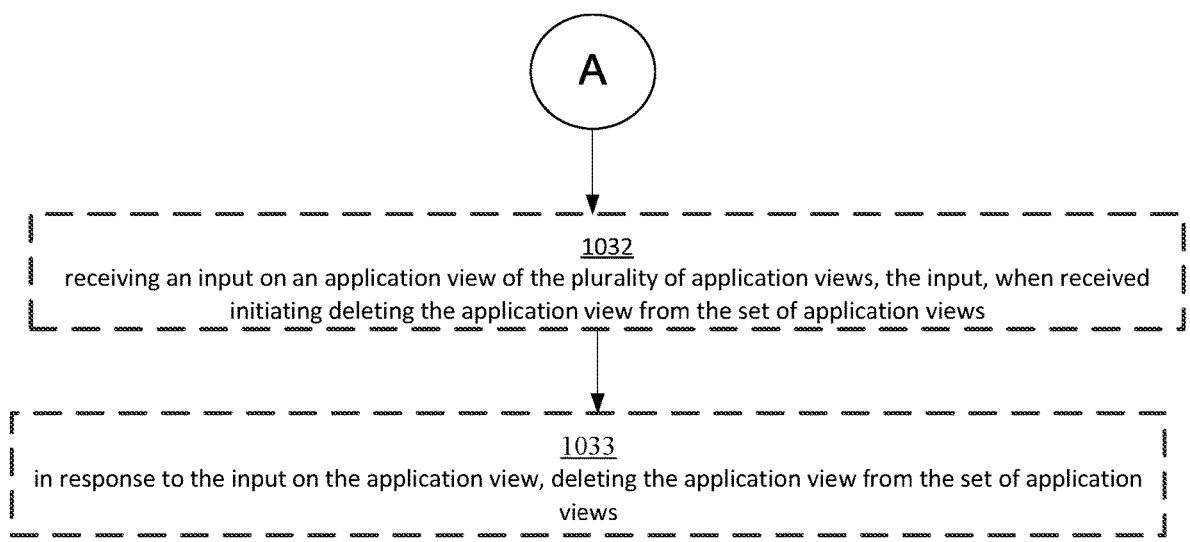
Figure 10H:
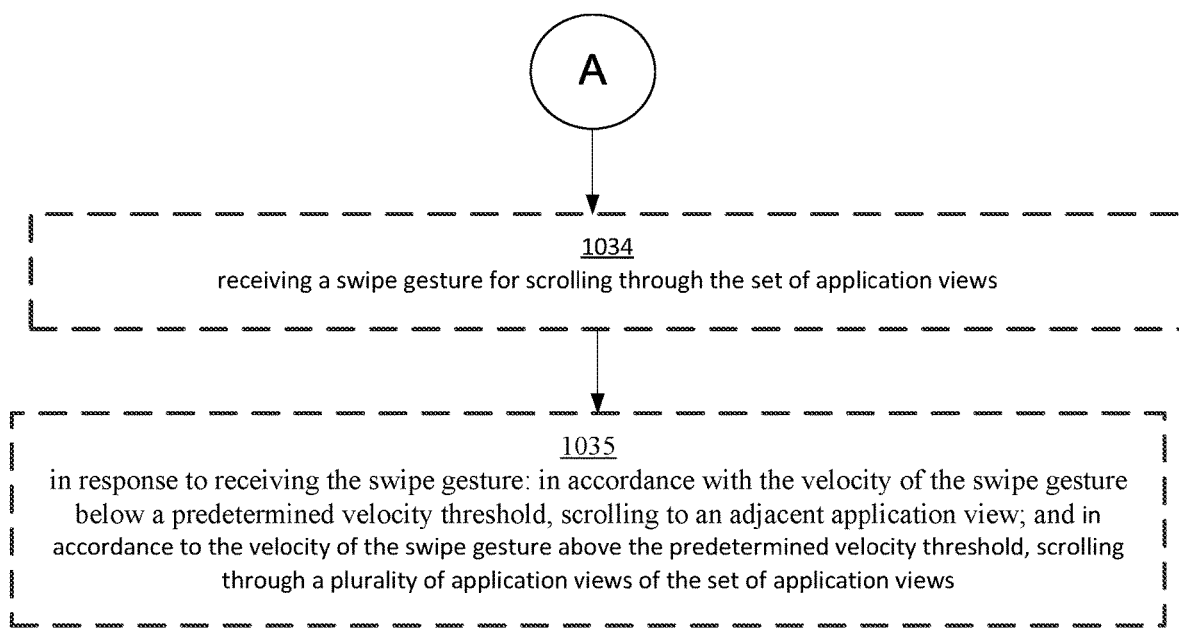
Figure 10I:
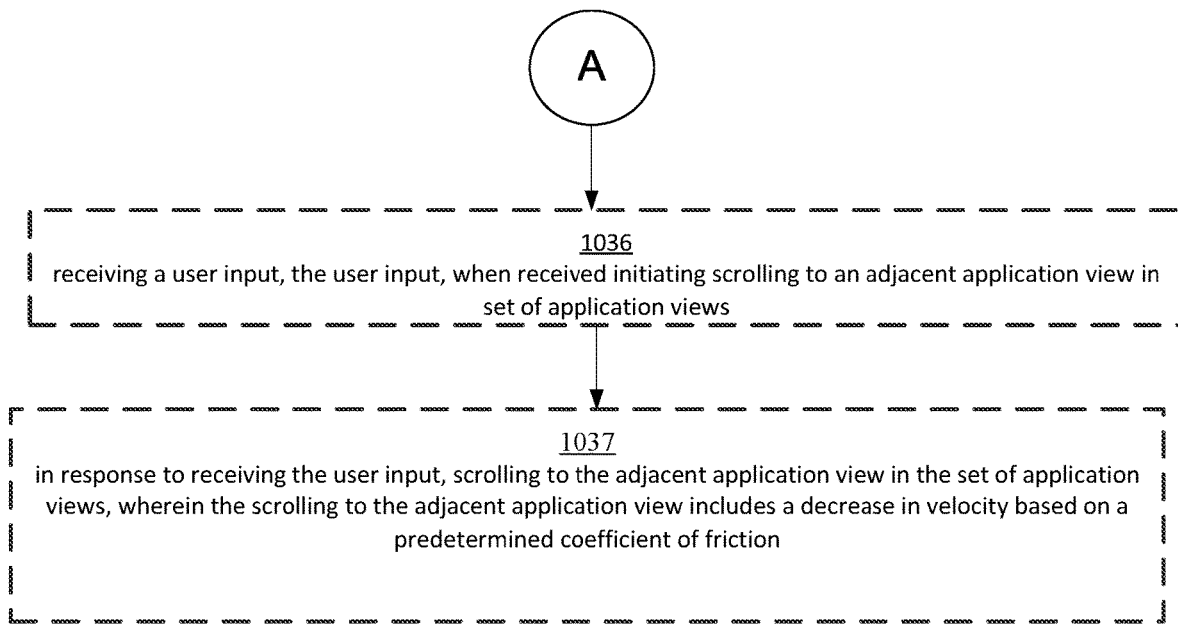
Figure 10J:
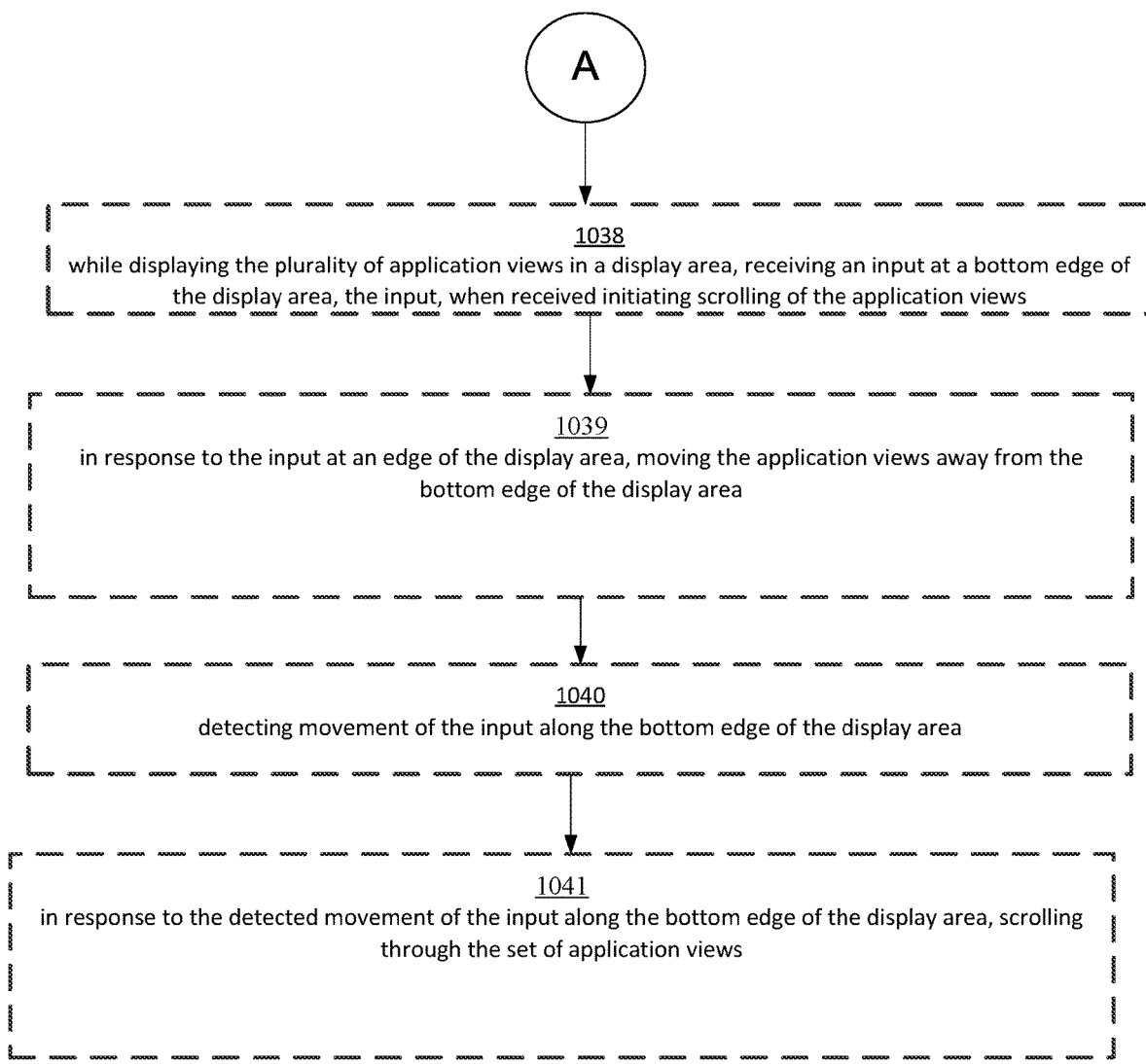
Figure 10L:
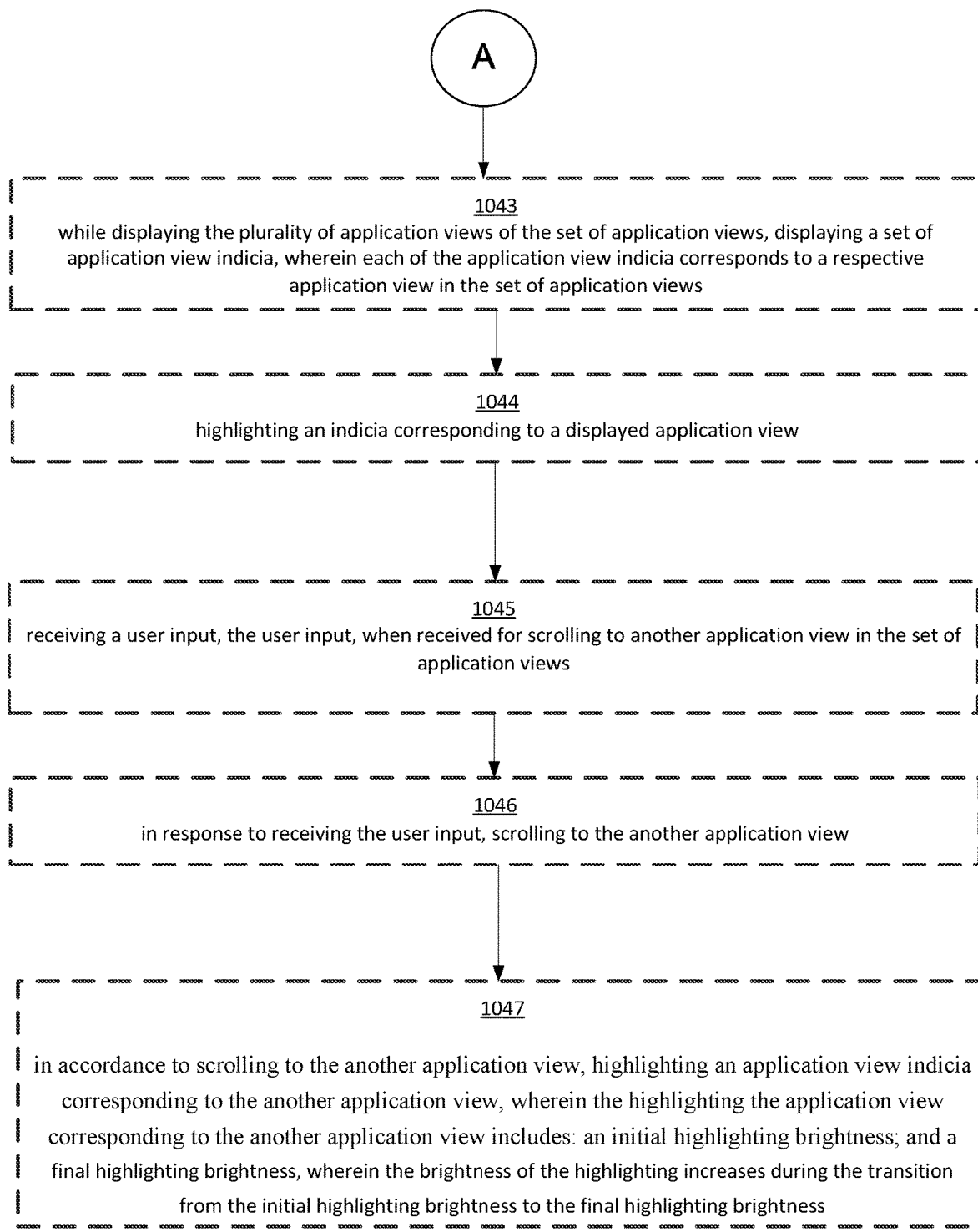
Figure 10M:
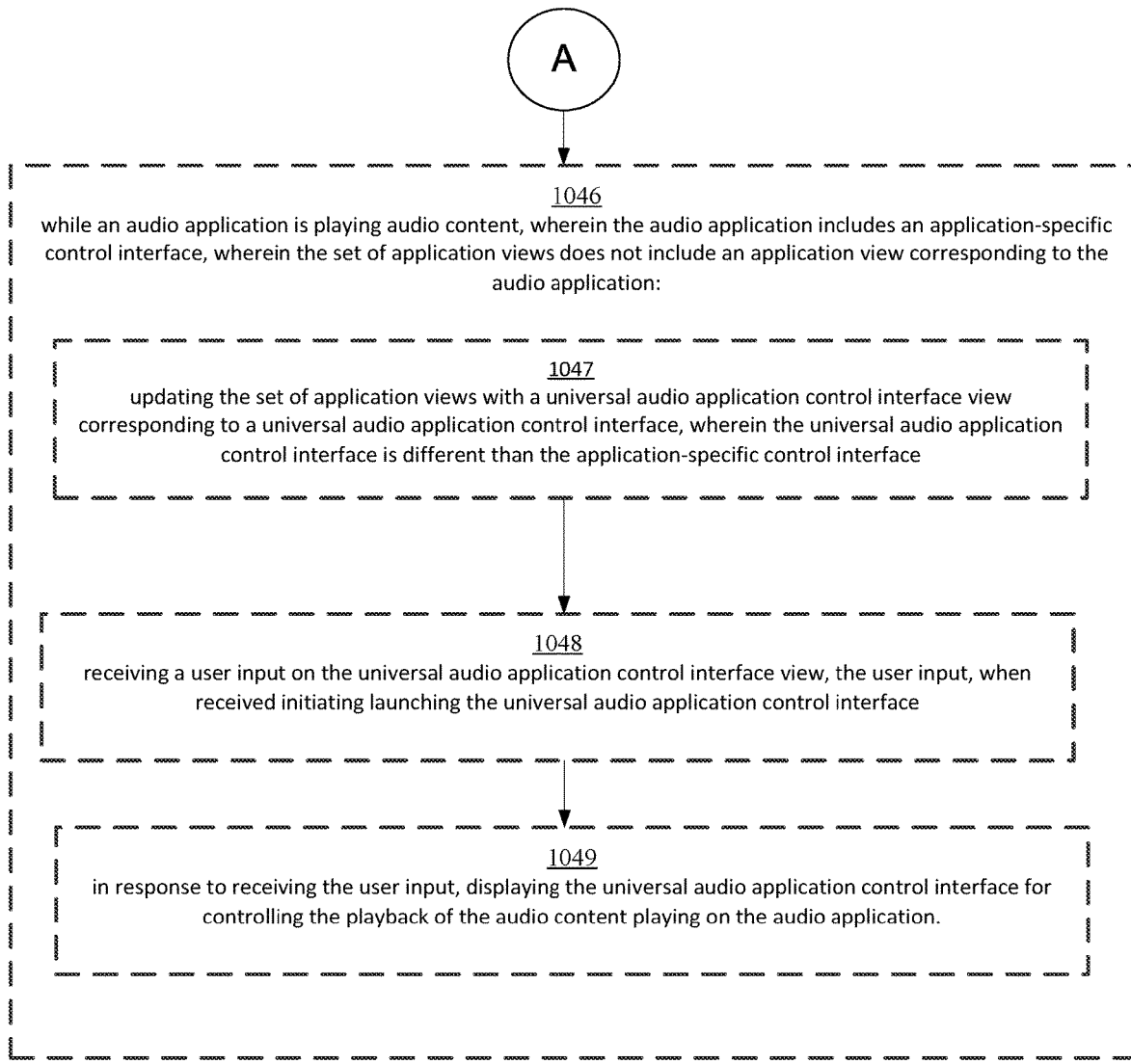
Figure 10N:
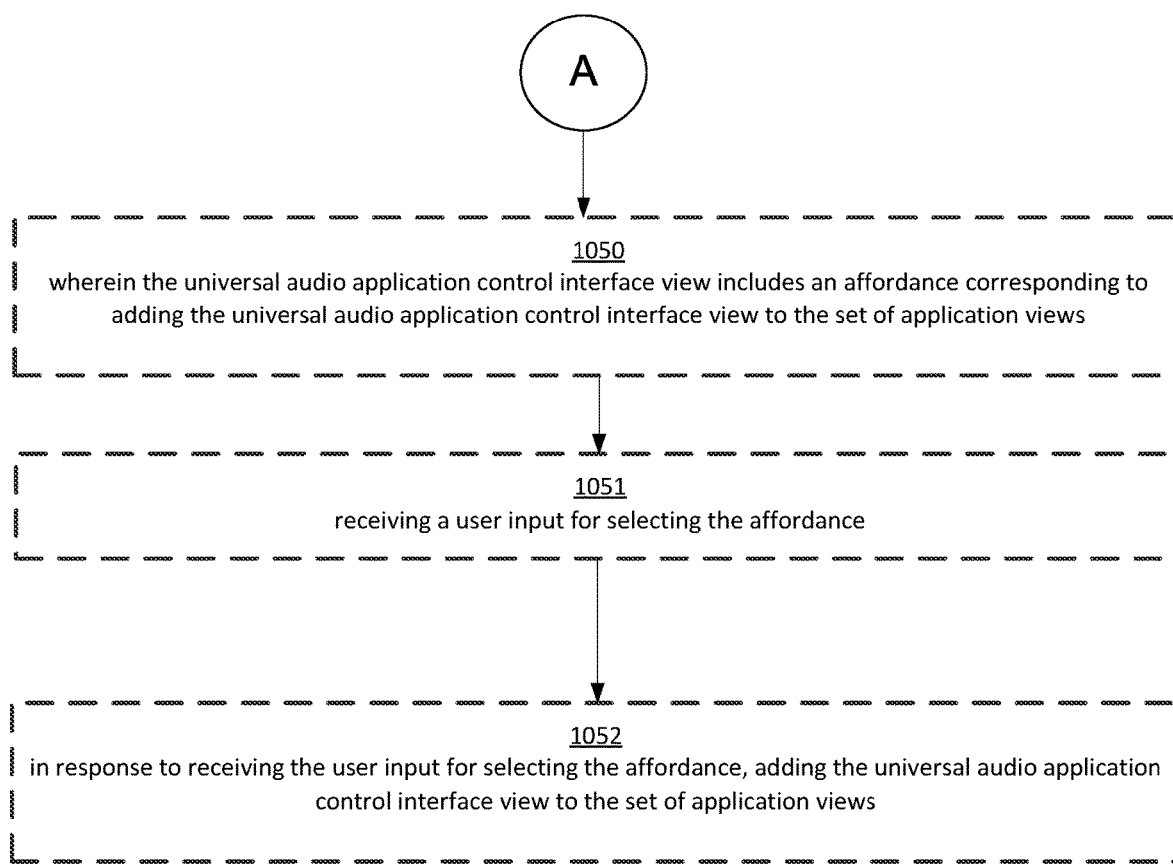
Figure 10O:
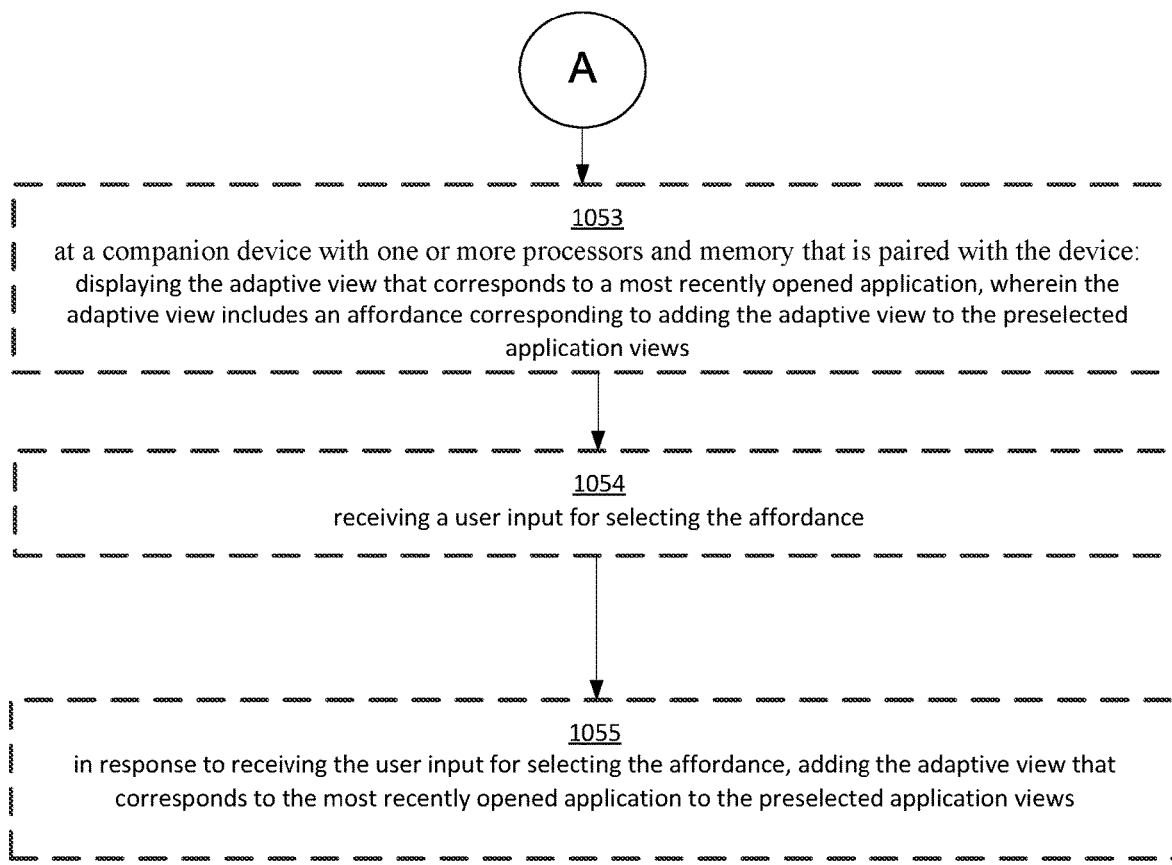
Figure 10P:
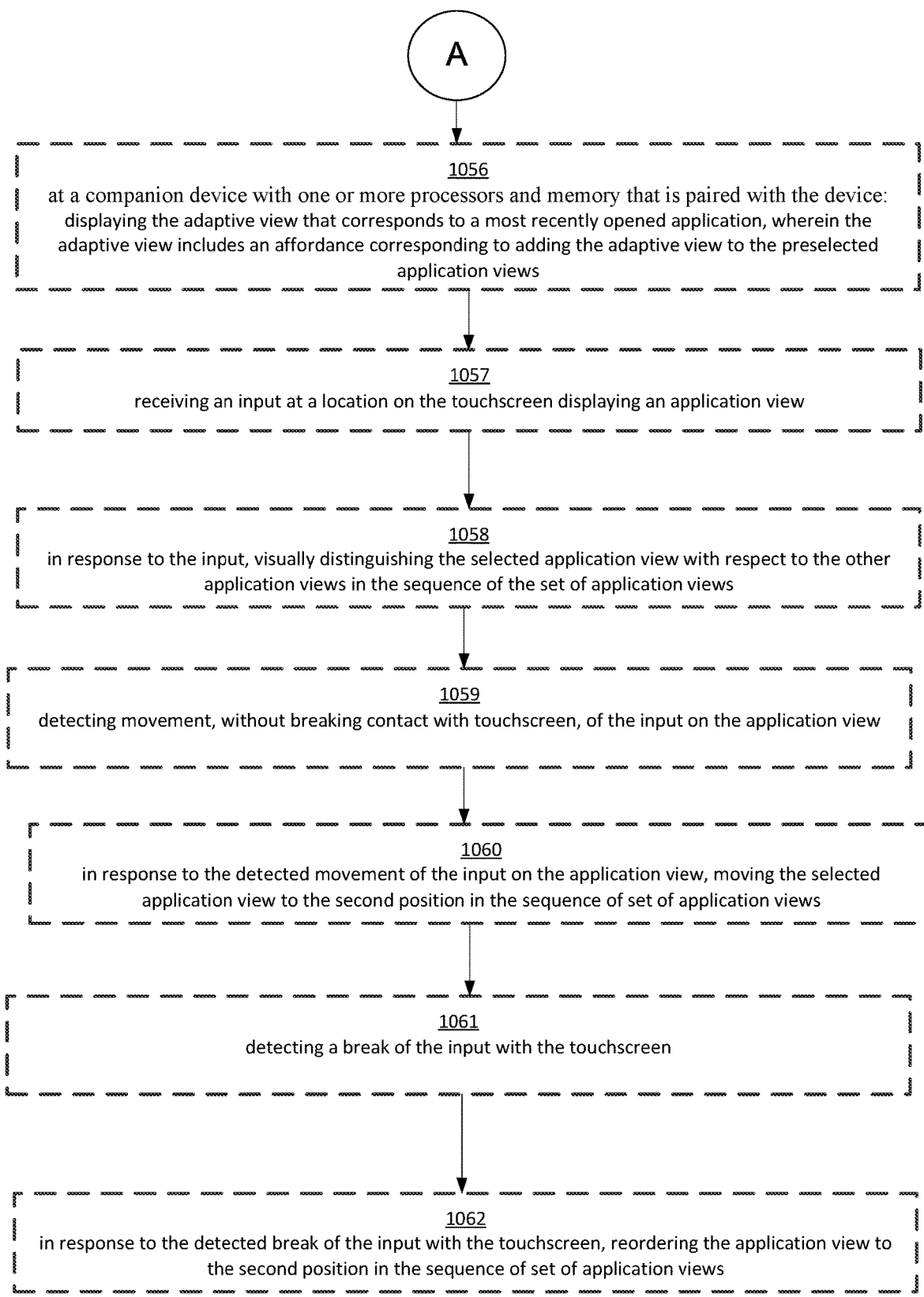
Figure 10Q:
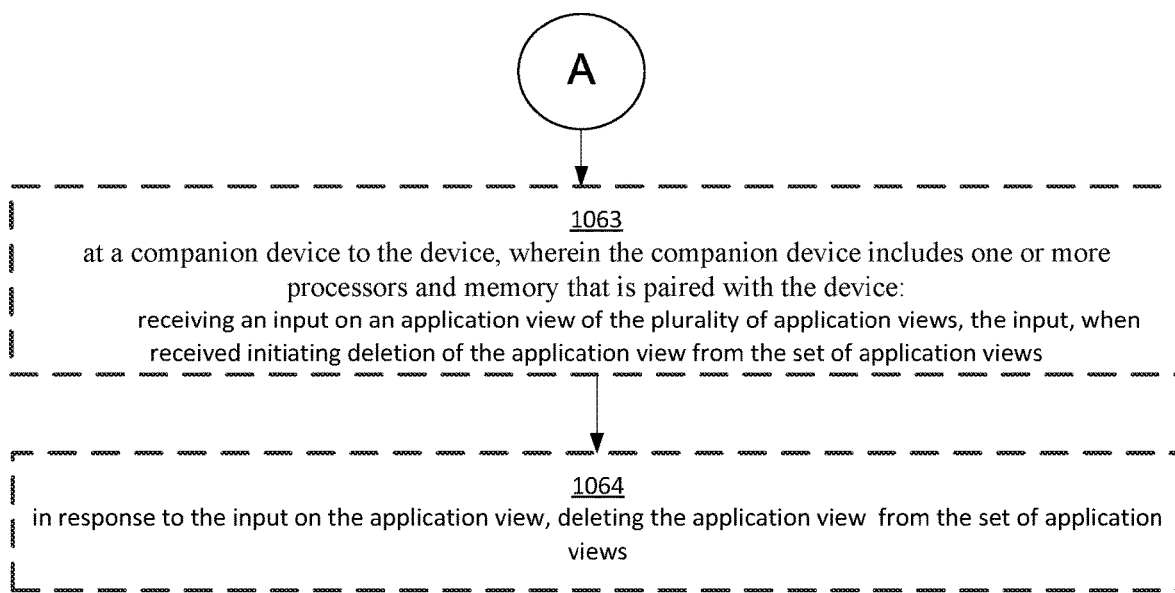

Referring to FIGS. 9A-9B, application views can be added to the set of application view 630 via companion device 900 in the same manner as described with respect to device 600, as described herein.

Referring to FIG. 9A, at companion device 900, the adaptive application view (e.g., application view 635) includes affordance 639 (e.g., "add to dock" button) that corresponds to adding the adaptive view to the preselected application views of the set of application views. In response to receiving user input 649 (e.g., tap gesture) for selecting the affordance, the adaptive application view (e.g., application view 635) that corresponds to the most recently opened application (e.g., stocks application) is added to the preselected application views. For example, referring to FIG. 9B, in response to user input 649, device 900 adds application view 635 to the preselected application views of the set of application views and is no longer an adaptive application view.

Referring to FIGS. 9C-9F, application views can be reordered via companion device 900 in the same manner as described with respect to device 600, as described herein.

Figure 9C:
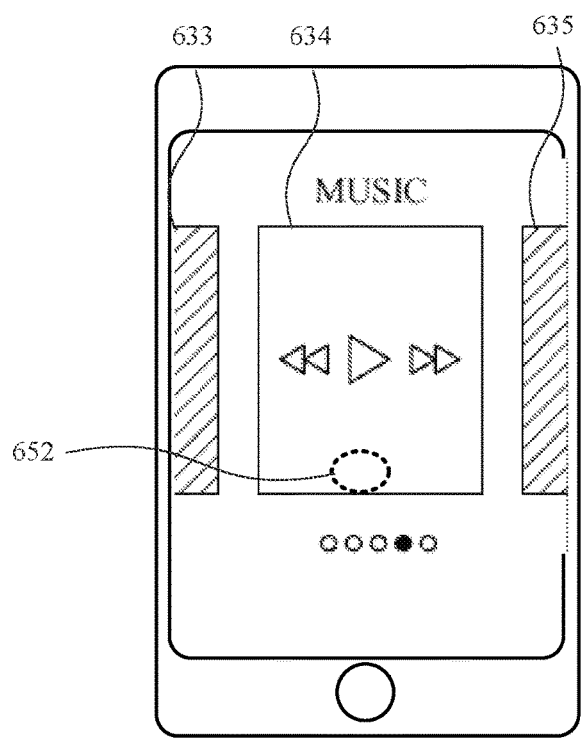

FIGS. 9C-9F illustrates reordering the application views in the set of application views 630 via companion device 900 (similar to reordering depicted in FIGS. 6H-6K). Referring to FIG. 9C, user input 652 (e.g., hard press) is received on preselected application view 634 that corresponds to a music application. User input 652 is for selecting and reordering the preselected application view in the sequence of application views in the set of application views.

Figure 9D:
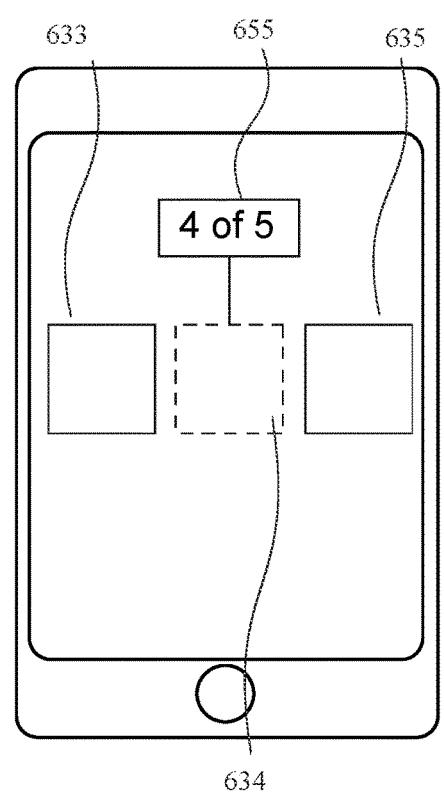

Referring to FIG. 9D, in response to user input 652, device 900 visually distinguishes the selected preselected view 634 that corresponds to the music application from the other views in the set of application views. The visual distinguishing of the selected application view may include change of size (e.g., larger than the other application views), change of location (e.g., vertical offset from the other application views), change to being translucent, change to being dimmed, etc. In some embodiments, each of the displayed application views are reduced in size in response to user input 652 such that more application views are able to be concurrently displayed to aid in reordering of the selected application view.

Textual reference 655, in some embodiments, is displayed associated with the selected application view. Textual reference 655 indicates the current sequential order of the selected application view (e.g., 4 of 5) in the sequence of the set of application views.

Figure 9E:
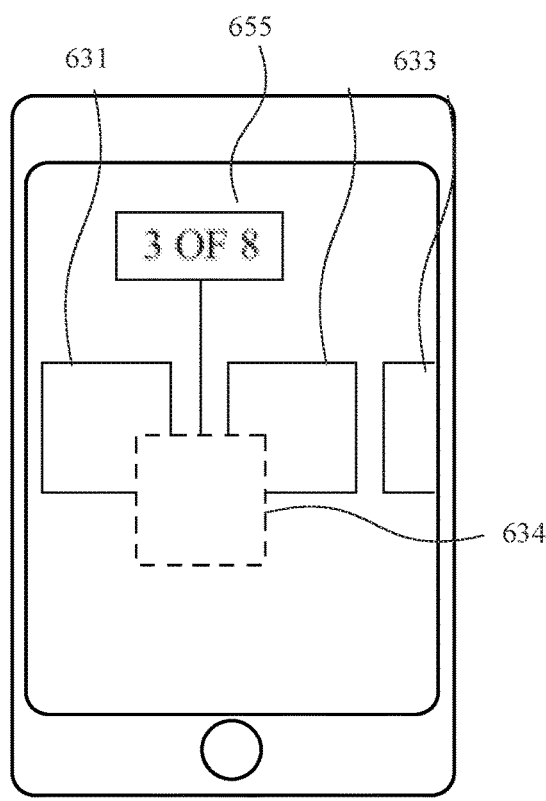

Referring to FIG. 9E, in response detecting movement of user input 652 (e.g., slide to the left) to a new location in the sequence of the set of application views, device 900 translates the selected application view 634 in accordance to the detected movement of user input 652 to the new location in the sequence of the set of application views. As illustrated in FIG. 9E, the selected application view is translated to a new position between the application view 631 and application view 632 in the set of application views 630. As indicated by textual reference 655, in response to the movement of user input 652, the selected application view is translated to a new position (e.g., 2 of 5) in the sequence of the set of application views.

Figure 9F:
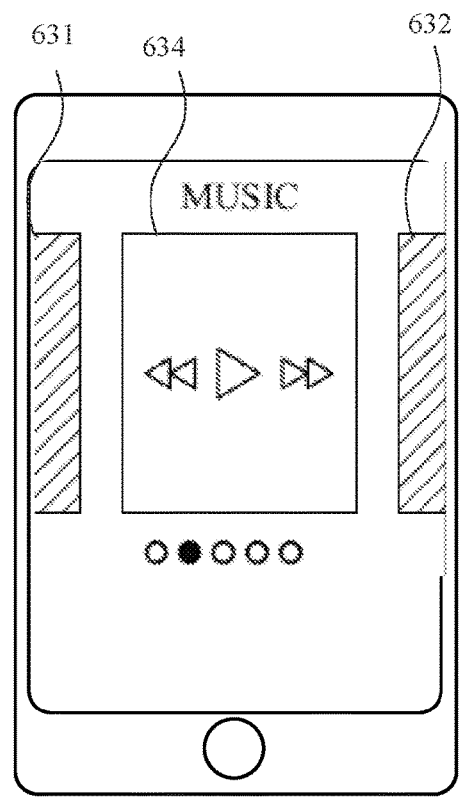

Referring to FIG. 9F, in response to a break in the contact of user input 652, device 900 places the selected application view 634 between application views 631 and 632 such that selected application view 634 is reordered in the sequence of the set of application views. In particular, application view 634 is reordered to the second application view (from the fourth application view) in the sequence of the set of application views. Additionally, the application views move to make space for the newly reordered application view. For example, device 900 moves the application view 631 to the left and/or moves application views 632 and 633 to right to provide room for the reordering of application view 634 to its new position between application view 631 and application view 632.

Figure 9G:
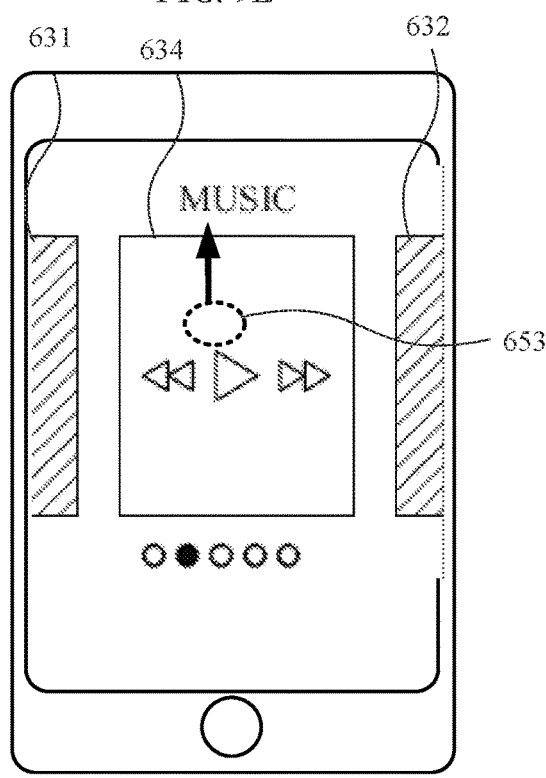
Figure 9H:
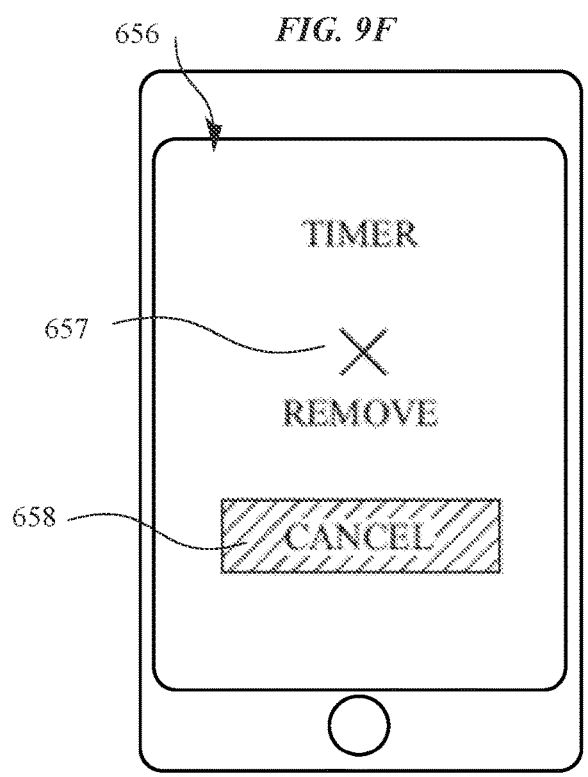
Figure 9I:
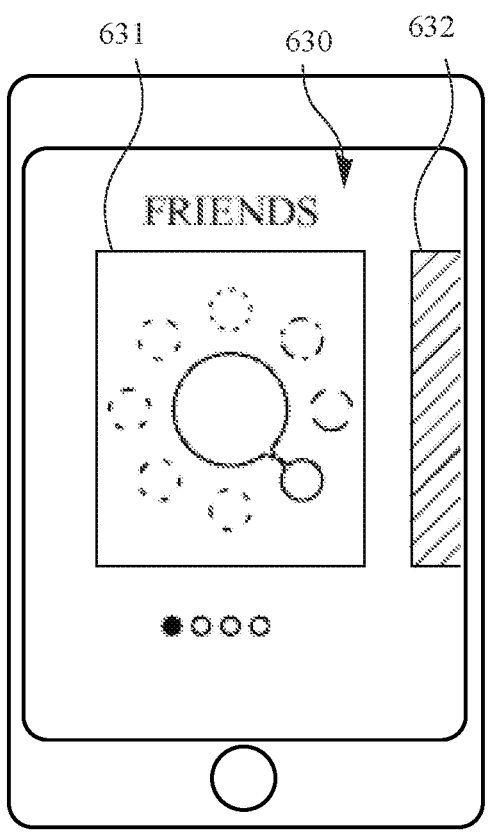

FIGS. 9G-9I illustrates removing an application view from the set of application views 630 via companion device 900 (similar to FIGS. 6L-6N). Referring to FIG. 9G, user input 653 (e.g., upward swipe gesture) is detected on application view 634 that corresponds a music application. User input 653 (e.g., upward swipe gesture) is for removing an application view from the set of application views.

Referring to FIG. 9H, in response to user input 653 that corresponds to removing an application view from the set of application views 630, an application view removal user interface 656 is displayed. Application view removal user interface 656 includes application view removal affordance 657 and cancel affordance 658. Application view removal affordance 657, when selected removes or deletes the selected application view (e.g., application view 634) from the set of application views 630. Cancel affordance 658 cancels the selection of an application view (e.g., application view 634) for deletion from the set of application views.

Referring to FIG. 9I, in response to selection of application view removal affordance 657, the selected application view 634 (that is currently in second application view in the set of application views 630) is removed from the set of application views.

Additionally, the application views move to close the space left by the removed application view. For example, application view 631 moves to the right and/or application views 632 (and the rest of the sequence of the set of application views 630) move to left to close the open space that once held the removed application view.

As a result of removing an application view, as illustrated in FIGS. 9G-9I, the set of application views 630 is reduced to four application views (from five application views). Similarly, the number of application view indicia (or page dots) 640 are reduced to four indicia (from five indicia) that respectively correspond to each of the application views in the set of application views.

FIGS. 10A-10Q is a flow diagram illustrating a method for displaying application views in a set of application views using an electronic device in accordance with some embodiments. Method 1000 is performed at a device (e.g., 100, 300, 500, 600, or 900) with a display, one or processors and memory. Some operations in method 1000 are, optionally, combined, the order of some operations is, optionally, changed, and some operations are, optionally, omitted.

As described below, method 1000 provides an intuitive way for displaying application views in a set of application views. The method reduces the cognitive burden on a user for viewing application views in a set of application views, thereby creating a more efficient human-machine interface. For battery-operated computing devices, enabling a user to view application views in a set of application views faster and more efficiently conserves power and increases the time between battery charges.

At block 1002, a user input is received at the device (e.g., user input 614), the input, when received initiates display of a plurality of application views of a set of application views.

At block 1004, in response to receiving the user input, a plurality of application views of the set of application views (e.g., set of application views 630) are displayed (e.g., FIG. 6B). The set of application views includes preselected application views and an adaptive view that corresponds to a most recently opened application that is not one of the preselected application views.

In some embodiments, as shown in FIG. 6E, the adaptive view (e.g., adaptive view 635) that corresponds to a most recently opened application is displayed, wherein the adaptive view includes an affordance (e.g., affordance 639) corresponding to adding the adaptive view to the preselected application views (1010). A user input (e.g., input 649) corresponding to selection of the affordance is received (1012). In response to receiving the user input for selecting the affordance, the adaptive view that corresponds to the most recently opened application is added to the preselected application views (1014).

In some embodiments, as shown in FIG. 6D, the set of application views are displayed in a sequence, and the adaptive view is displayed at a terminus of the sequence of the set of application views (1006).

In some embodiments, as shown in FIG. 6E, the user input (e.g., user input 614) is received while displaying an open application that is the most recently opened application that is not one of the preselected application views (1015), and further in response to receiving the user input, the adaptive view that corresponds to the most recently opened application that is not one of the preselected application views is displayed (1016). The adaptive view includes an affordance (e.g., affordance 639) corresponding to adding the adaptive view to the preselected application views. A user input (e.g., input 649) is received corresponding to selection of the affordance (1017). In response to receiving the user input for selecting the affordance, the adaptive view that corresponds to the most recently opened application is added to the preselected application views (1018).

In some embodiments, as shown in FIG. 6F, launch of an application is detected, wherein the adaptive view and the preselected application views of the set of application views do not correspond with the launched application (1020). In response to detecting the launch of the application, the adaptive view to correspond with the launched application is updated (1021).

In some embodiments, as shown in FIG. 6H, the set of application views are displayed in a sequence. In response to receiving user input corresponding to display of the sequence of the set of application views, a subset of application views of the sequence of the set of application views are displayed (e.g., application views 633, 634 and 635). The displaying the subset of application views comprises displaying an application view of a most recently opened application in a center of the sequence of the subset of application views (1005).

In some embodiments, as shown in FIG. 6H, the set of application views are displayed in a sequence. In response to receiving user input corresponding to display of the sequence of the set of application views, a subset of application views of the sequence of the set of application views are displayed (e.g., application views 633, 634 and 635). The displaying the subset of application views comprises displaying a first application view in the sequence of the set of application in a center of the sequence of the subset of application views (e.g., application view 634), and displaying at least a partial view of a second application view sequential to the first application view in the sequence of the set of application views (e.g., application view 633 or 634), wherein the second application view is dimmed with respect to the first application view (1006).

In some embodiments, as shown in FIG. 6G, while the application associated with the adaptive view is not opened, the adaptive view is displayed (1022). A user input corresponding to the adaptive view is received (1023), and in response to receiving the user input corresponding to the adaptive view, the associated application is launched (1024).

In some embodiments, a portion of the sequence of the set of application views are displayed (1025). As shown in FIG. 6H, an input on an application view in a first position in the sequence of the set of application views is received (1026). As shown in FIG. 6I, in response to the input on the application view, the selected application view with respect to the other application views in the sequence of the set of application views is visually distinguished (1027). Movement of the input on the application view to a second position in the sequence of the set of application views is detected (1028). As shown in FIG. 6J, in response to the detected movement of the input on the application view, the selected application view to the second position in the sequence of set of application views is moved (1029). As shown in FIG. 6J, a break of the input on the application view is detected (1030), and in response to the detected break of the input on the application view, the application view is reordered to the second position in the sequence of set of application views (1031).

In some embodiments, as shown in FIG. 6L, an input on an application view of the plurality of application views is received, the input, when received initiates deleting the application view from the set of application views (1032). As shown in FIGS. 6M-6N, in response to the input on the application view, the application view from the set of application views is deleted (1033).

In some embodiments, as shown in FIG. 7A, a swipe gesture for scrolling through the set of application views is received (1034). As shown in FIGS. 7B-7C, in response to receiving the swipe gesture: in accordance with the velocity of the swipe gesture below a predetermined velocity threshold, scroll to an adjacent application view, and in accordance to the velocity of the swipe gesture above the predetermined velocity threshold, scroll through a plurality of application views of the set of application views (1035).

In some embodiments, as shown in FIG. 7D, a user input is received, the user input, when received initiates scrolling to an adjacent application view in set of application views (1036). A shown in FIG. 7E, in response to receiving the user input, scrolling to the adjacent application view in the set of application views, wherein the scrolling to the adjacent application view includes a decrease in velocity based on a predetermined coefficient of friction (1037).

In some embodiments, as shown in FIG. 7E, while displaying the plurality of application views in a display area, an input at a bottom edge of the display area is received, the input, when received initiates scrolling of the application views (1038). As shown in FIG. 7F, in response to the input at an edge of the display area, move the application views away from the bottom edge of the display area (1039). As shown in FIG. 7G, movement of the input along the bottom edge of the display area is detected (1040). As shown in FIGS. 7G-7H, in response to the detected movement of the input along the bottom edge of the display area, scroll through the set of application views (1041).

In some embodiments, as shown in FIG. 6F, while displaying the plurality of application views of the set of application views, a set of application view indicia is displayed (e.g., indicia 640). Each of the application view indicia corresponds to a respective application view in the set of application views. The application view indicia corresponding to the adaptive view is visually distinguished with respect to the application view indicia corresponding to the preselected application views (1042).

In some embodiments, as shown in FIG. 7J, while displaying the plurality of application views of the set of application views, a set of application view indicia is displayed, wherein each of the application view indicia corresponds to a respective application view in the set of application views (1043). As shown in FIG. 7J, an indicia corresponding to a displayed application view is highlighted 1044). A user input is received, the user input, when received for scrolling to another application view in the set of application views (1045). In response to receiving the user input, scroll to the another application view (1046). As shown in FIGS. 7K-7L, in accordance to scrolling to the another application view, highlight an application view indicia corresponding to the another application view, wherein the highlighting the application view corresponding to the another application view includes an initial highlighting brightness, and a final highlighting brightness, wherein the brightness of the highlighting increases during the transition from the initial highlighting brightness to the final highlighting brightness (1047).

In some embodiments, while an audio application is playing audio content, wherein the audio application includes an application-specific control interface and the set of application views does not include an application view corresponding to the audio application (1046): as shown in FIG. 8A, the set of application views is updated with a universal audio application control interface view corresponding to a universal audio application control interface, wherein the universal audio application control interface is different than the application-specific control interface that is not a part of the dock (1047). A user input on the universal audio application control interface view is received (e.g., input 810), the user input, when received initiating launching the universal audio application control interface (1048). As shown in FIG. 8B, in response to receiving the user input, the universal audio application control interface for controlling the playback of the audio content playing on the audio application is displayed (1049).

In some embodiments, as shown in FIG. 8A, wherein the universal audio application control interface view includes an affordance corresponding to adding the universal audio application control interface view to the set of application views (1050). As shown in FIG. 8C, a user input for selecting the affordance is received (1051), and in response to receiving the user input for selecting the affordance, add the universal audio application control interface view to the set of application views (1052).

In some embodiments, as shown in FIG. 9A, at a companion device (e.g., device 900) with one or more processors and memory that is paired with the device (e.g., device 600) the adaptive view that corresponds to a most recently opened application is displayed, wherein the adaptive view includes an affordance corresponding to adding the adaptive view to the preselected application views (1053). As shown in FIG. 9B, a user input for selecting the affordance is received (1054), and in response to receiving the user input for selecting the affordance, the adaptive view that corresponds to the most recently opened application is added to the preselected application views (1055).

In some embodiments, as shown in FIG. 9C. at a companion device (e.g., device 900) with one or more processors, touchscreen and memory that is paired with the device (e.g., device 600) a portion of the sequence of the set of application views is displayed (1056). An input is received at a location on the touchscreen displaying an application view in a first position in the sequence of the set of application views (1057). As shown in FIG. 9D, in response to the input, the selected application view is visually distinguished with respect to the other application views in the sequence of the set of application views (1058). Movement is detected, without breaking contact with touchscreen, of the input on the application view to a second position in the sequence of the set of application views (1059). As shown in FIG. 9E, in response to the detected movement of the input on the application view, the selected application view is moved to the second position in the sequence of set of application views (1060). As shown in FIG. 9F, a break of the input with the touchscreen is detected (1061), and in response to the detected break of the input with the touchscreen, the application view is reordered to the second position in the sequence of set of application views (1062).

In some embodiments, as shown in FIG. 9G, at a companion device (e.g., device 900) to the device (e.g., device 600), wherein the companion device includes one or more processors and memory that is paired with the device, an input is received on an application view of the plurality of application views, the input, when received initiates deletion of the application view from the set of application views (1063). As shown in FIG. 9I, in response to the input on the application view, the application view is deleted from the set of application views (1064).

Note that details of the processes described above with respect to method 1000 (e.g., FIGS. 10A-10Q) are also applicable in an analogous manner to the methods described below. For example, method 1300 optionally includes one or more of the characteristics of the various methods described above with reference to method 1000. For example, method 1300 includes updating application views that can be optionally implemented in method 1000. For brevity, these details are not repeated below.

Figure 11:
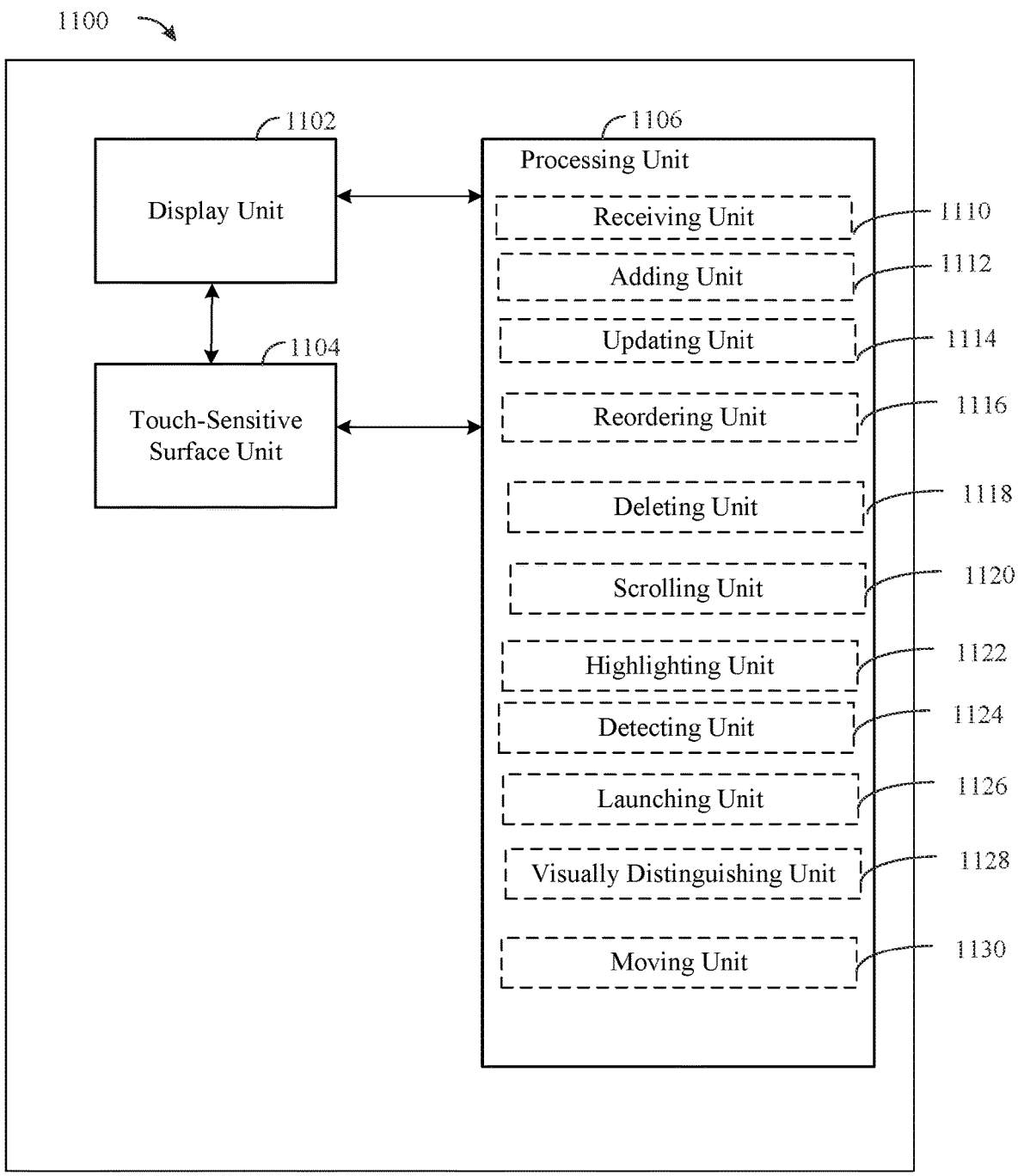
FIG. 11 shows an exemplary functional block diagram of an electronic device in accordance with some embodiments.

In accordance with some embodiments, FIG. 11 shows an exemplary functional block diagram of an electronic device 1100 configured in accordance with the principles of the various described embodiments. In accordance with some embodiments, the functional blocks of electronic device 1100 are configured to perform the techniques described above. The functional blocks of the device 1100 are, optionally, implemented by hardware, software, or a combination of hardware and software to carry out the principles of the various described examples. It is understood by persons of skill in the art that the functional blocks described in FIG. 11 are, optionally, combined or separated into sub-blocks to implement the principles of the various described examples. Therefore, the description herein optionally supports any possible combination or separation or further definition of the functional blocks described herein.

As shown in FIG. 11, an electronic device 1100 includes a display unit 1102 configured to display a graphic user interface, optionally, a touch-sensitive surface unit 1104 configured to receive contacts, and a processing unit 1106 coupled to the display unit 1102 and, optionally, the touch-sensitive surface unit 1104. In some embodiments, the processing unit 1106 includes a receiving unit 1110, an adding unit 1112, an updating unit 1114, a reordering unit 1116, a deleting unit 1118, a scrolling unit 1120, a highlighting unit 1122, detecting unit 1124, launching unit 1126, visually distinguishing unit 1128, and moving unit 1130.

The processing unit 1106 is configured to: receive a user input at the device (e.g., with the receiving unit 1110), the input, when received initiates display of a plurality of application views of a set of application views. In response to receiving the user input, displaying (e.g., with display unit 1102) the plurality of application views of the set of application views 630. The set of application views includes preselected application views and an adaptive view that corresponds to a most recently opened application that is not one of the preselected application views.

In some embodiments, the processing unit 1106 is configured to: display (e.g., with the display unit 1102) the adaptive view that corresponds to a most recently opened application, wherein the adaptive view includes an affordance corresponding to adding the adaptive view to the preselected application views. Receive a user input corresponding to selection of the affordance. In response to receiving the user input for selecting the affordance, add (e.g., with the adding unit 1112) the adaptive view that corresponds to the most recently opened application to the preselected application views In some embodiments, the processing unit 1106 is configured to: display (e.g., with the display unit 1102) the set of application views in a sequence, and display (e.g., with the display unit 1102) the adaptive view at a terminus of the sequence of the set of application views.

In some embodiments, the processing unit 1106 is configured to: receive (e.g., with the receiving unit 1110) the user input while displaying an open application that is the most recently opened application that is not one of the preselected application views, and further in response to receiving the user input, the adaptive view that corresponds to the most recently opened application that is not one of the preselected application views is displayed. The adaptive view includes an affordance corresponding to adding the adaptive view to the preselected application views. Receive (e.g., with receiving unit 1110) user input corresponding to selection of the affordance. In response to receiving the user input for selecting the affordance, add (e.g., with the adding unit 1112) the adaptive view that corresponds to the most recently opened application is added to the preselected application views.

In some embodiments, the processing unit 1106 is configured to: detect launch (e.g., with the detecting unit 1124) of an application, wherein the adaptive view and the preselected application views of the set of application views do not correspond with the launched application. In response to detecting the launch of the application, update (e.g., with the updating unit 1114) the adaptive view to correspond with the launched application.

In some embodiments, the processing unit 1106 is configured to: display (e.g., with the displaying unit 1102) the set of application views in a sequence. In response to receiving user input corresponding to display of the sequence of the set of application views, display (e.g., with the displaying unit 1102) a subset of application views of the sequence of the set of application views. The processing unit 1106 is further configured to: display (e.g., with the displaying unit 1102) an application view of a most recently opened application in a center of the sequence of the subset of application views.

In some embodiments, the processing unit 1106 is configured to: display (e.g., with the displaying unit 1102) the set of application views in a sequence. In response to receiving user input corresponding to display of the sequence of the set of application views, display (e.g., with the displaying unit 1102) a subset of application views of the sequence of the set of application views. The displaying the subset of application views comprises displaying a first application view in the sequence of the set of application in a center of the sequence of the subset of application views, and displaying at least a partial view of a second application view sequential to the first application view in the sequence of the set of application views, wherein the second application view is dimmed with respect to the first application view.

In some embodiments, the processing unit 1106 is configured to: while the application associated with the adaptive view is not opened, display (e.g., with the displaying unit 1102) the adaptive view. Receive (e.g., with receiving unit 1110) user input corresponding to the adaptive view, and in response to receiving the user input corresponding to the adaptive view, launch the associated application (e.g., with launching unit 1126).

In some embodiments, the processing unit 1106 is configured to: display (e.g., with display unit 1102) a portion of the sequence of the set of application views. Receive an input (e.g., with receiving unit 1110) on an application view in a first position in the sequence of the set of application views. In response to the input on the application view, visually distinguish (e.g., with visually distinguishing unit 1128) the selected application view with respect to the other application views in the sequence of the set of application views. Detecting movement (e.g., with detecting unit 1124) of the input on the application view to a second position in the sequence of the set of application views. In response to the detected movement of the input on the application view, move (e.g., with moving unit 1130) the selected application view to the second position in the sequence of set of application views. Detect a break of the input on the application view (e.g., with detecting unit 1124), and in response to the detected break of the input on the application view, reorder (e.g., with reordering unit 1116) the application view to the second position in the sequence of set of application views is reordered.

In some embodiments, the processing unit 1106 is configured to: receive (e.g., with receiving unit 1110) an input on an application view of the plurality of application views, the input, when received initiates deletion (e.g., with deleting unit 1118) the application view from the set of application views. In response to the input on the application view, delete (e.g., with deleting unit 1118) the application view from the set of application views.

In some embodiments, the processing unit 1106 is configured to: receive (e.g., with receiving unit 1110) a swipe gesture for scrolling through the set of application views. In response to receiving the swipe gesture: in accordance with the velocity of the swipe gesture below a predetermined velocity threshold, scroll (e.g., with scrolling unit 1120) to an adjacent application view, and in accordance to the velocity of the swipe gesture above the predetermined velocity threshold, scroll (e.g., with scrolling unit 1120) through a plurality of application views of the set of application views.

In some embodiments, the processing unit 1106 is configured to: receive (e.g., with receiving unit 1110) a user input, the user input, when received initiating scrolling to an adjacent application view in set of application views. In response to receiving the user input, scroll (e.g., with scrolling unit 1120) to the adjacent application view in the set of application views, wherein the scrolling to the adjacent application view includes a decrease in velocity based on a predetermined coefficient of friction.

In some embodiments, the processing unit 1106 is configured to: while displaying the plurality of application views in a display area, receive (e.g., with receiving unit 1110) an input at a bottom edge of the display area, the input, when received initiates scrolling of the application views. In response to the input at an edge of the display area, move (e.g., with moving unit 1130) the application views away from the bottom edge of the display area. Movement of the input along the bottom edge of the display area is detected. In response to the detected movement of the input along the bottom edge of the display area, scroll (e.g., with scrolling unit 1120) through the set of application views.

In some embodiments, the processing unit 1106 is configured to: while displaying the plurality of application views of the set of application views, display (e.g., with display unit 1102 a set of application view indicia is displayed. Each of the application view indicia corresponds to a respective application view in the set of application views. The application view indicia corresponds to the adaptive view is visually distinguished with respect to the application view indicia corresponding to the preselected application views.

In some embodiments, the processing unit 1106 is configured to: while displaying the plurality of application views of the set of application views, display (e.g., with display unit 1102) a set of application view indicia, wherein each of the application view indicia corresponds to a respective application view in the set of application views. Highlight (e.g., with highlighting unit 1122) an indicia corresponding to a displayed application view. Receive (e.g., with receiving unit 1110) a user input, the user input, when received for scrolling to another application view in the set of application views. In response to receiving the user input, scroll (e.g., with scrolling unit 1120) to the another application view. In accordance to scrolling to the another application view, highlight (e.g., with highlighting unit 1122) an application view indicia corresponding to the another application view, wherein the highlighting the application view corresponding to the another application view includes an initial highlighting brightness, and a final highlighting brightness, wherein the brightness of the highlighting increases during the transition from the initial highlighting brightness to the final highlighting brightness.

In some embodiments, the processing unit 1106 is configured to: while an audio application is playing audio content, wherein the audio application includes an application-specific control interface and the set of application views does not include an application view corresponding to the audio application, update (e.g., with the updating unit 1114) the set of application views with a universal audio application control interface view corresponding to a universal audio application control interface, wherein the universal audio application control interface is different than the application-specific control interface that is not a part of the dock. Receive (e.g., with receiving unit 1110) user input on the universal audio application control interface view, the user input, when received initiating launching the universal audio application control interface. In response to receiving the user input, display (e.g., with the display unit 1102) the universal audio application control interface for controlling the playback of the audio content playing on the audio application.

In some embodiments, the processing unit 1106 is configured to: wherein the universal audio application control interface view includes an affordance corresponding to adding the universal audio application control interface view to the set of application views. Receive (e.g., with receiving unit 1110) a user input for selecting the affordance, and in response to receiving the user input for selecting the affordance, add (e.g., with the adding unit 1112) the universal audio application control interface view to the set of application views.

In some embodiments, the processing unit 1106 is configure to: at a companion device with one or more processors and memory that is paired with the device display (e.g., with display unit 1102) the adaptive view that corresponds to a most recently opened application, wherein the adaptive view includes an affordance corresponding to adding the adaptive view to the preselected application views. Receive (e.g., with receiving unit 1110) user input for selecting the affordance, and in response to receiving the user input for selecting the affordance, add (e.g., with adding unit 1112) the adaptive view that corresponds to the most recently opened application to the preselected application views.

In some embodiments, the processing unit 1106 is configured to: at a companion device with one or more processors, touchscreen and memory that is paired with the device display (e.g., with display unit 1102) a portion of the sequence of the set of application views. Receive (e.g., with receiving unit 1110) an input at a location on the touchscreen displaying an application view in a first position in the sequence of the set of application views. In response to the input, visually distinguish (e.g., with visually distinguishing unit 1128) the selected application view with respect to the other application views in the sequence of the set of application views. Detect (e.g., with detecting unit 1124) movement, without breaking contact with touchscreen, of the input on the application view to a second position in the sequence of the set of application views. In response to the detected movement of the input on the application view, move (e.g., with moving unit 1130) the selected application view to the second position in the sequence of set of application views. Detect (e.g., with detecting unit 1124) a break of the input with the touchscreen, and in response to the detected break of the input with the touchscreen, reorder (e.g., with reordering unit 1116) the application view to the second position in the sequence of set of application views.

In some embodiments, the processing unit 1106 is configured to: at a companion device to the device), wherein the companion device includes one or more processors and memory that is paired with the device, receive (e.g., with receiving unit 1110) an input on an application view of the plurality of application views, the input, when received initiates deletion of the application view from the set of application views. In response to the input on the application view, delete (e.g., with deleting unit 1119) the application view from the set of application views.

The operations described above with reference to FIGS. 10A-10Q are, optionally, implemented by components depicted in FIGS. 1A-1B or FIG. 11. For example, receiving operation 1002, and displaying operation 1004 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 12A-12G illustrates exemplary user interfaces for updating views in a set of application views, in accordance with some embodiments. The user interfaces in these figures are used to illustrate the processes described below, including the processes in FIG. 13.

Figure 12A:
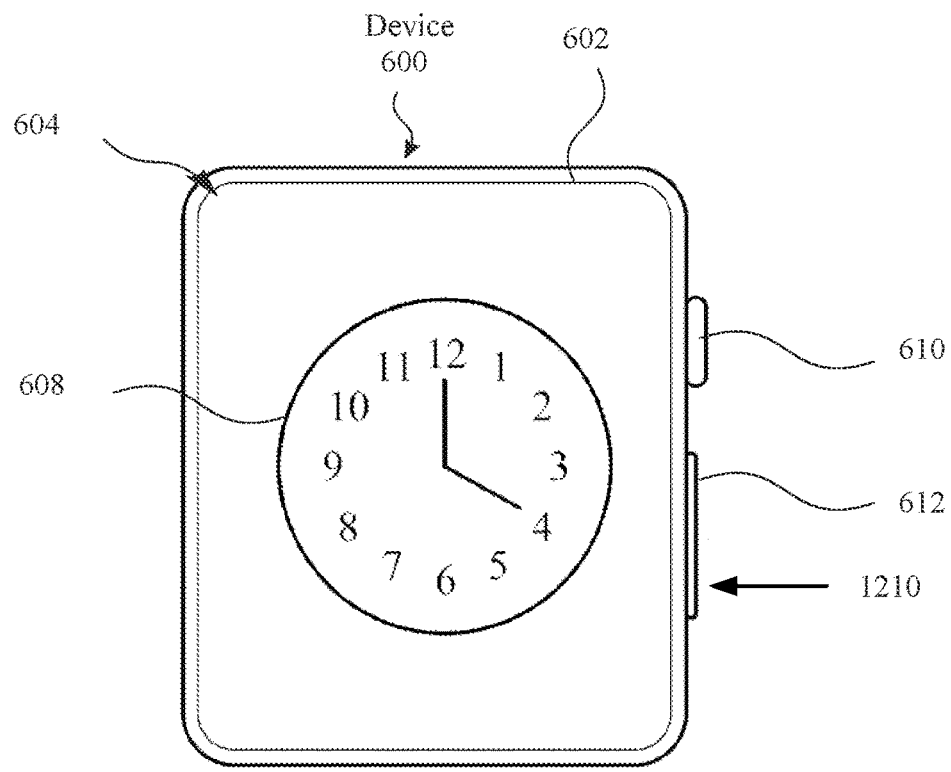
FIGS. 12A-12G illustrate exemplary user interfaces in accordance with some embodiments.
Figure 13:
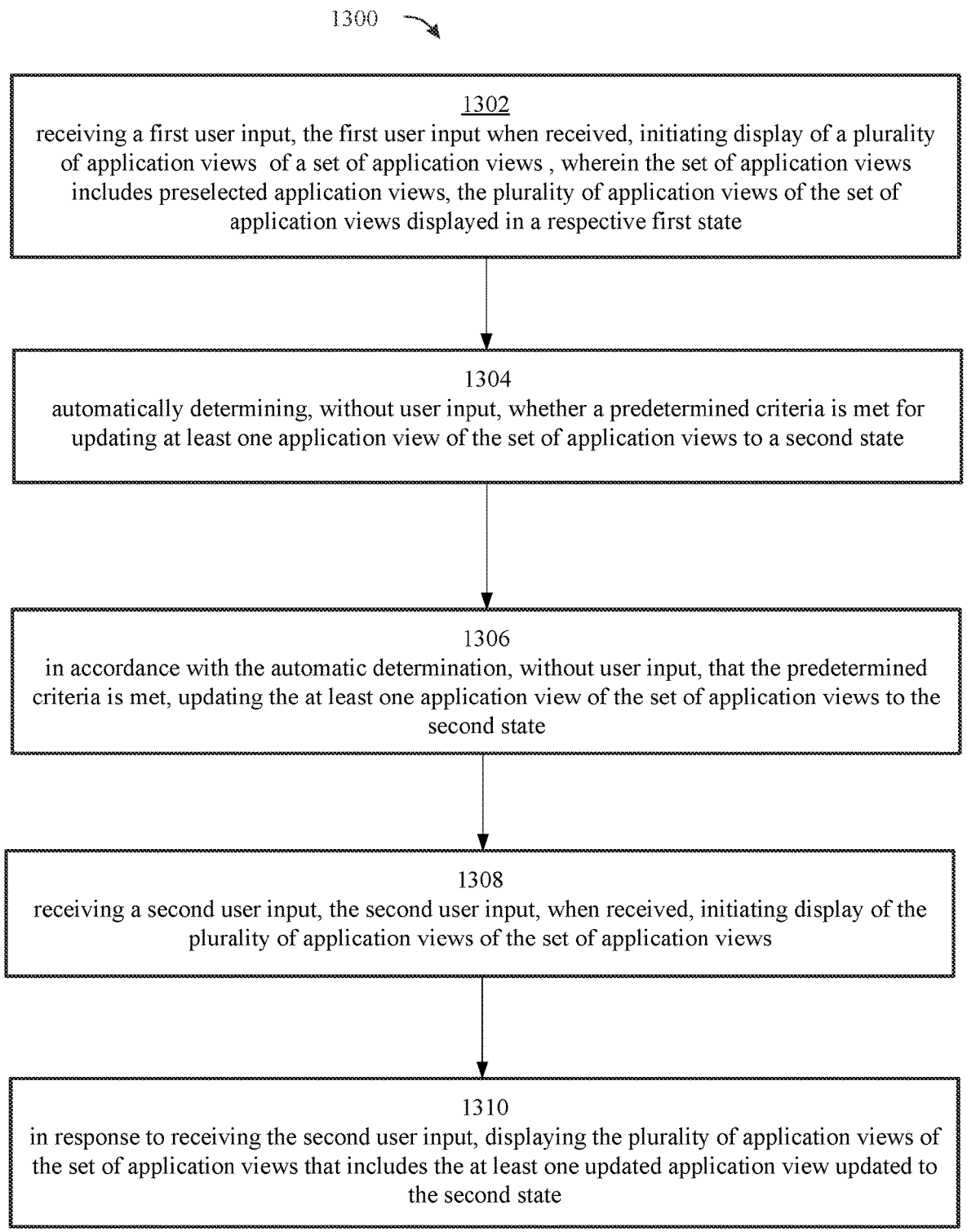
FIG. 13 is a flow diagram illustrating a method for operating an electronic device in accordance with some embodiments.

FIG. 12A illustrates device 600 with touch sensitive display 602. User interface 604 is displayed on touch-sensitive display 602. User interface 604, as illustrated in FIG. 12A, includes watch face 608 of a watch application.

Device 600 includes various input mechanisms that receives user input, such as, rotatable input mechanism 610, that is able to receive a rotatable input (and may also receive a push input), and push input mechanism 612 that is able to receive a push input.

Figure 12B:
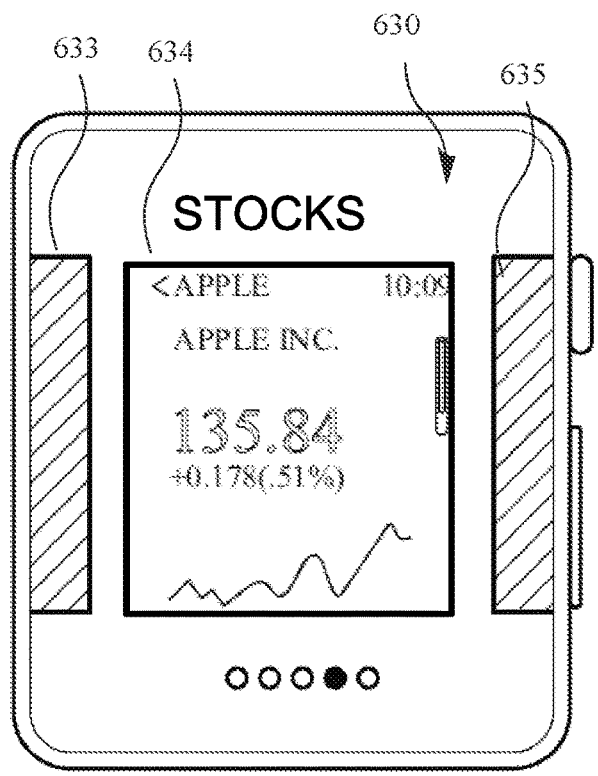

Referring now to FIGS. 12A-12B, in response to receiving user input 1210 at input mechanism 612, device 600 displays a plurality of application views of a set of application views 630. The set of application views are a sequential list of application views that correspond to respective applications. The set of application views 630 include preselected application views. In some embodiments, the set of application views includes an adaptive application view that corresponds to the most recently opened application that is not one of the application views.

In some embodiments, as shown in FIG. 12B, in response to user input 1210, device 600 displays application views 633, 634, and 635.

As shown in FIG. 12B, application views 633, 634 and 635 are displayed in a respective first state. In some embodiments, application views 633, 634 and 635 are the last viewed screen of the respective applications. For example, application view 634 is the last viewed screen of the stocks application.

Figure 12C:
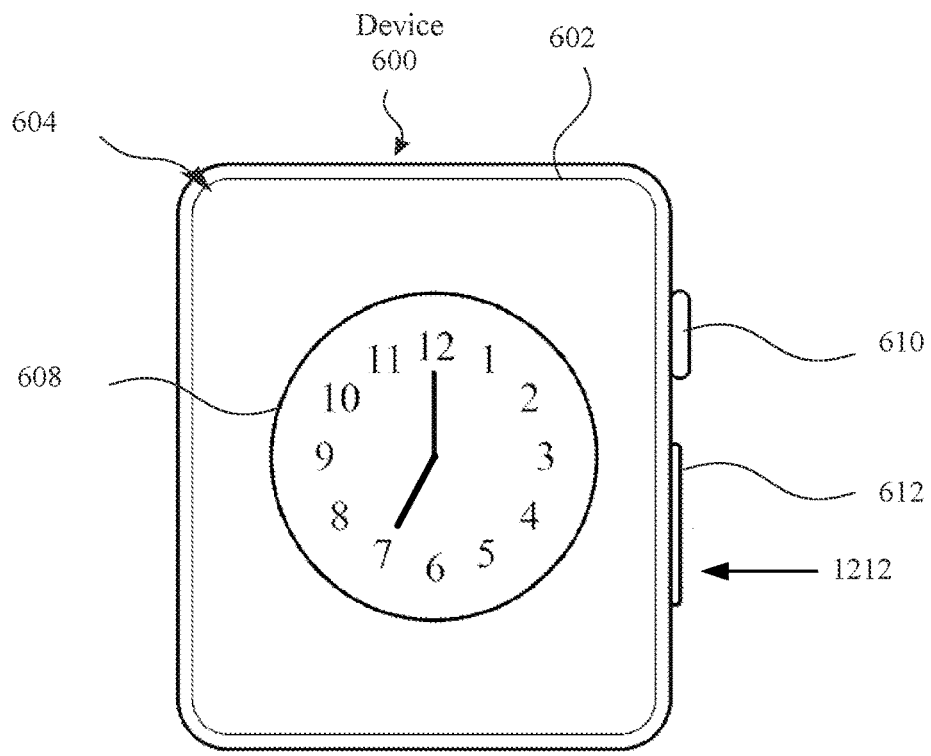

Referring to FIG. 12C, in some embodiments, the set of application views 630 are no longer displayed. For example, an application is opened (e.g., clock application), and in response to an opened application, the set of application views are no longer displayed.

Device 600, in some embodiments, automatically determines, without user input, whether a predetermined criteria is met for updating at least one application view of the set of application views to a second state. In accordance with the automatic determination, without user input, that the predetermined criteria is met, device 600 updates at least one application view of the set of application views. In some embodiments, the predetermined criteria is a periodic timeout (e.g., every three minutes). For example, at the end of each periodic timeout, one or more of the application views is updated to an updated second state. In such an example, application view 634 for the stock application is updated with current stock information.

In some embodiments, the predetermined criteria is change in data associated with the application view. For example, for a stocks application, the stock information may change frequently. As such, the application view corresponding to the stocks application, is updated in response to the change in stock information that is displayed in the application view. In some embodiments, each of the application views are updated in the background when the predetermined criteria is met (e.g., end of a periodic timeout, or change in information displayed in the respective application view).

In some embodiments, the updating of the application view in response to the predetermined criteria being met can occur with the corresponding application being in one of various states, such as ready to be launched (e.g., become opened), an open or executing application, or a closed application. In particular, an open or executing application can be, but is not limited to an active application, which is currently displayed on a display screen of the device that the application is being used on, a background application (or background processes), which is not currently displayed, but one or more processes for the application are being processed by one or more processors, and a suspended or hibernated application, which is not running, but has state information that is stored in memory (volatile and non-volatile, respectively) and that can be used to resume execution of the application.

In some embodiments, the automatic updating, without user input, for an application view occurs while the corresponding application is not currently displayed. In some embodiments, the automatic updating, without user input, for an application view occurs while the corresponding application is launched. In some embodiments, the automatic updating, without user input, for an application view occurs while the corresponding application is unlaunched. In some embodiments, the automatic updating, without user input, for an application view occurs while the corresponding application is not active.

As described above, the applications associated with the set of application views are stored in memory. As such, the updated application views for the respective applications are also stored in memory.

Figure 12D:
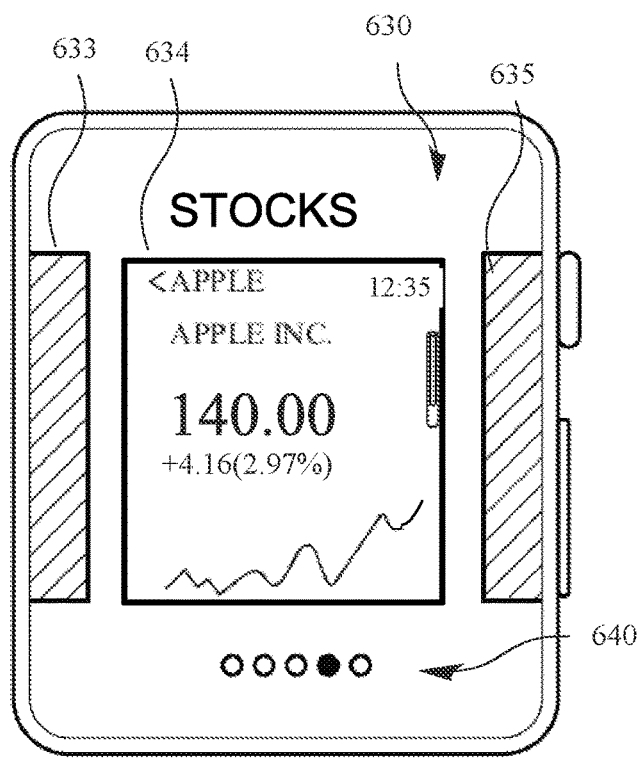

Referring to FIGS. 12C-12D, a second user input 1212 is received, the second user input, when received, initiates display of the plurality of application views of the set of application views 630. In response to receiving the second user input 1212, device 600 displays the plurality of application views of the set of application views 630 that includes the at least one updated application view 634 updated to the second state. For example, device 600 displays application view 634 in an updated second state that includes current stock information that is updated from the first state, as depicted in FIG. 12B.

In some embodiments, referring to FIG. 12D, the displaying the plurality of application views of the set of application views in a second state further includes displaying a first application view in an application view area (e.g., user interface 604), wherein the first application view (e.g., application 634) is an updated application view that is focused, and centered in the application view area.

Additionally, in some embodiments, at least a partial view of a second application view (e.g., application views 633 and 635) are displayed in the application view area, wherein the second application view is sequential to the first application views, wherein the second application view is not updated. For example, application views 633 and 635 are not updated to a second state when application view 634 is updated to a second state. As such, application views 633 and 635 are not displayed in a second updated state when updated application view 634 is displayed in a second application state.

Figure 12E:
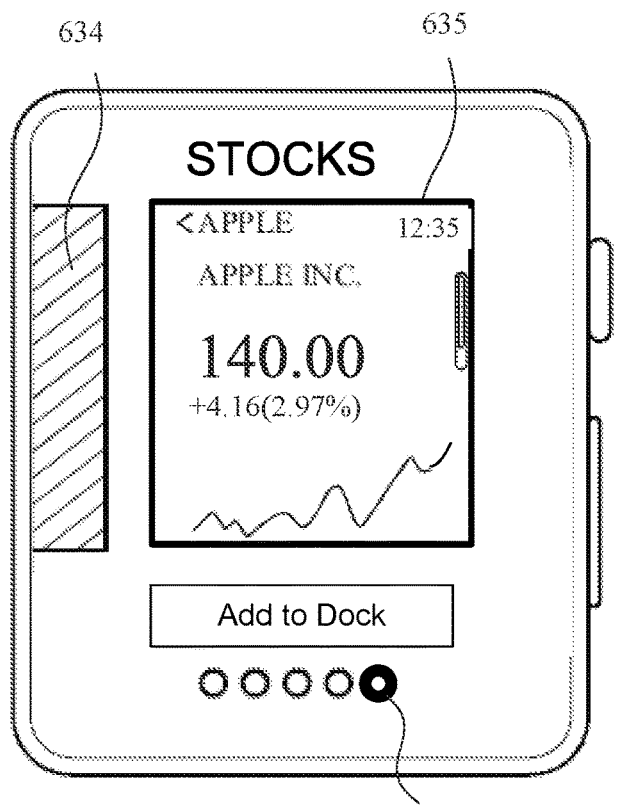
Figure 12F:
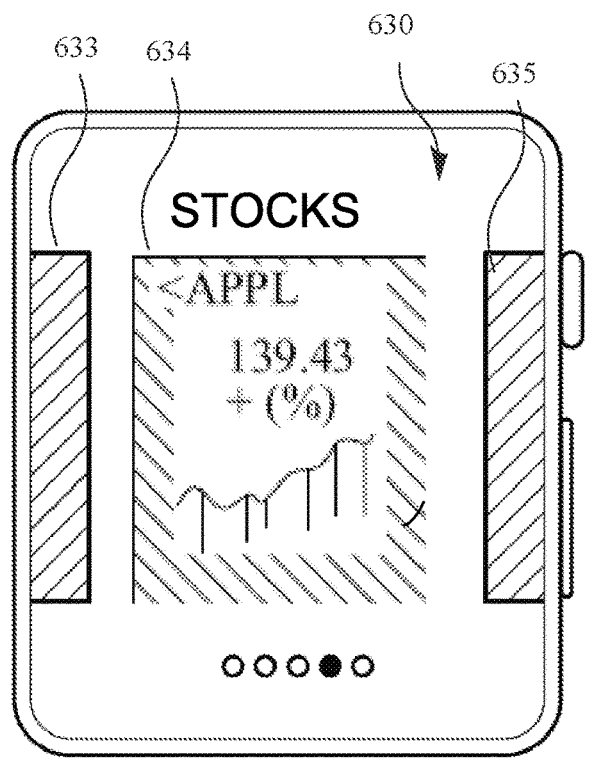
Figure 12G:
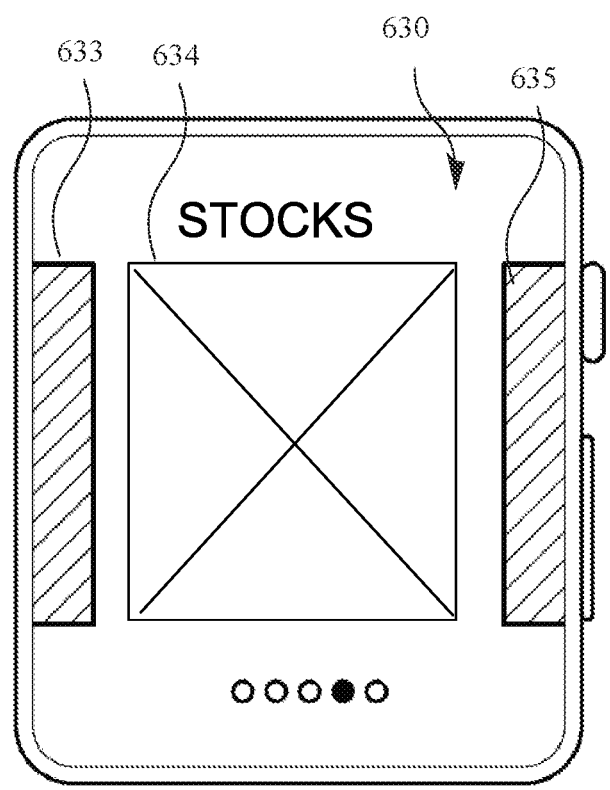

In some embodiments, referring to FIG. 12E, the updated application view of the stocks application is an adaptive application view and a set of application view indicia is also displayed, wherein each of the application view indicia corresponds to a respective application view in the set of application views. In particular, the application view indicia 645 corresponding to the adaptive application view is visually distinguished with respect to the application view indicia corresponding to the preselected application views.

In some embodiments, while displaying the plurality of application views of the set of application views (e.g., application views 633, 634 and 635 in FIG. 12D), a set of application view indicia 640 is displayed, wherein each of the application view indicia corresponds to a respective application view in the set of application views. An indicia corresponding to a displayed application view is highlighted. A user input, the user input, when received for scrolling to another application view in the set of application views (e.g., input 710 in FIG. 7A). In response to receiving the user input, the application views are scrolled to the another application view (e.g., FIG. 7B). In accordance to scrolling to the another application view, highlighting an application view indicia corresponding to the another application view, wherein the highlighting the application view corresponding to the another application view includes: an initial highlighting brightness (e.g., FIG. 7K), and a final highlighting brightness, wherein the brightness of the highlighting increases during the transition from the initial highlighting brightness to the final highlighting brightness (e.g., FIG. 7L).

In some embodiments, it is determined whether a first timeout has expired since a most recent update of an application view. In response to the first timeout expiring, displaying the application view in a dimmed state. For example, referring to FIG. 12F, if the application view 634 is unable to be updated by the end of a first time period (e.g., five minutes), then the application view is dimmed (or visually distinguished) to indicate that the application view is unable to be updated. In accordance with selection of the application view in the dimmed state, launching an application corresponding to the selected application view. For example, in response to selecting application view 634, while in the dimmed state, the stocks application is launched.

Furthermore, it is determined whether a second timeout (e.g., 30 minutes) has expired since the most recent update of the application view, wherein a duration of the second timeout is longer than a duration of the first timeout. In response to the second timeout expiring, displaying an application view that does not include a screen shot of a corresponding application. For example, referring to FIG. 12G, if the application view 634 is unable to be updated by the end of a second time period (e.g., 30 minutes), then the displayed application view does not include a screen shot of the stocks application. In accordance with selection of the application view that does not include a screen shot of the corresponding application, the corresponding application is launched. For example, in response to selecting application view 634 that does not include a screen shot of the stocks application, the stocks application is launched.

FIG. 13 is a flow diagram illustrating a method for updating application views in a set of application views using an electronic device in accordance with some embodiments. Method 1300 is performed at a device (e.g., 100, 300, 500, 600, or 900) with a display, one or processors and memory. Some operations in method 1300 are, optionally, combined, the order of some operations is, optionally, changed, and some operations are, optionally, omitted.

As described below, method 1300 provides an intuitive way for updating application views in a set of application views. The method reduces the cognitive burden on a user for selecting an application via updated application views in a set of application views, thereby creating a more efficient human-machine interface. For battery-operated computing devices, enabling a user select an application via updated application views in a set of application views faster and more efficiently conserves power and increases the time between battery charges.

At block 1302, a first user input (e.g., user input 1210) is received, the first user input when received, initiates display of a plurality of application views of a set of application views 630, wherein the set of application views includes preselected application views, the plurality of application views of the set of application views displayed in a respective first state (e.g., FIG. 12A).

At block 1304, it is automatically determined, without user input, whether a predetermined criteria is met for updating at least one application view of the set of application views to a second state. In some embodiments, the predetermined criteria is an end of a predetermined timeout. In some embodiments, the predetermine criteria is the change of data that is displayed on the application view.

At block 1306, in accordance with the automatic determination, without user input, that the predetermined criteria is met, the at least one application view (e.g., application view 634 in FIG. 12D) of the set of application views to the second state is updated At block 1308, a second user input (e.g., input 1212) is received, the second user input, when received, display of the plurality of application views of the set of application views is initiated.

At block 1310, in response to receiving the second user input (e.g., input 1212), the plurality of application views of the set of application views that includes the at least one updated application view is updated to the second state (e.g., FIG. 12D).

In some embodiments, the set of application views further includes an adaptive view that corresponds to a most recently opened application that is not one of the preselected application views.

In some embodiments, the automatic updating, without user input, for an application view occurs while the corresponding application is not currently displayed. In some embodiments, the automatic updating, without user input, for an application view occurs while the corresponding application is launched. In some embodiments, the automatic updating, without user input, for an application view occurs while the corresponding application is unlaunched. In some embodiments, the automatic updating, without user input, for an application view occurs while the corresponding application is not active.

In some embodiments, wherein displaying the plurality of application views of the set of application views in a second state comprises displaying a first application view in an application view area (e.g., user interface 604), wherein the first application view is an updated application view that is focused, and centered in the application view area (e.g., application view 634 in FIG. 12D), and displaying at least a partial view of a second application view in the application view area, wherein the second application view is sequential to the first application views, wherein the second application view is not updated (e.g., application views 633 and 635 in FIG. 12D).

In some embodiments, in response to determining that the predetermined criteria is met, updating each of the application views in the set of application views. For example, each of the application views are updated at the end of a timeout.

In some embodiments, is s determined whether a first timeout has expired since a most recent update of an application view. In response to the first timeout expiring, displaying the application view in a dimmed state (e.g., FIG. 12F). In accordance with selection of the application view in the dimmed state, launching an application corresponding to the selected application view (e.g., stocks application is launched in response to selection of application view 634). Determining whether a second timeout has expired since the most recent update of the application view, wherein a duration of the second timeout is longer than a duration of the first timeout. In response to the second timeout expiring, displaying an application view that does not include a screen shot of a corresponding application (e.g., FIG. 12G), and in accordance with selection of the application view that does not include a screen shot of the corresponding application, launching the corresponding application (e.g., stocks application is launched in response to selection of application view 634).

In some embodiments, while displaying the plurality of application views of the set of application views, displaying a set of application view indicia (e.g., FIG. 12B), wherein each of the application view indicia corresponds to a respective application view in the set of application views, wherein the application view indicia corresponding to the adaptive view is visually distinguished with respect to the application view indicia corresponding to the preselected application views (e.g. FIG. 12E).

In some embodiments, while displaying the plurality of application views of the set of application views, displaying a set of application view indicia, wherein each of the application view indicia corresponds to a respective application view in the set of application views (e.g., FIG. 12B), and highlighting an indicia corresponding to a displayed application view. Receiving a user input, the user input, when received for scrolling to another application view in the set of application views (e.g., FIG. 7A). In response to receiving the user input, scrolling to the another application view (e.g., FIG. 7B). In accordance to scrolling to the another application view, highlighting an application view indicia corresponding to the another application view (e.g., FIG. 7B, wherein the highlighting the application view corresponding to the another application view includes an initial highlighting brightness (e.g., FIG. 7K), and a final highlighting brightness, wherein the brightness of the highlighting increases during the transition from the initial highlighting brightness to the final highlighting brightness (e.g., FIG. 7L).

Note that details of the processes described above with respect to method 1300 (e.g., FIG. 13) are also applicable in an analogous manner to the methods described above. For example, method 1300 optionally includes one or more of the characteristics of the various methods described above with reference to method 1000. For example, the viewing of application views, in accordance to method 1100 may include the view of updated application views, in accordance to method 100. For brevity, these details are not repeated below.

Figure 14:
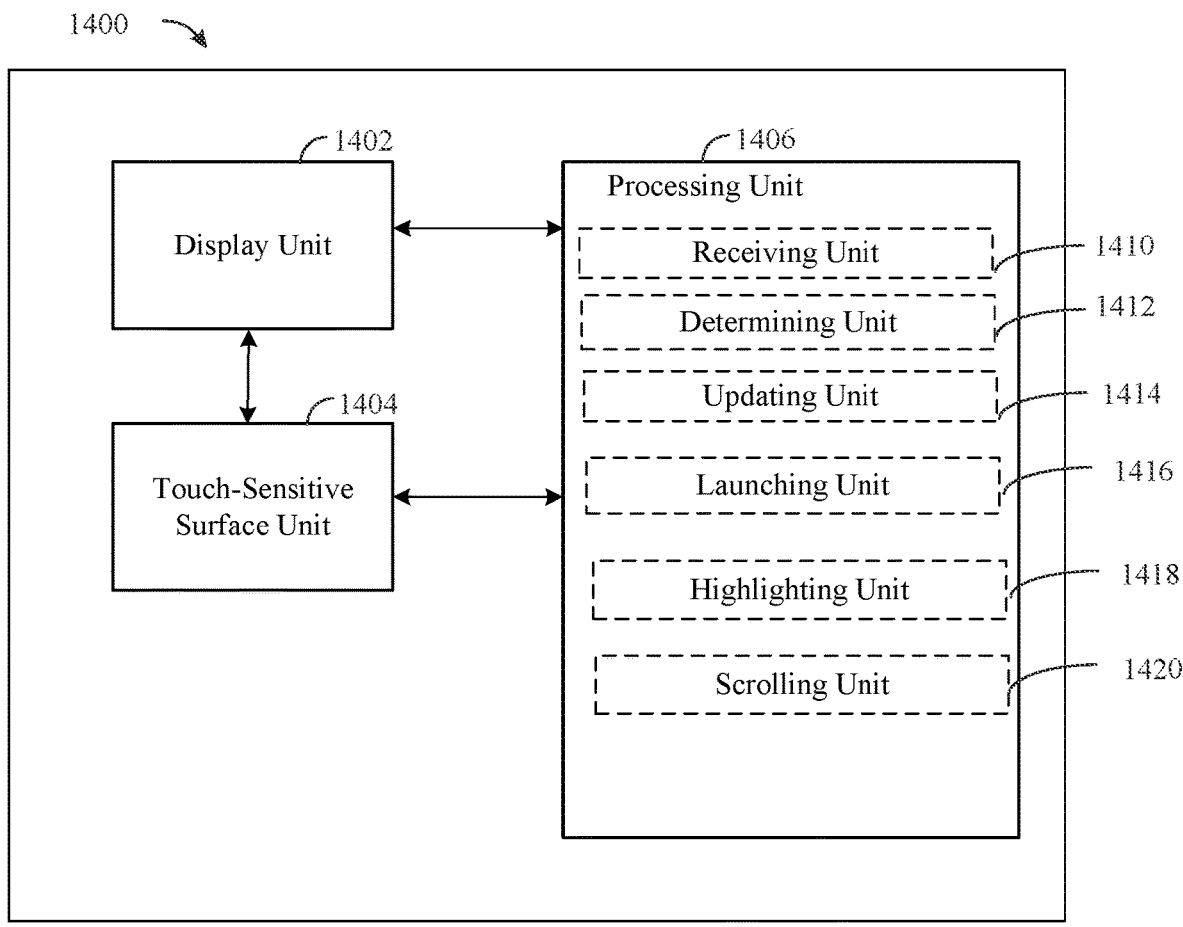
FIG. 14 shows an exemplary functional block diagram of an electronic device in accordance with some embodiments.

In accordance with some embodiments, FIG. 14 shows an exemplary functional block diagram of an electronic device 1400 configured in accordance with the principles of the various described embodiments. In accordance with some embodiments, the functional blocks of electronic device 1400 are configured to perform the techniques described above. The functional blocks of the device 1400 are, optionally, implemented by hardware, software, or a combination of hardware and software to carry out the principles of the various described examples. It is understood by persons of skill in the art that the functional blocks described in FIG. 14 are, optionally, combined or separated into sub-blocks to implement the principles of the various described examples. Therefore, the description herein optionally supports any possible combination or separation or further definition of the functional blocks described herein.

As shown in FIG. 14, an electronic device 1400 includes a display unit 1402 configured to display a graphic user interface, optionally, a touch-sensitive surface unit 1404 configured to receive contacts, and a processing unit 1406 coupled to the display unit 1402 and, optionally, the touch-sensitive surface unit 1104. In some embodiments, the processing unit 1406 includes a receiving unit 1410, a determining unit 1412, an updating unit 1414, a launching unit 1416, a highlighting unit 1418, and a scrolling 1420.

The processing unit 1406 is configured to: receive (e.g., with the receiving unit 1410) a first user input, the first user input when received, initiating display of a plurality of application views of a set of application views, wherein the set of application views includes preselected application views, the plurality of application views of the set of application views displayed in a respective first state (e.g., FIG. 12B). Automatically determine (e.g., determining unit 1412) with, without user input, whether a predetermined criteria is met for updating at least one application view of the set of application views to a second state. In accordance with the automatic determination, without user input, that the predetermined criteria is met, update (e.g., with updating unit 1414) the at least one application view of the set of application views to the second state. Receive (e.g., with receiving unit 1410) a second user input, the second user input, when received, initiating display of the plurality of application views of the set of application views (e.g., FIG. 12D). In response to receiving the second user input, display (e.g., with display unit 1402) the plurality of application views of the set of application views that includes the at least one updated application view updated to the second state (e.g., FIG. 12D).

The processing unit 1406 is configured to: display (e.g., with the display unit 1402) the plurality of application views of the set of application views in a second state that comprises display a first application view in an application view area, wherein the first application view is an updated application view that is focused, and centered in the application view area (e.g., FIG. 12D), and display (e.g., with displaying unit 1402) at least a partial view of a second application view in the application view area, wherein the second application view is sequential to the first application views, wherein the second application view is not updated (e.g., FIG. 12D).

The processing unit 1406 is configured to: in response to determining that the predetermined criteria is met, update (e.g., with updating unit 1414) each of the application views in the set of application views.

The processing unit 1406 is configured to: determine (e.g., with determining unit 1412) whether a first timeout has expired since a most recent update of an application view. In response to the first timeout expiring, display (e.g., with displaying unit 1402) the application view in a dimmed state (e.g., FIG. 12F). In accordance with selection of the application view in the dimmed state, launch (e.g., with launching unit 1416) an application corresponding to the selected application view. Determine (e.g., with determining unit 1412) whether a second timeout has expired since the most recent update of the application view, wherein a duration of the second timeout is longer than a duration of the first timeout. In response to the second timeout expiring, display (e.g., with displaying unit 1402) an application view that does not include a screen shot of a corresponding application (e.g., FIG. 12G), and in accordance with selection of the application view that does not include a screen shot of the corresponding application, launch (e.g., with launching unit 1416) the corresponding application.

The processing unit 1406 is configured to: while displaying the plurality of application views of the set of application views, display (e.g., with display unit 1402) a set of application view indicia (e.g., FIG. 12B), wherein each of the application view indicia corresponds to a respective application view in the set of application views, wherein the application view indicia corresponding to the adaptive view is visually distinguished with respect to the application view indicia corresponding to the preselected application views (e.g. FIG. 12E).

The processing unit 1406 is configured to: while displaying the plurality of application views of the set of application views, display (e.g., with display unit 1402) a set of application view indicia, wherein each of the application view indicia corresponds to a respective application view in the set of application views (e.g., FIG. 12B), and highlight (e.g., with highlighting unit 1418) an indicia corresponding to a displayed application view. Receive (e.g., with receiving unit 1410) a user input, the user input, when received for scrolling to another application view in the set of application views (e.g., FIG. 7A). In response to receiving the user input, scroll (e.g., with scrolling unit 1420) to the another application view (e.g., FIG. 7B). In accordance to scrolling to the another application view, highlight (e.g., with highlighting unit 1418) an application view indicia corresponding to the another application view (e.g., FIG. 7B), wherein the highlighting the application view corresponding to the another application view includes an initial highlighting brightness (e.g., FIG. 7K), and a final highlighting brightness, wherein the brightness of the highlighting increases during the transition from the initial highlighting brightness to the final highlighting brightness (e.g., FIG. 7L).

In some embodiments, the set of application views further includes an adaptive view that corresponds to a most recently opened application that is not one of the preselected application views (e.g., FIG. 12E).

In some embodiments, the automatic updating, without user input, for an application view occurs while the corresponding application is not currently displayed. In some embodiments, the automatic updating, without user input, for an application view occurs while the corresponding application is launched. In some embodiments, the automatic updating, without user input, for an application view occurs while the corresponding application is unlaunched. In some embodiments, the automatic updating, without user input, for an application view occurs while the corresponding application is not active.

The operations described above with reference to FIG. 13 are, optionally, implemented by components depicted in FIGS. 1A-1B or FIG. 14. For example, receiving operation 1302, determining operation 1304, determining operation 1306, receiving operation 1308 and displaying operation 1310 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 15A-15C illustrates exemplary user interfaces for displaying views in a set of application views, in accordance with some embodiments. The user interfaces in these figures are used to illustrate the processes described below, including the processes in FIG. 16.

FIG. 15A illustrates device 600 with touch sensitive display 602. User interface 604 is displayed on touch-sensitive display 602. User interface 604, as illustrated in FIG. 15A, includes watch face 608 of a watch application.

Device 600 includes various input mechanisms that receives user input, such as, rotatable input mechanism 610, that is able to receive a rotatable input (and may also receive a push input), and push input mechanism 612 that is able to receive a push input.

Referring now to FIGS. 15A-15C, device 600 displays a watch face (FIG. 15A). A first user input 1510 is received, the first user input, when received initiating display of a plurality of application views (e.g., application views 633, 634 and 635) of a set of application views 630, wherein the set of application views includes preselected application views.

Referring to FIG. 15B, in response to receiving the first user input, device 600 displays the plurality of application views of the set of application views in a first state. For example, application view 634 that corresponds to a weather application is center focused and displayed. Additionally, at least a portion of application views 633 and 635 are displayed adjacent to application view 634.

Still referring to FIG. 15B, a second user input (e.g., input 1512) on application view 634 of the plurality of displayed application views is received, the second user input, when received initiating launch of an application corresponding with the application view selected by the second user input.

Referring to FIG. 15C, in response to receiving the second user input, the plurality of displayed application views is replaced by displaying a user interface of the launched application. For example, device 600 displays the weather application and replaces the display of application views 633, 634, and 635.

In some embodiments, referring to FIG. 15B, swipe gesture 1514 (e.g., right swipe gesture) is received for scrolling through the set of application views 630. In response to receiving the swipe gesture 1514, device scrolls through the set of application views and replaces the initially displayed plurality of application views 633, 634, and 635 with a second set of application views, such as application view 631 and 632 (e.g., FIG. 6B).

In some embodiments, the displayed watch face (e.g., FIG. 15A) is replaced by the displaying the plurality of application views of the set of application views in a second state (e.g., FIG. 15B).

FIG. 16 is a flow diagram illustrating a method for viewing application views in a set of application views using an electronic device in accordance with some embodiments. Method 1600 is performed at a device (e.g., 100, 300, 500, 600, or 900) with a display, one or processors and memory. Some operations in method 1600 are, optionally, combined, the order of some operations is optionally, changed, and some operations are, optionally, omitted.

As described below, method 1600 provides an intuitive way for viewing application views in a set of application views. The method reduces the cognitive burden on a user for viewing application views in a set of application views, thereby creating a more efficient human-machine interface. For battery-operated computing devices, enabling a user to view application views in a set of application views faster and more efficiently conserves power and increases the time between battery charges.

At block 1602, a watch face is displayed (e.g., FIG. 15A)

At block 1604, a first user input is received (e.g., user input 1510), the first user input, when received initiating display of a plurality of application views of a set of application views, wherein the set of application views includes preselected application views.

At block 1606, in response to receiving the first user input, the plurality of application views of the set of application views are displayed (e.g., FIG. 15B)

At block 1608, a second user input (e.g., user input 1512) on an application view of the plurality of displayed application views is received, the second user input, when received initiating launch of an application corresponding with the application view selected by the second user input (e.g., FIG. 15B)

At block 1610, in response to receiving the second user input, the plurality of displayed application views are replaced by displaying a user interface of the launched application (e.g., FIG. 15C).

In some embodiments, referring to FIG. 15B, swipe gesture 1514 (e.g., right swipe gesture) is received for scrolling through the set of application views 630. In response to receiving the swipe gesture 1514, set of application views are scrolled and the initially displayed plurality of application views 633, 634, and 635 are replaced with a second set of application views, such as application view 631 and 632 (e.g., FIG. 6B).

In some embodiments, the displayed watch face (e.g., FIG. 15A) is replaced by the displaying the plurality of application views of the set of application views in a second state (e.g., FIG. 15B).

Note that details of the processes described above with respect to method 1600 (e.g., FIG. 16) are also applicable in an analogous manner to the methods described above. For example, method 1600 optionally includes one or more of the characteristics of the various methods described above with reference to methods 1000 and 1300. For example, the viewing of application views, in accordance to method 1600 may include the embodiments of viewing of updated application views, in accordance to method 1000, and embodiments of updating of application views, in accordance with method 1300. For brevity, these details are not repeated below.

Figure 17:
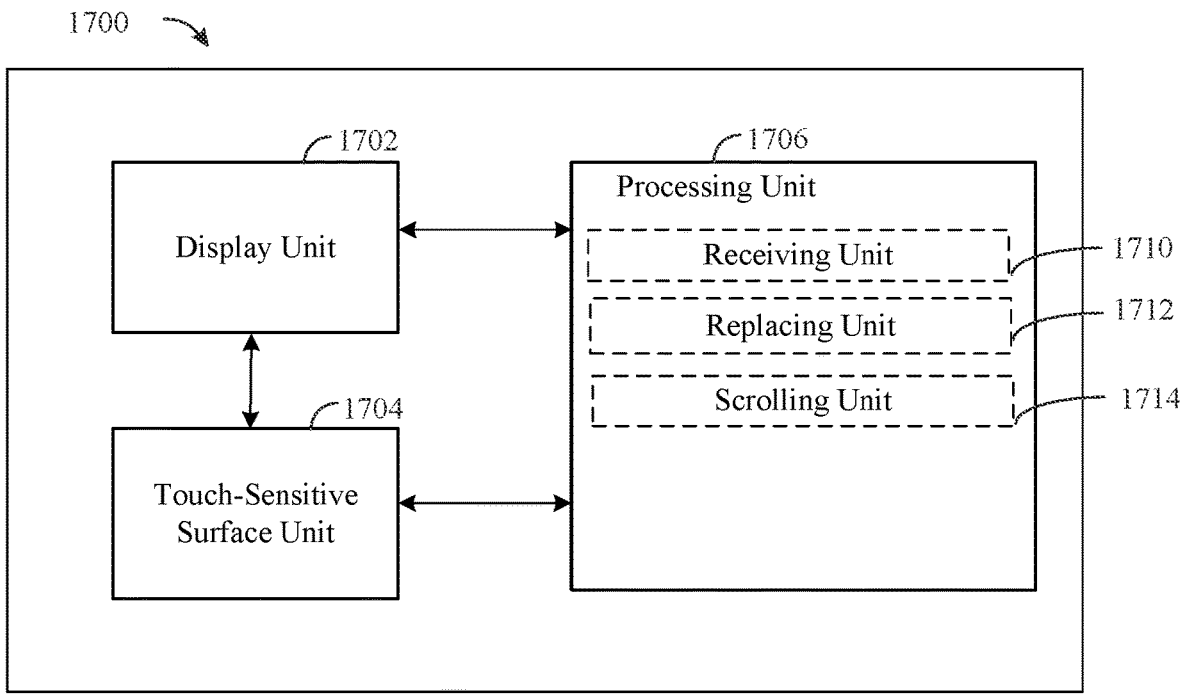
FIG. 17 shows an exemplary functional block diagram of an electronic device in accordance with some embodiments.

In accordance with some embodiments, FIG. 17 shows an exemplary functional block diagram of an electronic device 1700 configured in accordance with the principles of the various described embodiments. In accordance with some embodiments, the functional blocks of electronic device 1700 are configured to perform the techniques described above. The functional blocks of the device 1700 are, optionally, implemented by hardware, software, or a combination of hardware and software to carry out the principles of the various described examples. It is understood by persons of skill in the art that the functional blocks described in FIG. 17 are, optionally, combined or separated into sub-blocks to implement the principles of the various described examples. Therefore, the description herein optionally supports any possible combination or separation or further definition of the functional blocks described herein.

As shown in FIG. 17, an electronic device 1700 includes a display unit 1702 configured to display a graphic user interface, optionally, a touch-sensitive surface unit 7404 configured to receive contacts, and a processing unit 1706 coupled to the display unit 1702 and, optionally, the touch-sensitive surface unit 1704. In some embodiments, the processing unit 1706 includes a receiving unit 1710, a replacing unit 1712, and a scrolling 1720.

The processing unit 1706 is configured to: display (e.g., with display unit 1702) a watch face (e.g., FIG. 15A). Receive (e.g., with receiving unit 1710) a first user input, the first user input, when received initiating display of a plurality of application views of a set of application views, wherein the set of application views includes preselected application views (e.g., FIG. 15B).

In response to receiving the first user input, display (e.g., with display unit 1702) the plurality of application views of the set of application views (e.g., FIG. 15B). Receive (e.g., with receiving unit 1710) a second user input on an application view of the plurality of displayed application views (e.g., FIG. 15B), the second user input, when received initiating launch of an application corresponding with the application view selected by the second user input. In response to receiving the second user input, replace (e.g., with replacing unit 1712) the plurality of displayed application views by displaying a user interface of the launched application (e.g., FIG. 15C).

The processing unit 1706 is configured to: receive (e.g., with receiving unit 1710) a swipe gesture for scrolling through the set of application views (e.g., FIG. 15B). In response to receiving the swipe gesture, scroll (e.g., with scrolling unit 1714) through the set of application views and replace (e.g., with replacing unit 1712) the initially displayed plurality of application views with a second set of application views (e.g., FIG. 6B).

The processing unit 1706 is configured to: replace (e.g., with replacing unit 1712) the displayed watch face by the displaying the plurality of application views of the set of application views (e.g., FIG. 15B).

The operations described above with reference to FIG. 16 are, optionally, implemented by components depicted in FIGS. 1A-1B or FIG. 17. For example, displaying operation 1602, receiving operation 1604, displaying operation 1606, receiving operation 1608 and replacing operation 1610 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. An electronic device, comprising:
   a display;
   one or more processors;
   one or more input devices;
   a memory; and
   one or more programs, wherein the one or more programs are stored in memory and configured to be executed by the one or more processors, the one or more programs including instructions for:
      while a respective application is a most recently used application:
         in response to receiving a user input, concurrently displaying a plurality of application views of a set of application views, wherein the set of application views includes preselected application views and an adaptive view that corresponds to a most recently opened application, wherein concurrently displaying the plurality of application views includes:
            in accordance with a determination that the respective application does not correspond to one of the preselected application views, displaying an application view corresponding to the respective application at a first location on the display as the adaptive view; and
            in accordance with a determination that the respective application corresponds to one of the preselected application views, forgoing displaying the application view corresponding to the respective application at the first location on the display as the adaptive view.

2. The electronic device of claim 1, the one or more programs further including instructions for:
   displaying the adaptive view that corresponds to a most recently opened application, wherein the adaptive view includes an affordance corresponding to adding the adaptive view to the preselected application views;
   receiving a user input corresponding to selection of the affordance; and
   in response to receiving the user input corresponding to selection of the affordance, adding the adaptive view that corresponds to the most recently opened application to the preselected application views.

3. The electronic device of claim 1, wherein the set of application views are displayed in a sequence, the one or more programs further including instructions for:
   displaying the adaptive view at a terminus sequenced set of application views.

4. The electronic device of claim 1, wherein the user input is received while displaying an open application that is the most recently opened application that is not one of the preselected application views, the one or more programs further including instructions for:
   further in response to receiving the user input, displaying the adaptive view that corresponds to the most recently opened application that is not one of the preselected application views,
   wherein the adaptive view includes an affordance corresponding to adding the adaptive view to the preselected application views,
   receiving a user input corresponding to selection of the affordance; and
   in response to receiving the user input corresponding to selection of the affordance, adding the adaptive view that corresponds to the most recently opened application to the preselected application views.

5. The electronic device of claim 1, the one or more programs further including instructions for:
   detecting launch of an application, wherein the adaptive view and the preselected application views of the set of application views do not correspond with the launched application; and
   in response to detecting the launch of the application, updating the adaptive view to correspond with the launched application.

6. The electronic device of claim 1, the one or more programs further including instructions for:
   while the application associated with the adaptive view is not opened, displaying the adaptive view;
   receiving a user input corresponding to the adaptive view; and
   in response to receiving the user input corresponding to the adaptive view, launching the associated application.

7. The electronic device of claim 1, wherein the set of application views are displayed in a sequence, the one or more programs further including instructions for:
   displaying a portion of the sequenced set of application views;
   receiving an input on an application view in a first position in the sequenced set of application views;
   in response to the input on the application view, visually distinguishing the application view with respect to the other application views in the sequenced set of application views;
   detecting movement of the input on the application view to a second position in the sequenced application views;
   in response to the detected movement of the input on the application view, moving the application view to the second position in the sequenced set of application views;
   detecting a break of the input on the application view; and
   in response to the detected break of the input on the application view, reordering the application view to the second position in the sequenced application views.

8. The electronic device of claim 1, the one or more programs further including instructions for:
   receiving an input on an application view of the plurality of application views, the input, when received initiating deleting the application view from the set of application views; and
   in response to the input on the application view, deleting the application view from the set of application views.

9. The electronic device of claim 1, the one or more programs further including instructions for:
   receiving a swipe gesture for scrolling through the set of application views; and
   in response to receiving the swipe gesture:

in accordance with a determination that a velocity of the swipe gesture is below a predetermined velocity threshold, scrolling to an adjacent application view; and in accordance with a determination that the velocity of the swipe gesture is above the predetermined velocity threshold, scrolling through a plurality of application views of the set of application views.

10. The electronic device of claim 1, the one or more programs further including instructions for:

receiving a user input, the user input, when received initiating scrolling to an adjacent application view in set of application views; and in response to receiving the user input, scrolling to the adjacent application view in the set of application views, wherein the scrolling to the adjacent application view includes a decrease in velocity based on a predetermined coefficient of friction.

11. The electronic device of claim 1, the one or more programs further including instructions for:

while displaying the plurality of application views in a display area, receiving an input at a bottom edge of the display area, the input, when received initiating scrolling of the application views;

in response to the input at an edge of the display area, moving the application views away from the bottom edge of the display area;

detecting movement of the input along the bottom edge of the display area; and in response to the detected movement of the input along the bottom edge of the display area, scrolling through the set of application views.

12. The electronic device of claim 1, the one or more programs further including instructions for:

while displaying the plurality of application views of the set of application views, displaying a set of application view indicia, wherein each of the application view indicia corresponds to a respective application view in the set of application views;

highlighting an indicia corresponding to a displayed application view;

receiving a user input, the user input, when received for scrolling to another application view in the set of application views;

in response to receiving the user input, scrolling to the another application view;

in accordance to scrolling to the another application view, highlighting an application view indicia corresponding to the another application view, wherein the highlighting the application view corresponding to the another application view includes:

an initial highlighting brightness; and a final highlighting brightness, wherein the brightness of the highlighting increases during the transition from the initial highlighting brightness to the final highlighting brightness.

13. The electronic device of claim 1, the one or more programs further including instructions for:

while an audio application is playing audio content, wherein the audio application includes an application-specific control interface, wherein the set of application views does not include an application view corresponding to the audio application:

updating the set of application views with a universal audio application control interface view corresponding to a universal audio application control interface, wherein the universal audio application control interface is different than the application-specific control interface;

receiving a user input on the universal audio application control interface view, the user input, when received initiating launching the universal audio application control interface; and in response to receiving the user input, displaying the universal audio application control interface for controlling playback of the audio content playing on the audio application.

14. The electronic device of claim 13, wherein the universal audio application control interface view includes an affordance corresponding to adding the universal audio application control interface view to the set of application views, the one or more programs further including instructions for:

receiving a user input for selecting the affordance; and in response to receiving the user input for selecting the affordance, adding the universal audio application control interface view to the set of application views.

15. The electronic device of claim 1, the one or more programs further including instructions for:

at a companion device with one or more processors and memory that is paired with the device:

displaying the adaptive view that corresponds to a most recently opened application, wherein the adaptive view includes an affordance corresponding to adding the adaptive view to the preselected application views;

receiving a user input for selecting the affordance; and in response to receiving the user input for selecting the affordance, adding the adaptive view that corresponds to the most recently opened application to the preselected application views.

16. The electronic device of claim 1, wherein the set of application views are displayed in a sequence, the one or more programs further including instructions for:

at a companion device with one or more processors, touchscreen and memory that is paired with the device:

displaying a portion of the sequenced set of application views;

receiving an input at a location on the touchscreen displaying an application view;

in response to the input, visually distinguishing the application view with respect to the other application views in the sequenced set of application views;

detecting movement, without breaking contact with touchscreen, of the input on the application view;

in response to the detected movement of the input on the application view, moving the application view to a second position in the sequenced set of application views;

detecting a break of the input with the touchscreen; and in response to the detected break of the input with the touchscreen, reordering the application view to the second position in the sequenced set of application views.

17. The electronic device of claim 1, the one or more programs further including instructions for:

at a companion device to the device, wherein the companion device includes one or more processors and memory that is paired with the device:

receiving an input on an application view of the plurality of application views, the input, when received initiating deletion of the application view from the set of application views; and in response to the input on the application view, deleting the application view from the set of application views.

18. A method, comprising:
at a device with one or more processors and memory:
while a respective application is a most recently used application:
in response to receiving a user input, concurrently displaying a plurality of application views of a set of application views, wherein the set of application views includes preselected application views and an adaptive view that corresponds to a most recently opened application, wherein concurrently displaying the plurality of application views includes:
in accordance with a determination that the respective application does not correspond to one of the preselected application views, displaying an application view corresponding to the respective application at a first location on the display as the adaptive view; and
in accordance with a determination that the respective application corresponds to one of the preselected application views, forgoing displaying the application view corresponding to the respective application at the first location on the display as the adaptive view.

19. A non-transitory computer-readable storage medium storing one or more programs configured to be executed by one or more processors of an electronic device with a display and one or more input devices, the one or more programs including instructions for:
while a respective application is a most recently used application:
in response to receiving a user input, concurrently displaying a plurality of application views of a set of application views, wherein the set of application views includes preselected application views and an adaptive view that corresponds to a most recently opened application, wherein concurrently displaying the plurality of application views includes:
in accordance with a determination that the respective application does not correspond to one of the preselected application views, displaying an application view corresponding to the respective application at a first location on the display as the adaptive view; and
in accordance with a determination that the respective application corresponds to one of the preselected application views, forgoing displaying the application view corresponding to the respective application at the first location on the display as the adaptive view.

20. The method of claim 18, further comprising:
displaying the adaptive view that corresponds to a most recently opened application, wherein the adaptive view includes an affordance corresponding to adding the adaptive view to the preselected application views;
receiving a user input corresponding to selection of the affordance; and
in response to receiving the user input corresponding to selection of the affordance, adding the adaptive view that corresponds to the most recently opened application to the preselected application views.

21. The method of claim 18, wherein the set of application views are displayed in a sequence, the method further comprising:
displaying the adaptive view at a terminus of the sequenced of the of application views.

22. The method of claim 18, wherein the user input is received while displaying an open application that is the most recently opened application that is not one of the preselected application views, the method further comprising:
further in response to receiving the user input, displaying the adaptive view that corresponds to the most recently opened application that is not one of the preselected application views,
wherein the adaptive view includes an affordance corresponding to adding the adaptive view to the preselected application views,
receiving a user input corresponding to selection of the affordance; and
in response to receiving the user input corresponding to selection of the affordance, adding the adaptive view that corresponds to the most recently opened application to the preselected application views.

23. The method of claim 18, further comprising:
detecting launch of an application, wherein the adaptive view and the preselected application views of the set of application views do not correspond with the launched application; and
in response to detecting the launch of the application, updating the adaptive view to correspond with the launched application.

24. The method of claim 18, further comprising:
while the application associated with the adaptive view is not opened, displaying the adaptive view;
receiving a user input corresponding to the adaptive view; and
in response to receiving the user input corresponding to the adaptive view, launching the associated application.

25. The method of claim 18, wherein the set of application views are displayed in a sequence, the method further comprising:
displaying a portion of the sequenced set of application views;
receiving an input on an application view in a first position in the sequenced set of application views;
in response to the input on the application view, visually distinguishing the application view with respect to the other application views in the sequenced set of application views;
detecting movement of the input on the application view to a second position in the sequenced set of application views;
in response to the detected movement of the input on the application view, moving the application view to the second position in the sequenced set of application views;
detecting a break of the input on the application view; and
in response to the detected break of the input on the application view, reordering the application view to the second position in the sequenced set of application views.

26. The method of claim 18, further comprising:
receiving an input on an application view of the plurality of application views, the input, when received initiating deleting the application view from the set of application views; and
in response to the input on the application view, deleting the application view from the set of application views.

27. The method of claim 18, further comprising:
receiving a swipe gesture for scrolling through the set of application views; and
in response to receiving the swipe gesture:
in accordance with a determination that a velocity of the swipe gesture is below a predetermined velocity threshold, scrolling to an adjacent application view; and
in accordance with a determination that the velocity of the swipe gesture is above the predetermined velocity threshold, scrolling through a plurality of application views of the set of application views.

28. The method of claim 18, the further comprising:
receiving a user input, the user input, when received initiating scrolling to an adjacent application view in set of application views; and
in response to receiving the user input, scrolling to the adjacent application view in the set of application views, wherein the scrolling to the adjacent application view includes a decrease in velocity based on a predetermined coefficient of friction.

29. The method of claim 18, further comprising:
while displaying the plurality of application views in a display area, receiving an input at a bottom edge of the display area, the input, when received initiating scrolling of the application views;
in response to the input at an edge of the display area, moving the application views away from the bottom edge of the display area;
detecting movement of the input along the bottom edge of the display area; and
in response to the detected movement of the input along the bottom edge of the display area, scrolling through the set of application views.

30. The method of claim 18, further comprising:
while displaying the plurality of application views of the set of application views, displaying a set of application view indicia, wherein each of the application view indicia corresponds to a respective application view in the set of application views;
highlighting an indicia corresponding to a displayed application view;
receiving a user input, the user input, when received for scrolling to another application view in the set of application views;
in response to receiving the user input, scrolling to the another application view;
in accordance to scrolling to the another application view, highlighting an application view indicia corresponding to the another application view, wherein the highlighting the application view corresponding to the another application view includes:
an initial highlighting brightness; and
a final highlighting brightness, wherein the brightness of the highlighting increases during the transition from the initial highlighting brightness to the final highlighting brightness.

31. The method of claim 18, further comprising:
while an audio application is playing audio content, wherein the audio application includes an application-specific control interface, wherein the set of application views does not include an application view corresponding to the audio application:
updating the set of application views with a universal audio application control interface view corresponding to a universal audio application control interface, wherein the universal audio application control interface is different than the application-specific control interface;
receiving a user input on the universal audio application control interface view, the user input, when received initiating launching the universal audio application control interface; and
in response to receiving the user input, displaying the universal audio application control interface for controlling playback of the audio content playing on the audio application.

32. The method of claim 31, wherein the universal audio application control interface view includes an affordance corresponding to adding the universal audio application control interface view to the set of application views, the method further comprising:
receiving a user input for selecting the affordance; and
in response to receiving the user input for selecting the affordance, adding the universal audio application control interface view to the set of application views.

33. The method of claim 18, further comprising:
at a companion device with one or more processors and memory that is paired with the device:
displaying the adaptive view that corresponds to a most recently opened application, wherein the adaptive view includes an affordance corresponding to adding the adaptive view to the preselected application views;
receiving a user input for selecting the affordance; and
in response to receiving the user input for selecting the affordance, adding the adaptive view that corresponds to the most recently opened application to the preselected application views.

34. The method of claim 18, wherein the set of application views are displayed in a sequence, the method further comprising:
at a companion device with one or more processors, touchscreen and memory that is paired with the device:
displaying a portion of the sequenced set of application views;
receiving an input at a location on the touchscreen displaying an application view;
in response to the input, visually distinguishing the application view with respect to the other application views in the sequenced set of application views;
detecting movement, without breaking contact with touchscreen, of the input on the application view;
in response to the detected movement of the input on the application view, moving the application view to a second position in the sequenced set of application views;
detecting a break of the input with the touchscreen; and
in response to the detected break of the input with the touchscreen, reordering the application view to the second position in the sequenced set of application views.

35. The method of claim 18, further comprising:
at a companion device to the device, wherein the companion device includes one or more processors and memory that is paired with the device:
receiving an input on an application view of the plurality of application views, the input, when received initiating deletion of the application view from the set of application views; and
in response to the input on the application view, deleting the application view from the set of application views.

36. The non-transitory computer-readable storage medium of claim 19, the one or more programs further including instructions for:
- displaying the adaptive view that corresponds to a most recently opened application, wherein the adaptive view includes an affordance corresponding to adding the adaptive view to the preselected application views;
- receiving a user input corresponding to selection of the affordance; and
- in response to receiving the user input corresponding to selection of the affordance, adding the adaptive view that corresponds to the most recently opened application to the preselected application views.

37. The non-transitory computer-readable storage medium of claim 19, wherein the set of application views are displayed in a sequence, the one or more programs further including instructions for:
- displaying the adaptive view at a terminus of the sequenced set of application views.

38. The non-transitory computer-readable storage medium of claim 19, wherein the user input is received while displaying an open application that is the most recently opened application that is not one of the preselected application views, the one or more programs further including instructions for:
- further in response to receiving the user input, displaying the adaptive view that corresponds to the most recently opened application that is not one of the preselected application views,
- wherein the adaptive view includes an affordance corresponding to adding the adaptive view to the preselected application views,
- receiving a user input corresponding to selection of the affordance; and
- in response to receiving the user input corresponding to selection of the affordance, adding the adaptive view that corresponds to the most recently opened application to the preselected application views.

39. The non-transitory computer-readable storage medium of claim 19, the one or more programs further including instructions for:
- detecting launch of an application, wherein the adaptive view and the preselected application views of the set of application views do not correspond with the launched application; and
- in response to detecting the launch of the application, updating the adaptive view to correspond with the launched application.

40. The non-transitory computer-readable storage medium of claim 19, the one or more programs further including instructions for:
- while the application associated with the adaptive view is not opened, displaying the adaptive view;
- receiving a user input corresponding to the adaptive view; and
- in response to receiving the user input corresponding to the adaptive view, launching the associated application.

41. The non-transitory computer-readable storage medium of claim 19, wherein the set of application views are displayed in a sequence, the one or more programs further including instructions for:
- displaying a portion of the sequenced set of application views;
- receiving an input on an application view in a first position in the sequenced set of application views;
- in response to the input on the application view, visually distinguishing the application view with respect to the other application views in the sequenced set of application views;
- detecting movement of the input on the application view to a second position in the sequenced set of application views;
- in response to the detected movement of the input on the application view, moving the application view to the second position in the sequenced set of application views;
- detecting a break of the input on the application view; and
- in response to the detected break of the input on the application view, reordering the application view to the second position in the sequenced set of application views.

42. The non-transitory computer-readable storage medium of claim 19, the one or more programs further including instructions for:
- receiving an input on an application view of the plurality of application views, the input, when received initiating deleting the application view from the set of application views; and
- in response to the input on the application view, deleting the application view from the set of application views.

43. The non-transitory computer-readable storage medium of claim 19, the one or more programs further including instructions for:
- receiving a swipe gesture for scrolling through the set of application views; and
- in response to receiving the swipe gesture:
  - in accordance with a determination that a velocity of the swipe gesture is below a predetermined velocity threshold, scrolling to an adjacent application view; and
  - in accordance with a determination that the velocity of the swipe gesture is above the predetermined velocity threshold, scrolling through a plurality of application views of the set of application views.

44. The non-transitory computer-readable storage medium of claim 19, the one or more programs further including instructions for:
- receiving a user input, the user input, when received initiating scrolling to an adjacent application view in set of application views; and
- in response to receiving the user input, scrolling to the adjacent application view in the set of application views, wherein the scrolling to the adjacent application view includes a decrease in velocity based on a predetermined coefficient of friction.

45. The non-transitory computer-readable storage medium of claim 19, the one or more programs further including instructions for:
- while displaying the plurality of application views in a display area, receiving an input at a bottom edge of the display area, the input, when received initiating scrolling of the application views;
- in response to the input at an edge of the display area, moving the application views away from the bottom edge of the display area;
- detecting movement of the input along the bottom edge of the display area; and
- in response to the detected movement of the input along the bottom edge of the display area, scrolling through the set of application views.

46. The non-transitory computer-readable storage medium of claim 19, the one or more programs further including instructions for:
  while displaying the plurality of application views of the set of application views, displaying a set of application view indicia, wherein each of the application view indicia corresponds to a respective application view in the set of application views;
  highlighting an indicia corresponding to a displayed application view;
  receiving a user input, the user input, when received for scrolling to another application view in the set of application views;
  in response to receiving the user input, scrolling to the another application view;
  in accordance to scrolling to the another application view, highlighting an application view indicia corresponding to the another application view, wherein the highlighting the application view corresponding to the another application view includes:
    an initial highlighting brightness; and
    a final highlighting brightness, wherein the brightness of the highlighting increases during the transition from the initial highlighting brightness to the final highlighting brightness.

47. The non-transitory computer-readable storage medium of claim 19, the one or more programs further including instructions for:
  while an audio application is playing audio content, wherein the audio application includes an application-specific control interface, wherein the set of application views does not include an application view corresponding to the audio application:
    updating the set of application views with a universal audio application control interface view corresponding to a universal audio application control interface, wherein the universal audio application control interface is different than the application-specific control interface;
  receiving a user input on the universal audio application control interface view, the user input, when received initiating launching the universal audio application control interface; and
  in response to receiving the user input, displaying the universal audio application control interface for controlling playback of the audio content playing on the audio application.

48. The non-transitory computer-readable storage medium of claim 47, wherein the universal audio application control interface view includes an affordance corresponding to adding the universal audio application control interface view to the set of application views, the one or more programs further including instructions for:
  receiving a user input for selecting the affordance; and
  in response to receiving the user input for selecting the affordance, adding the universal audio application control interface view to the set of application views.

49. The non-transitory computer-readable storage medium of claim 19, the one or more programs further including instructions for:
  at a companion device with one or more processors and memory that is paired with the device:
    displaying the adaptive view that corresponds to a most recently opened application, wherein the adaptive view includes an affordance corresponding to adding the adaptive view to the preselected application views;
    receiving a user input for selecting the affordance; and
    in response to receiving the user input for selecting the affordance, adding the adaptive view that corresponds to the most recently opened application to the preselected application views.

50. The non-transitory computer-readable storage medium of claim 19, wherein the set of application views are displayed in a sequence, the one or more programs further including instructions for:
  at a companion device with one or more processors, touchscreen and memory that is paired with the device:
    displaying a portion of the sequenced set of application views;
    receiving an input at a location on the touchscreen displaying an application view;
    in response to the input, visually distinguishing the application view with respect to the other application views in the sequenced set of application views;
    detecting movement, without breaking contact with touchscreen, of the input on the application view;
    in response to the detected movement of the input on the application view, moving the application view to a second position in the sequenced set of application views;
    detecting a break of the input with the touchscreen; and
    in response to the detected break of the input with the touchscreen, reordering the application view to the second position in the sequenced set of application views.

51. The non-transitory computer-readable storage medium of claim 19, the one or more programs further including instructions for:
  at a companion device to the device, wherein the companion device includes one or more processors and memory that is paired with the device:
    receiving an input on an application view of the plurality of application views, the input, when received initiating deletion of the application view from the set of application views; and
    in response to the input on the application view, deleting the application view from the set of application views.

* * * * *

UNITED STATES PATENT AND TRADEMARK OFFICE
CERTIFICATE OF CORRECTION

PATENT NO. : 10,637,986 B2
APPLICATION NO. : 15/608866
DATED : April 28, 2020
INVENTOR(S) : Nathan De Vries et al.

It is certified that error appears in the above-identified patent and that said Letters Patent is hereby corrected as shown below:

In the Claims

Claim 3, Column 63, Line 61, after "terminus" insert -- of the --.

Claim 7, Column 64, Line 45, after "sequenced" insert -- set of --.

Claim 21, Column 68, Line 2, delete "of the of" and insert -- of --, therefor.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*